US008369654B2

(12) United States Patent
Shiohara

(10) Patent No.: US 8,369,654 B2
(45) Date of Patent: Feb. 5, 2013

(54) DEVELOPING APPARATUS, DEVELOPING METHOD AND COMPUTER PROGRAM FOR DEVELOPING PROCESSING FOR AN UNDEVELOPED IMAGE

(75) Inventor: Ryuichi Shiohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1087 days.

(21) Appl. No.: 12/115,424

(22) Filed: May 5, 2008

(65) Prior Publication Data

US 2008/0279468 A1  Nov. 13, 2008

(30) Foreign Application Priority Data

May 8, 2007 (JP) .................................. 2007-123668

(51) Int. Cl.
*G06K 9/32* (2006.01)
(52) U.S. Cl. ....................... 382/300; 382/298; 348/222.1
(58) Field of Classification Search .................. 382/167, 382/298–300; 348/222.1
See application file for complete search history.

(56) References Cited

U.S. PATENT DOCUMENTS

| | | | | |
|---|---|---|---|---|
| 5,418,565 A * | 5/1995 | Smith | | 348/273 |
| 6,778,216 B1 * | 8/2004 | Lin | | 348/333.11 |
| 6,870,547 B1 * | 3/2005 | Crosby et al. | | 345/619 |
| 7,259,786 B2 * | 8/2007 | Shimizu | | 348/231.6 |
| 7,417,671 B2 * | 8/2008 | Sugimori | | 348/223.1 |
| 7,453,598 B2 * | 11/2008 | Takahashi | | 358/1.9 |
| 7,974,468 B2 * | 7/2011 | Kojima et al. | | 382/167 |
| 2004/0119841 A1 * | 6/2004 | Shimizu | | 348/222.1 |
| 2007/0047019 A1 * | 3/2007 | Toyoda | | 358/448 |
| 2007/0098261 A1 * | 5/2007 | Kojima et al. | | 382/167 |
| 2009/0021594 A1 * | 1/2009 | Tsuda et al. | | 348/222.1 |
| 2010/0066861 A1 * | 3/2010 | Sakagami | | 348/231.6 |

FOREIGN PATENT DOCUMENTS

| | | |
|---|---|---|
| JP | 08-298669 | 11/1996 |
| JP | 2003-346143 | 12/2003 |
| JP | 2005-275454 | 10/2005 |
| JP | 2005-323162 | 11/2005 |
| JP | 2006-101389 | 4/2006 |
| JP | 2006-203555 | 8/2006 |
| JP | 2006-227698 | 8/2006 |
| JP | 2006-295815 | 10/2006 |
| JP | 2007-066138 | 3/2007 |
| JP | 2007087147 A | 4/2007 |
| WO | WO 03024094 A1 * | 3/2003 |
| WO | WO 2006129868 A1 * | 12/2006 |

* cited by examiner

*Primary Examiner* — Chan S Park
*Assistant Examiner* — Sean Motsinger
(74) *Attorney, Agent, or Firm* — DLA Piper LLP (US)

(57) ABSTRACT

To facilitate setting of development condition an image developing apparatus is provided. The image developing apparatus performs a development process to first image data generated by a digital camera, each pixel of which lacks a part of color information, the image developing apparatus carries out a first type of development process on the first image data to generate developed image data; and a second type of development process on the first undeveloped image data to generate for-display image data with lower resolution. The first type of development process includes: a first specific process performed on the first image data to generate second image data; and a first interpolation process performed on the second image data, the second type of development process includes: a process to generate third image data through a second interpolation process performed on the first image data and a resolution converting process; and a second specific process performed on the third image data.

11 Claims, 40 Drawing Sheets

Fig.8A
3008 × 2000 PIXELS
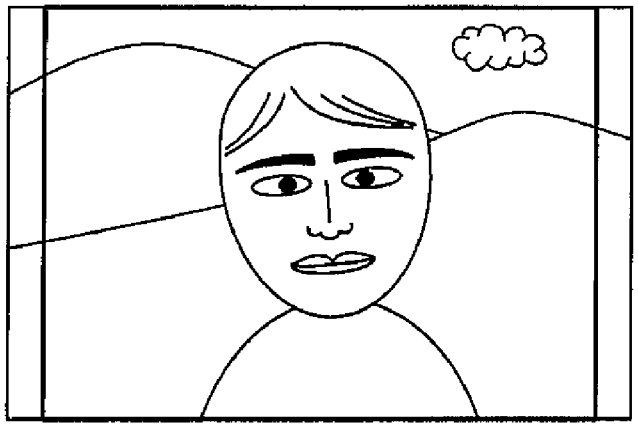
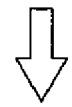
Fig.8B
2664 × 1998 PIXELS
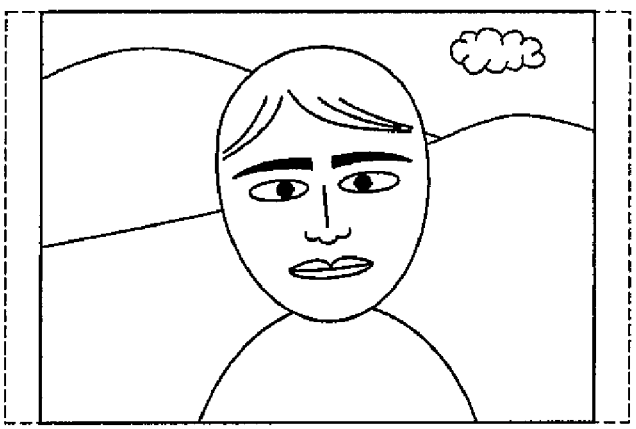
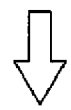
Fig.8C
320 × 240 PIXELS
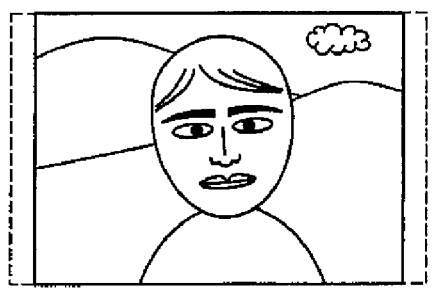

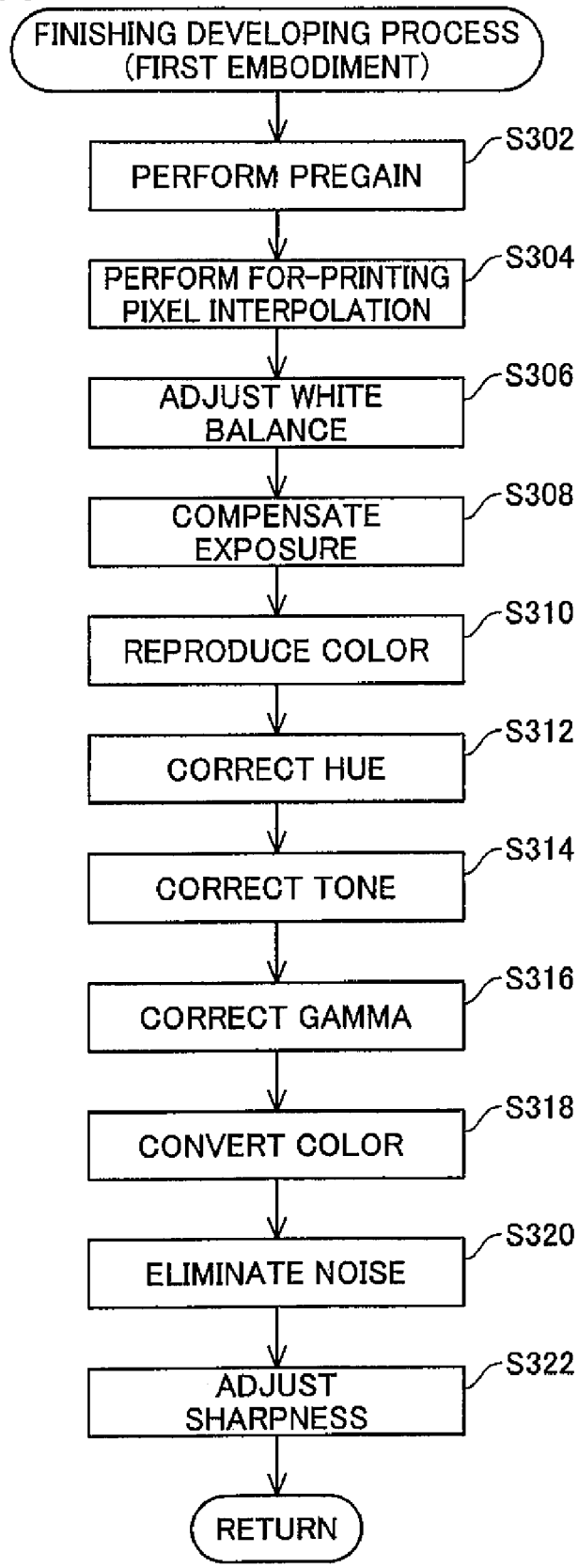

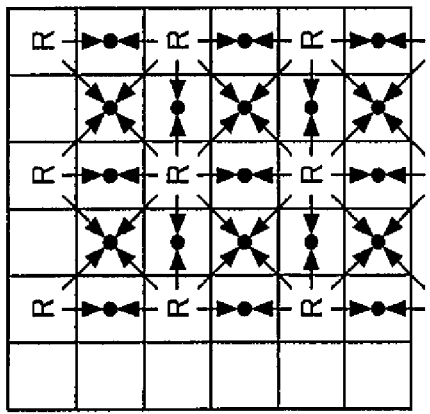
Fig.34C  R PIXELS
Fig.34E  R PIXEL INTERPOLATION
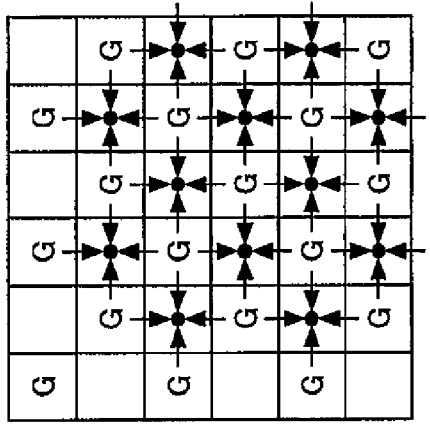
Fig.34B  G PIXELS
Fig.34D  G PIXEL INTERPOLATION
Fig.34A  FILTER ARRANGEMENT Fig.35A FILTER ARRANGEMENT Fig.35B USED PIXELS Fig.35C RGB PIXELS

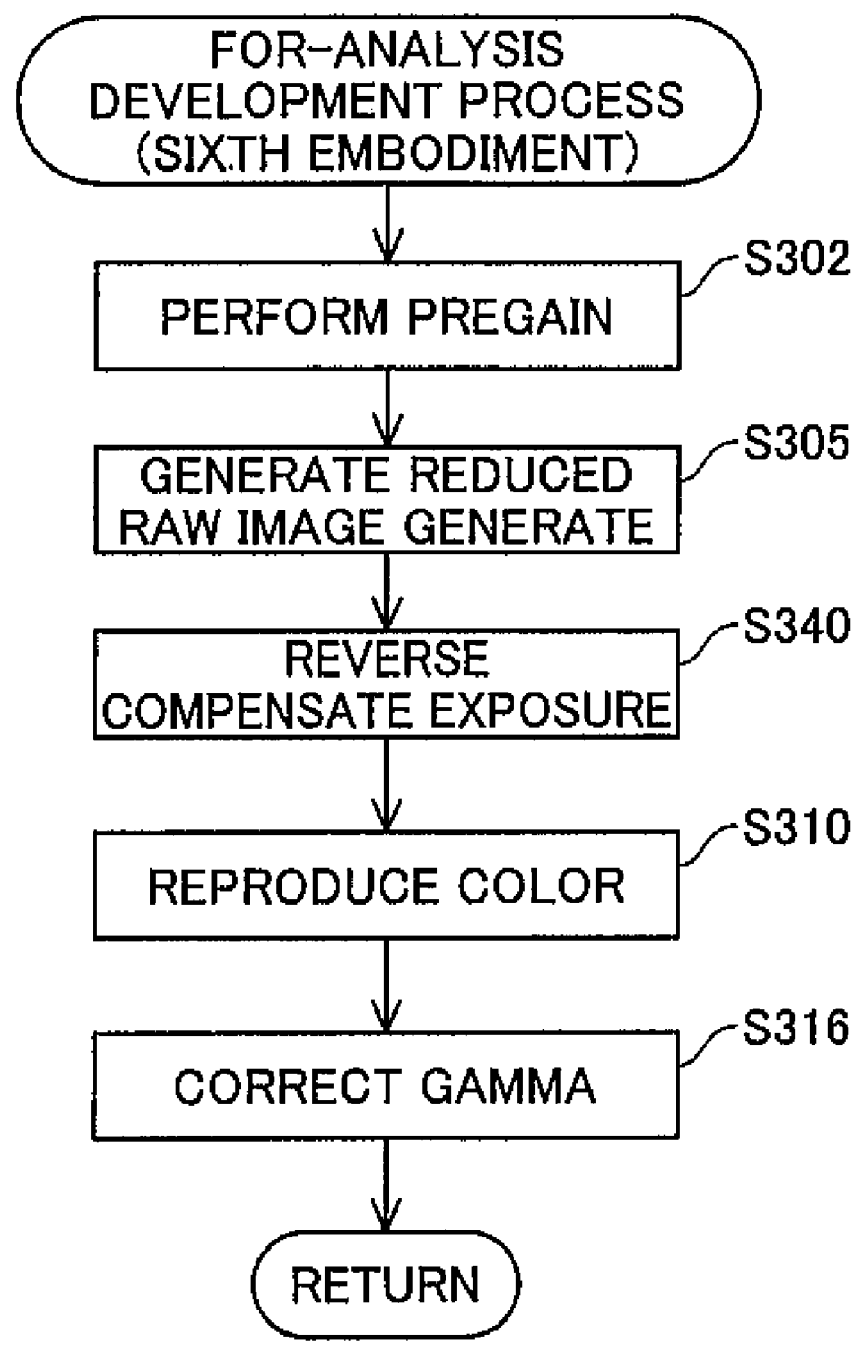

DEVELOPING APPARATUS, DEVELOPING METHOD AND COMPUTER PROGRAM FOR DEVELOPING PROCESSING FOR AN UNDEVELOPED IMAGE

CROSS-REFERENCE TO RELATED APPLICATIONS

The present application claims the priority based on Japanese Patent Application No. 2007-123668 filed on May 8, 2007, the disclosure of which is hereby incorporated herein by reference in its entirety.

BACKGROUND OF THE INVENTION

1. Field of the Invention

This invention relates to technology for developing a undeveloped image data generated by a digital camera.

2. Description of the Related Art

Digital still cameras available in recent years have the ability to record RAW image data (undeveloped image data) which represent intensity of incident light into the CCD or other imaging device provided to the digital still camera. The RAW image data recorded onto a memory card in this way is converted to developed image data such as image data in commonly used formats as the JPEG or TIFF formats, and image data for printing out. The conversion from the undeveloped image data to the developed image data is performed with an application program running on a personal computer and so on.

In the process of converting the RAW image data to image data in one of the commonly used formats (referred to as the "development process"), the image quality of the developed image data produced thereby varies appreciably depending on the process conditions (development conditions) used for the development process. Accordingly, the user set the development conditions while checking the result of development with the development condition to be set.

However, where the development process is carried out on RAW image data in response to modification of development condition, depending on the development process, it may take considerable time to generate image for the purpose of checking the development result. As a result, convenience to set development conditions is reduced in some cases.

SUMMARY

An object of the present invention is to facilitate setting of development condition for developing undeveloped image data whereby generating finishing developed image data.

According to an aspect of the present invention, an image developing apparatus is provided. The image developing apparatus performs a development process to first undeveloped image data generated by a digital camera, each pixel of which lacks a part of color information, the image developing apparatus has: a finishing development process unit configured to carry out a first type of development process on the first undeveloped image data to generate finishing developed image data in a prescribed format from the first undeveloped image data; a for-display development process unit configured to carry out a second type of development process on the first undeveloped image data to generate for-display image data of a prescribed resolution lower than a resolution of the finishing developed image data; and a display unit configured to display the for-display image data generated by the for-display development process unit, wherein the first type of development process includes: a first specific process performed on the first undeveloped image data to generate second undeveloped image data; and a first interpolation process performed on the second undeveloped image data to interpolate the lacking color information, the second type of development process includes: a process to generate third undeveloped image data through a second interpolation process performed on the first undeveloped image data to interpolate the lacking color information, and a resolution conversion process to convert resolution to the prescribed resolution; and a second specific process performed on the third undeveloped image data.

With this configuration, in the generation process of for-display image data, an interpolation process and a resolution conversion process are carried out prior to performing a specific process. By carrying out the resolution conversion process prior to the specific process, resolution of image data on which the specific process is performed is reduced in advance. Such a reduction of the image data enables reduction of the arithmetic processing load for the specific process performed in the for-display image developing process. Thus, the time required to generate for-display image data may be shortened, and convenience in setting of a development process condition may be improved. Additionally, during the finishing development process, which does not involve reduced resolution, the specific process is carried out prior to the interpolation process, and thus the arithmetic processing load required for the specific process in the finishing development process can be reduced. It is especially preferable to carry out interpolation and resolution conversion prior to the specific processes in this way in instances where the total pixel count of for-display image data is smaller than a prescribed ratio (for example 1/3) with respect to the developed image data.

The image developing apparatus may further have: a development process condition receiving unit configured to receive setting of a development process condition by a user, the development process condition being used in the finishing development process unit and in the for-display development process unit, wherein the for-display development process unit has an undeveloped image saving process unit configured to save the third undeveloped image data generated during generation of the for-display image data, and when the development process condition receiving unit receives a modification of the development process condition subsequent to generation of the previous for-display image data, the for-display development process unit carries out the second specific process on the third undeveloped image data saved by the undeveloped image saving process unit, on the basis of the modified development process condition.

With this configuration, when the development process condition is modified, for-display image data can be generated by carrying out the specific process on the third undeveloped image data which is stored during generation of the previous for-display image data. As a result the process of generating third undeveloped image data may be omitted.

According to another aspect of the invention, there is provided an image developing apparatus. The image developing apparatus performs a development process to first undeveloped image data generated by a digital camera, each pixel of which lacking a part of color information, the image developing apparatus has: a finishing development process unit configured to carry out a first type of development process on the first undeveloped image data to generate finishing developed image data in a prescribed format from the first undeveloped image data; a for-display development process unit configured to carry out a second type of development process on the first undeveloped image data to generate for-display image data of a prescribed resolution; and a development process condition receiving unit for receiving setting of a development process condition by a user, the development process condition being used in the finishing development process unit and in the for-display development process unit, wherein the first type of development process includes: a first specific process performed on the first undeveloped image data to generate second undeveloped image data; and a first interpolation process performed on the second undeveloped image data to interpolate the lacking color information, the second type of development process includes: a second interpolation process performed on the first undeveloped image data to interpolate the lacking color information so as to generate third undeveloped image data; and a second specific process performed on the third undeveloped image data, the for-display development process unit has an undeveloped image saving process unit configured to save the third undeveloped image data generated during generation, of the for-display image data, and when the development process condition receiving unit receives a modification of a development process condition subsequent to generation of the previous for-display image data, the for-display development process unit carries out the second specific process on the third undeveloped image data saved by the undeveloped image saving process unit, on the basis of the modified development process condition.

With this configuration as well, when the development process condition is modified, for-display image data can be generated by carrying out the specific process on the third undeveloped image data which is stored during generation of the previous for-display image data. Thus, the process of generating third undeveloped image data may be omitted, thereby convenience in setting of a development process condition may be improved.

As the second interpolation process, it is preferable to use a process with a smaller arithmetic processing load than the first interpolation process.

Since the for-display image data has lower resolution than the developed image data, the affect of the decline of image quality on the for-display image data is typically less than the affect on developed image data. For this reason, even if image quality is declined by carrying out an interpolation process with a simpler process involving a lower arithmetic processing load than the first interpolation process, the affect on the for-display image data generated thereby will be minimal. Accordingly, by using a process which involves a lower arithmetic processing load than the first interpolation process as the second interpolation process, the arithmetic processing load can be reduced while minimizing the affect of the decline of image quality.

The present invention may be implemented in various embodiments. For example, it can be implemented as an image developing apparatus and an image developing method; an image output apparatus or an image output method that employs the image developing apparatus or the image developing method; a computer program that realizes the functions of those apparatuses and methods; a recording medium having such a computer program recorded thereon; and a data signal embedded in carrier waves including such a computer program.

These and other objects, features, aspects, and advantages of the present invention will become more apparent from the following detailed description of the preferred embodiments with the accompanying drawings.

BRIEF DESCRIPTION OF THE DRAWINGS

FIGS. 8A through 8C are illustrations depicting generation of a resized image from a screen nail image;

FIG. 10 is a flowchart of the finishing development process executed in Step S160;

FIG. 12 is an illustration depicting an example of a development settings specifying screen which is displayed in Step S110a;

FIG. 17 is an illustration showing another example besides that of FIG. 12 of the development settings specifying screen which is displayed in Step S110a;

FIG. 23 is an illustration depicting yet another example of the development settings specifying screen which is displayed in Step S110a;

FIGS. 34A through 34E are illustrations depicting carrying out of simple pixel interpolation process;

FIGS. 35A through 35C are illustrations depicting carrying out of the simple pixel interpolation process by a different method than in FIGS. 34A through 34E;

FIG. 40 is a flowchart of a for-analysis development process in the sixth embodiment.

DESCRIPTION OF THE PREFERRED EMBODIMENT

A. First Embodiment

Figure 1:
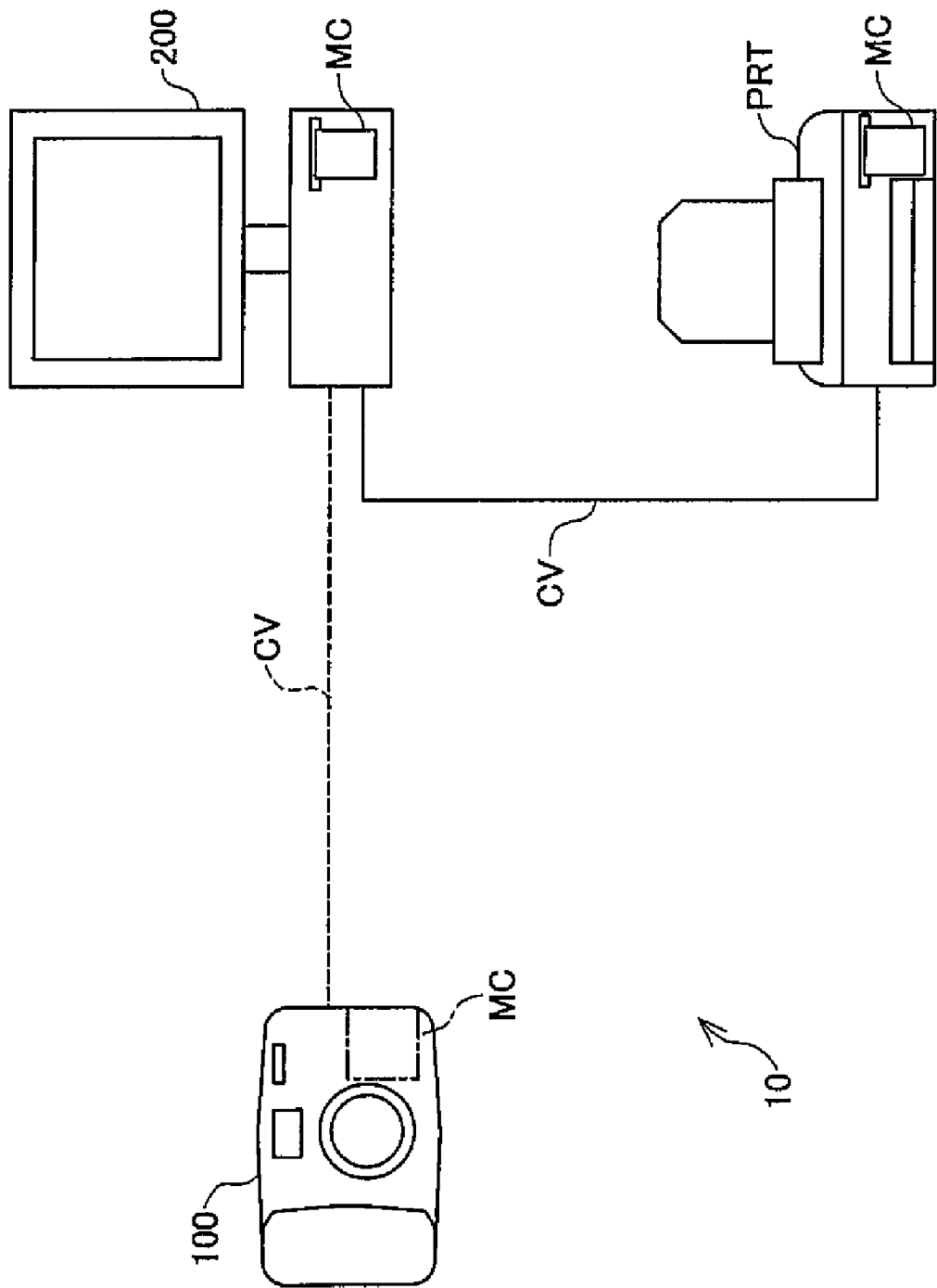
FIG. 1 is a schematic diagram schematically depicting a configuration of an image processing system as an embodiment of the present invention.

FIG. 1 is a schematic diagram schematically depicting a configuration of an image processing system 10 as an embodiment of the present invention. The image processing system 10 includes a digital still camera 100, a personal computer 200, and a printer PRT. The digital still camera 100 has a memory card slot for receiving a memory card MC which is indicated by the dotted dashed line.

The digital still camera 100 generates an image file in prescribed format from a photographed image. The generated image file is stored on the memory card MC. By inserting the memory card MC into the personal computer 200, the personal computer 200 read out the image file stored on the memory card MC. The image data contained in the read out image file is subjected to image processing by the personal computer 200. The image data which undergoes the image processing is printed by the printer PRT connected to the personal computer 200 via a cable CV. Alternatively, the memory card MC may be inserted directly into the printer PRT so that the printer PRT executes printing on the basis of the image file. By connecting the personal computer 200 to the digital still camera 100 with the cable CV, it is also possible to transfer image file from the digital still camera 100 to the personal computer 200.

Figure 2:
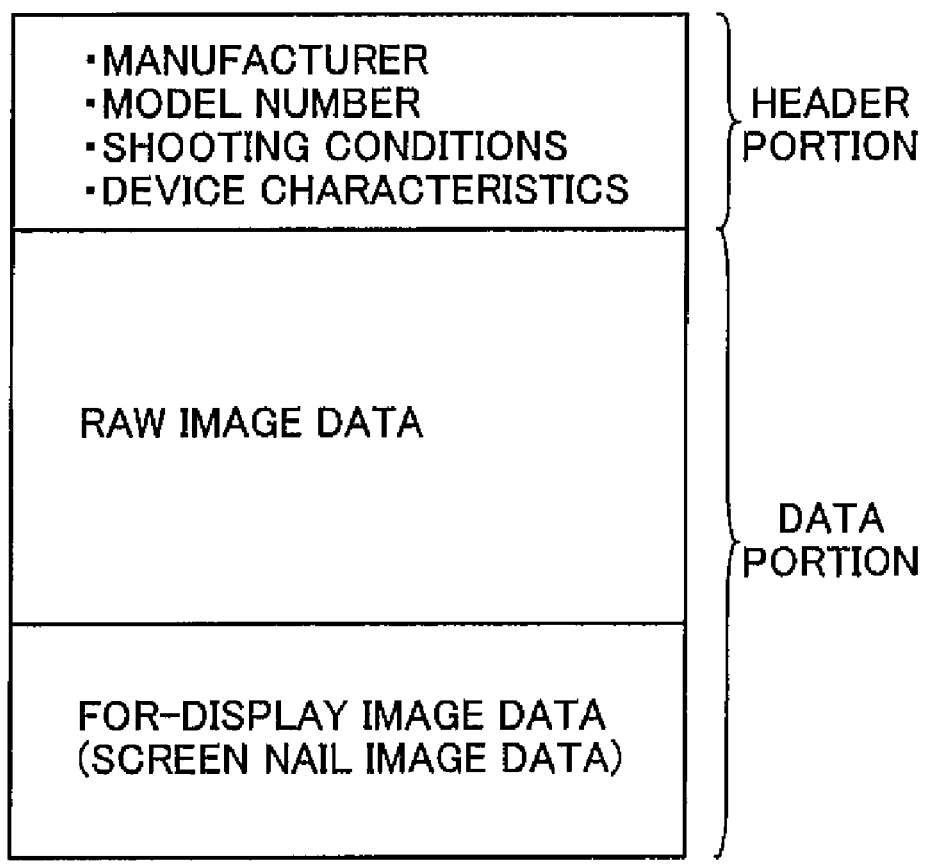
FIG. 2 is an illustration depicting data format of a RAW image file generated by the digital still camera.

FIG. 2 is an illustration depicting data format of a RAW image file generated by the digital still camera 100. Hereinafter, a RAW image file refers to a class of image file generated by the digital still camera 100. The file contains RAW image data representing output of the imaging device (a CCD, CMOS, and so on) of the digital still camera 100. This RAW image file is generated in a data format similar to the Exif (Exchangeable Image File Format). As illustrated, the file includes a header portion and a data portion.

The header portion describes attached information such as manufacturer and model number of the digital still camera which generated the RAW image file, shooting conditions, shooting date, device characteristics. The shooting conditions include settings at the time of shooting, for example, shutter speed, aperture value, white balance setting, scene setting and so on. The device characteristics include various parameters which represent device characteristics of the digital still camera 100, such as offset of tone value (discussed later).

The data portion includes image data generated at the time of shooting, namely, RAW image data and for-display image data. The for-display image data is a developed image data obtained by performing a development process (picture generation process) on RAW image data. The RAW image data and the for-display image data represent photographed image of the same subject. The RAW image data and the for-display image data are both recorded at the time of shooting. The for-display image data is used, for example, for quick display of photographed image on display panel provided to the digital still camera. The for-display image data is image data on which development process is performed in the digital still camera. The for-display image data may take the form of JPEG image data of reduced size. The for-display image may have the same number of vertical and horizontal pixels as the RAW image, or have a reduced number of vertical and horizontal pixels for display purposes. In some instances, for-display image data is reduced to a size of VGA resolution (640×480 pixels). Such for-display image data is also referred to as screen nail image data. Since this screen nail image data is image data which is associated with the RAW image data, it can also be referred as "associated image data." The data format of RAW image file may differ depending on the manufacture and model of the digital still camera 100 (FIG. 1).

Figure 3:
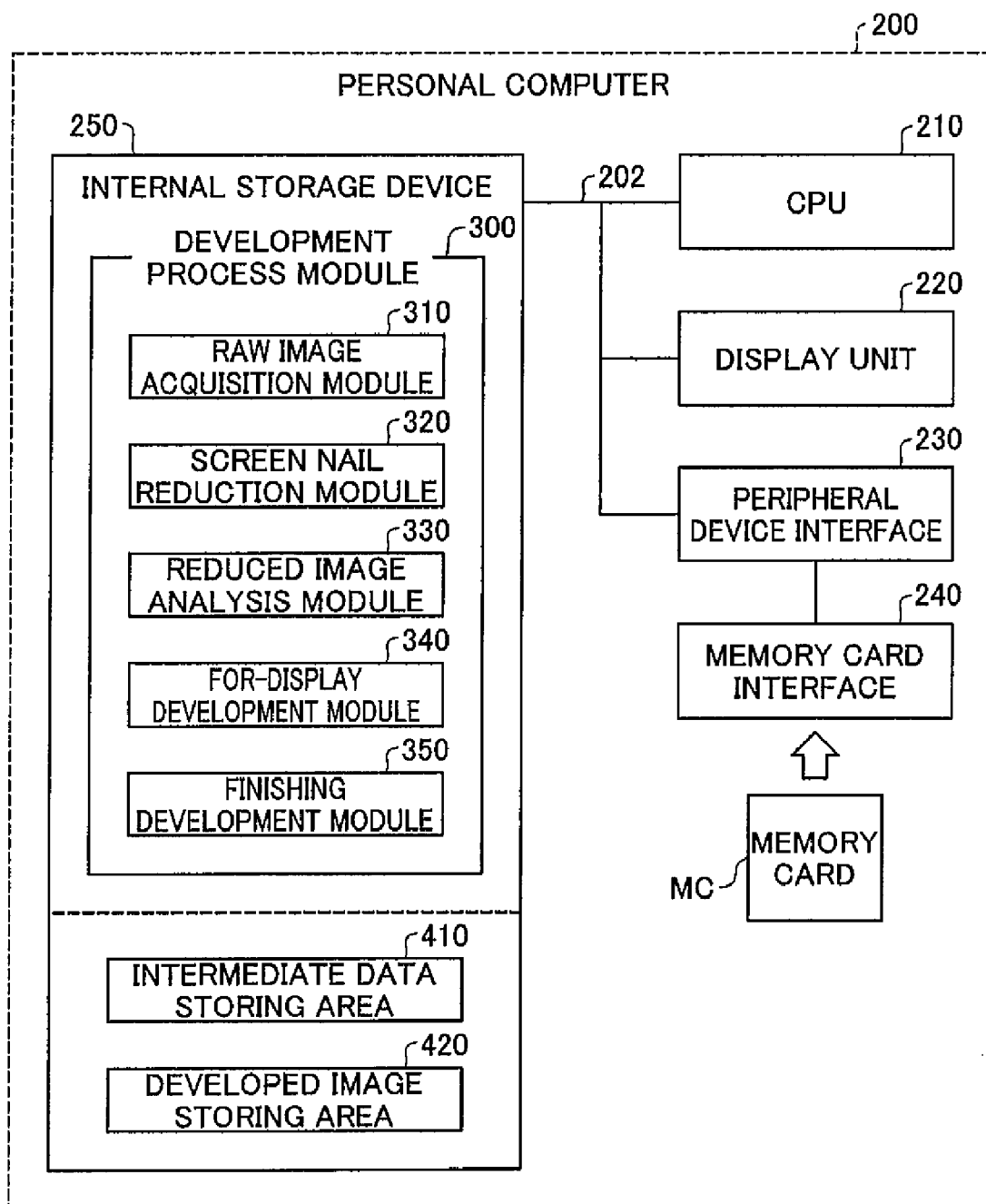
FIG. 3 is a schematic diagram schematically depicting the configuration of the personal computer.

FIG. 3 is a schematic diagram schematically depicting the configuration of the personal computer 200. The personal computer 200 includes a central processing unit (CPU) 210, a display unit 220 for displaying an image, a peripheral device interface 230, a memory card interface 240, and an internal storage device 250. The CPU 210, the display unit 220, the peripheral device interface 230, and the internal storage device 250 are interconnected through a bus 202. Exchange of data among these components 210-230 and 250 takes place via the bus 202. The memory card interface 240 is connected to the peripheral device interface 230. Exchange of data between the personal computer 200 and a memory card MC inserted into the memory card interface 240 takes place via the peripheral device interface 230.

A development process module 300 is stored on the internal storage device 250. The development process module 300 includes a RAW image acquisition module 310, a screen nail reduction module 320, a reduced image analysis module 330, a for-display development module 340, and a finishing development module 350. These modules 310-350 are stored as program modules on the internal storage device 250. The functions of the development process module 300 are realized through execution of the program modules in the development process module 300 by the CPU 210. The development process module 300 has two development process functions, namely, a batch development process in which development processes are carried out on multiple sets of RAW image data respectively stored in multiple RAW image files, and an individual development process in which a development process is carried out on RAW image data stored in a single RAW image file. The internal storage device 250 also includes an intermediate data storing area 410 for temporarily storing data generated during execution of the development process, and a developed image storing area 420 for storing image data which undergoes the development process.

The peripheral device interface 230 is connected to the input devices such as a keyboard and a mouse, the digital still camera 100 (FIG. 1), the printer PRT (FIG. 1) and so on. By operating an input device connected to the peripheral device interface 230, the user can provide instructions to the personal computer 200.

Figure 4:
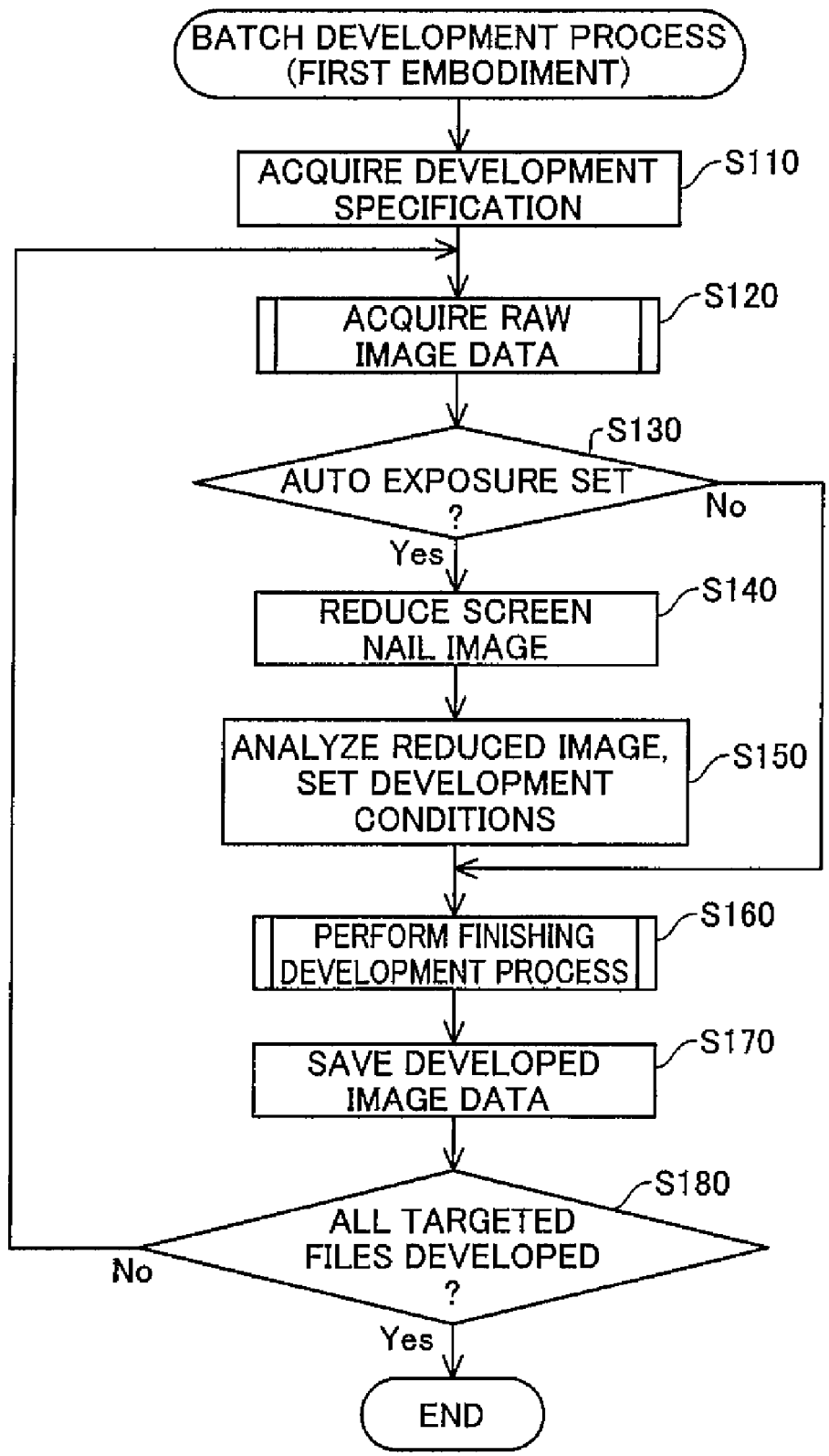
FIG. 4 is a flowchart of the batch development process for carrying out development processes with development conditions collectively set for multiple RAW image files.

FIG. 4 is a flowchart of the batch development process for carrying out development processes with development conditions collectively set for multiple RAW image files. This batch development process is realized by the development process module 300. The batch development process and the individual development process (discussed later) are executed when the user launches development application software for developing RAW image file or instructs development processing in an image processing application program.

In Step S110, the development process module 300 (FIG. 3) acquires an instruction (a development specification) which specifies particular settings for a development process. With the development specification, the RAW image file(s) in which the RAW image data targeted for developing is stored and development conditions are specified. Concretely, the development process module 300 displays on the display unit 220 (FIG. 3) a menu screen prompting the user to enter instructions specifying a developing target (hereinafter such a menu screen is also called the "development settings specifying screen"). While viewing the menu screen displayed on the display unit 220, the user operates the mouse or other pointing device to instruct the personal computer 200 as to particular settings for the development process.

Figure 5:
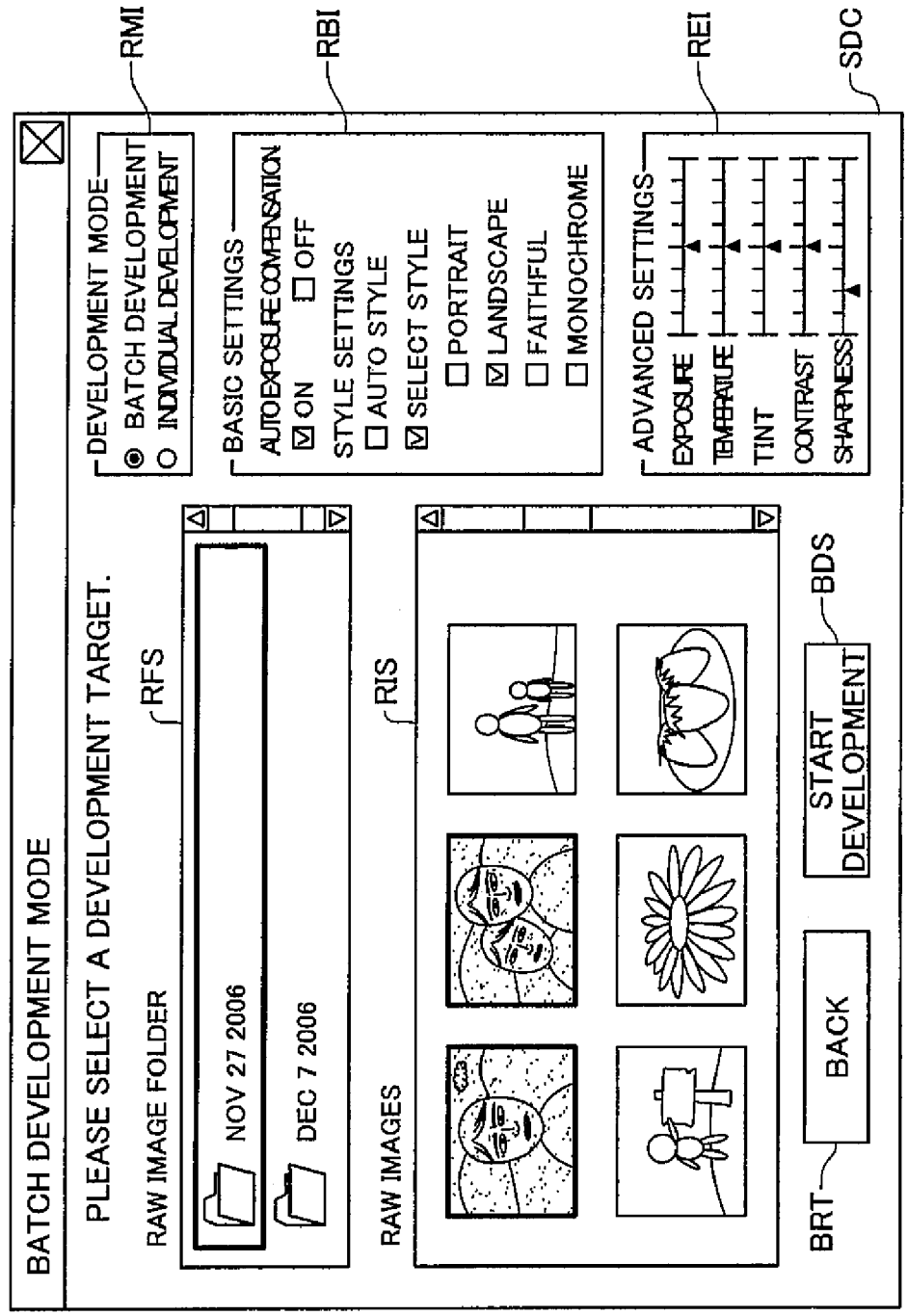
FIG. 5 is an illustration depicting an example of a development settings specifying screen which is displayed in Step S110.

FIG. 5 is an illustration depicting an example of a development settings specifying screen SDC which is displayed in Step S110. The development settings specifying screen SDC includes a folder selection field RPS for selecting a folder in which RAW image files are stored, and an image selection field RIS for selecting a RAW image file in the selected folder. In the example shown in FIG. 5, a folder named "NOV 27 2006" is selected in the folder selection field RFS, and two RAW image files are selected in the image selection field RIS. After the selection of development targets in this way, when the user operates a "START DEVELOPMENT" button BDS, a development process is carried out on the RAW image data stored respectively in the selected RAW image files and developed image data are generated. In the event that the user operates a "BACK" button BRT, the batch development process is suspended.

In addition to these selection fields RFS, RIS, the development settings specifying screen SDC also includes process specifying fields RMI, RBI, and REI for the purpose of specifying development conditions. The user may specify development conditions by operating the pointing device inside these process specifying fields. In the example of FIG. 5, "BATCH DEVELOPMENT" is specified in the mode setting field RMI for selecting operation mode (developing mode) of development process. If the user operates mark of the "INDIVIDUAL DEVELOPMENT", an individual development process, discussed later, is executed instead.

The development conditions normally used in the development process (basic settings) are set with the basic settings field RBI. In the example of FIG. 5, of the basic settings, an item "AUTO EXPOSURE COMPENSATION" is set to ON. "AUTO EXPOSURE COMPENSATION" is an item for specifying whether exposure compensation parameter, which is used in development process, is set automatically. STYLE, which is used to set standard parameters other than exposure compensation parameter used in the development process, is set to "LANDSCAPE." In the advanced settings field REI more detailed development conditions (advanced settings) are specified in addition to basic settings. As the advanced settings, the five items "EXPOSURE", "TEMPERATURE", "TINT", "CONTRAST" and "SHARPNESS" are settable. The detail of these settings will be discussed later. In the example of FIG. 5, since the STYLE of basic setting is set to "LANDSCAPE," the "SHARPNESS" among the advanced settings is set two steps lower.

Figure 6:
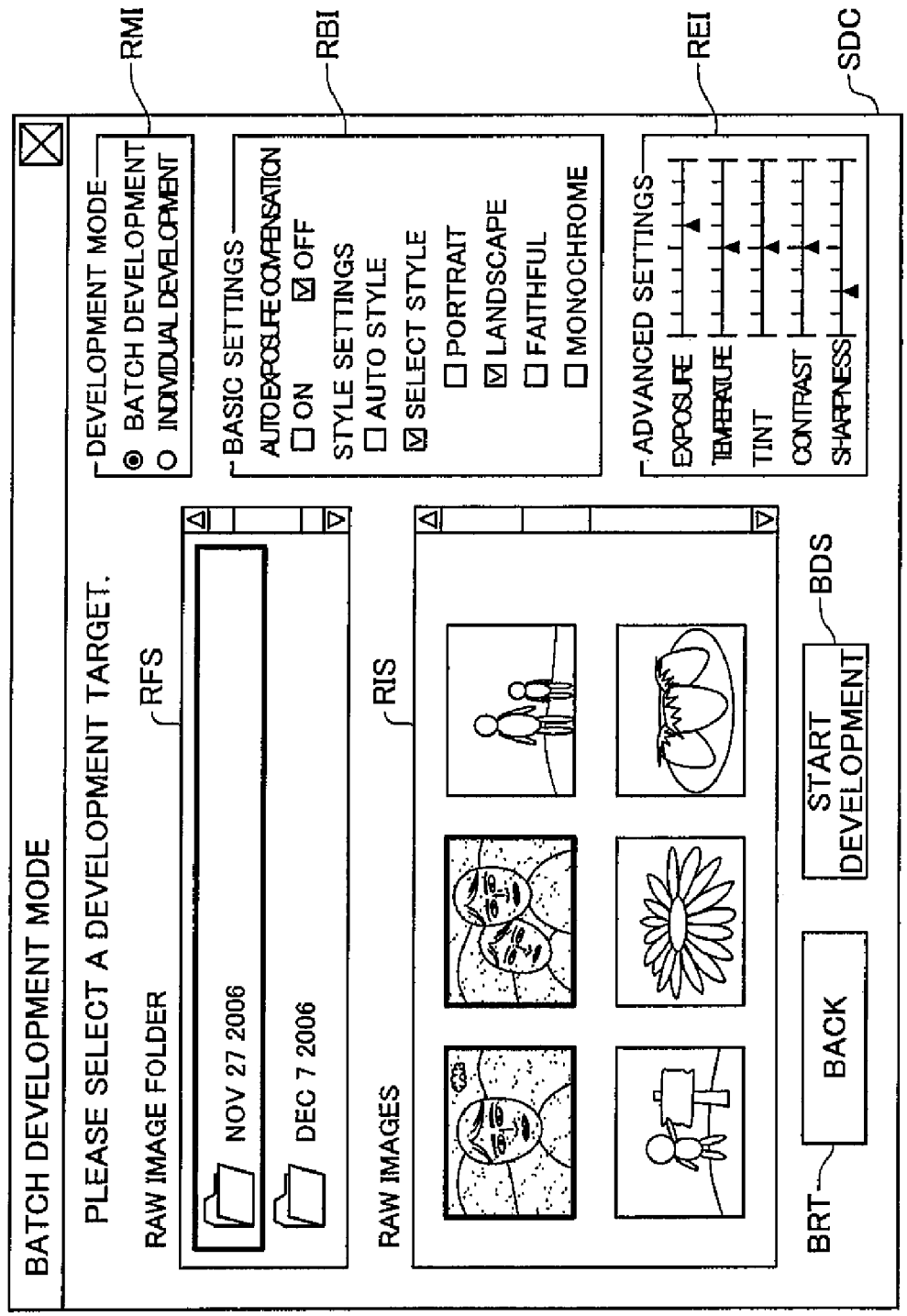
FIG. 6 is an illustration depicting an alternative example to that of FIG. 5, of the development settings specifying screen which is displayed in Step Silo.

FIG. 6 is an illustration depicting an alternative example to that of FIG. 5, of the development settings specifying screen SDC which is displayed in Step S110. The development settings specifying screen SDC of FIG. 6 differs from the development settings specifying screen SDC of FIG. 5 in that among the basic settings "AUTO EXPOSURE COMPENSATION" is set to OFF, and among the advanced settings the "EXPOSURE" setting is set one step higher. From the development settings specifying screen SDC of FIG. 6, if the user operates the "START DEVELOPMENT" button BDS, a development process with the development process conditions which are specified through each item in the advanced settings is carried out on the RAW image data stored respectively in the selected RAW image files, and developed image data are generated.

Figure 7:
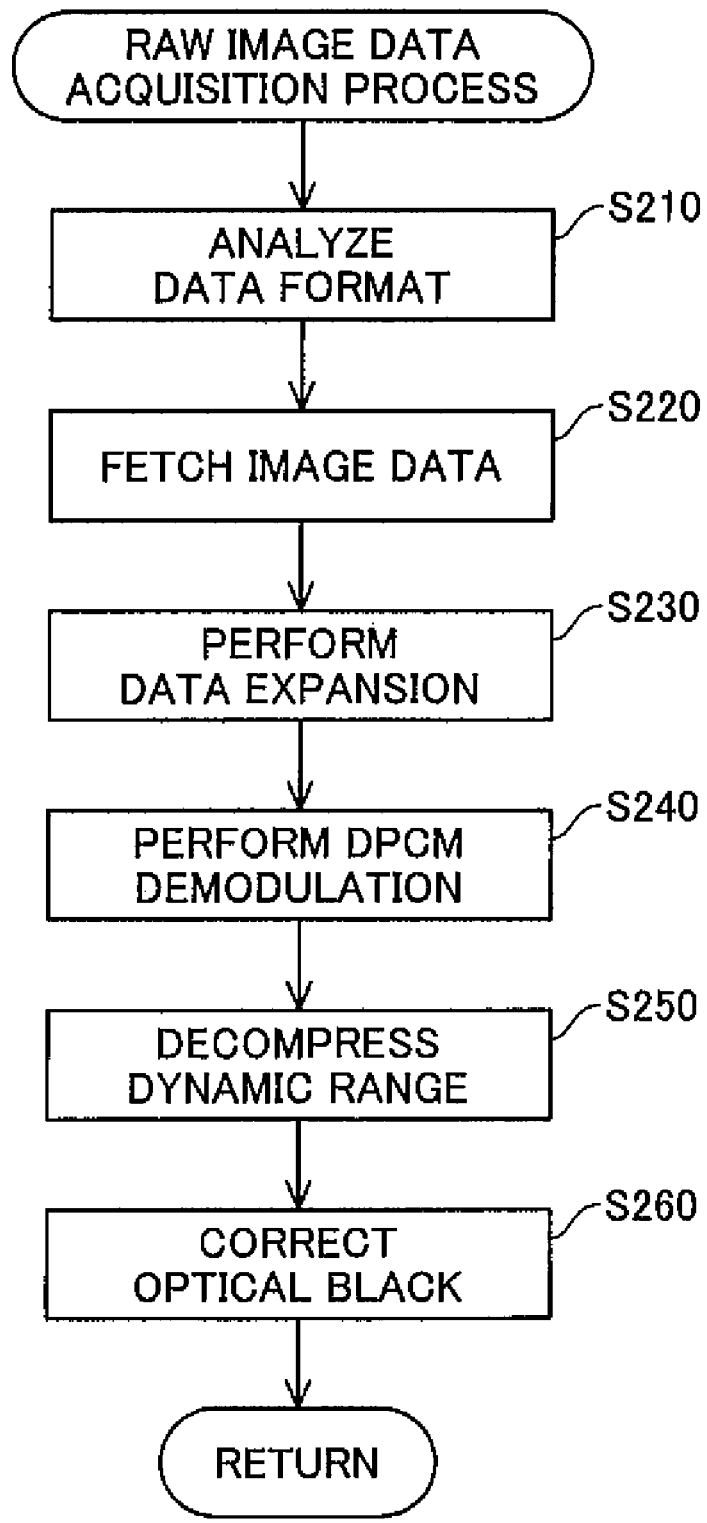
FIG. 7 is an example of a flowchart of the RAW image data acquisition process executed in Step S120.

In Step S120 of FIG. 4, the RAW image acquisition module 310 acquires the RAW image data from one of the RAW image files specified in Step S110. FIG. 7 is an example of a flowchart of the RAW image data acquisition process executed in Step S120. The process flow of FIG. 7 may vary depending on the RAW image file format and other factors.

In Step S210, the RAW image acquisition module 310 analyzes the data format of the RAW image file (FIG. 2). As noted above, the data format of RAW image file differs depending on the manufacturer and model of the digital still camera 100 (FIG. 1). For this reason, the RAW data acquisition module 310 identifies the data format of a RAW image file from information such as the manufacturer and model number stored in the header portion, and determines the stored location and stored format of the RAW image data. In the present embodiment, the data format of a RAW image file is identified on the basis of information stored in the header portion of the RAW image file. For certain RAW image file, it is also possible to identify the data format of a RAW image file from an extension of the RAW image file. According to this method, a file named EPSN0012.ERF is identified from its extension "ERF" as having the data format of Company E, and a file named ADSC0125.ARF is identified from its extension "ARF" as having the data format of Company A, for example.

In Step S220, the RAW image acquisition module 310 fetches the RAW image data stored in the RAW image file and saves the data to the intermediate data storing area 410 (FIG. 3). Next, in Step S230, a data expansion process is carried out on the RAW image data stored into the intermediate data storing area 410. In general, RAW image data is compressed with a reversible compression process (e.g. Huffman coding) for the purpose of reducing data size. In Step S230, a process to convert the compressed data to the data prior to being compressed is carried out (such a process is referred to as "expansion"). Where data is compressed by Huffman coding as in the preceding example, Huffman decompression (expansion) is carried out to restore the original data from the Huffman encoded data.

In Step S240, the RAW image acquisition module 310 performs inverse transformation (DPCM demodulation) of the differential pulse code modulation (DPCM) carried out at the time of the RAW image data generation. Next, in Step S250, the compressed dynamic range is decompressed.

In Step S260, the RAW image acquisition module 310 executes an optical black correction. The optical black correction is a process for subtracting an offset from the RAW data, which is added to the RAW data for the purpose of correcting a property of the imaging device, the property whereby sensed values do not go to zero even incident light intensity is in fact zero. In this process, the offset is subtracted from tone values of the pixels contained in the RAW image data. For the subtracted offset, a value stored in the header portion of the RAW image file (FIG. 2) may be used for example. In general, the output of an imaging device includes a noise component, and where this signal is subjected to A/D conversion. The A/D conversion is performed typically including the noise component. When the incident light intensity is zero, if the corresponding value of the RAW data is set to zero, positive noise component is recorded as positive value in the RAW data. On the other hand, negative noise component is clamped to zero. As a result, the noise component is recorded inaccurately. The optical black correction is intended to prevent RAW data from having resultant positive value corresponding to noise which undergoes smoothing. That is, where it is assumed for example that a value of 64 is the value of RAW image corresponding to incident light intensity of zero, for positive noise +1 a value of 65 is recorded, and for negative noise −1 a value of 63 is recorded. Subsequent subtraction of an offset value of 64 gives +1 and −1 respectively. As a result, it is possible to process correctly. This solve the problem of increased data size resulting from added bit for recording width when a sign is appended to the RAW data owing to such negative noise. Data on which optical black correction is performed in this way is computed with signed value that is able to represent negative value.

Thus, RAW image data representing intensity of light incident on pixels of the imaging device of the digital still camera 100 is acquired from the RAW image file. Hereinafter, the term "RAW image data" is used to mean RAW image data which represents intensity of light incident on pixels of the imaging device as described above. Since RAW image data represents an image of a subject formed on the imaging device, such RAW image data is also simply called as a "RAW image" hereinafter. In RAW image data, tone values of pixels are typically represented by data on 12-bits or more. Accordingly, the arithmetic processes in the development process are typically carried out on a signed 16-bits value, so as to avoid dropout of information contained in the RAW image data. For this reason, hereinafter unless specifically indicated otherwise, the arithmetic processes are assumed to be carried out on 16-bits value. Of course, bit length in arithmetic processes is not limited to 16-bits, and other bit length is acceptable as well.

In Step S130 of FIG. 4, the development process module 300 (FIG. 3) determines whether auto exposure compensation is set. Specifically, the development process module 300 determines whether auto exposure compensation is set by referring the development specification acquired in Step S110. If it is determined that auto exposure compensation is set, process advances to Step S140. On the other hand, if it is determined that auto exposure compensation is not set, the process goes to Step S160. In the example of FIG. 5, since the "AUTO EXPOSURE COMPENSATION" setting is ON, in Step S130 it is determined that auto exposure compensation is set, and Step S140 is executed. On the other hand, in the example of FIG. 6, since the "AUTO EXPOSURE COMPENSATION" setting is OFF, in Step S130 it is determined that auto exposure compensation is not set, and Step S160 is executed.

In Step S140, the screen nail reduction module 320 resizes the screen nail which is represented by the screen nail image data (FIG. 2), and generates resized image of prescribed size, or resolution. The resized image so generated is used for image analysis, discussed later. In the present embodiment, an image of QVGA size (320×240 pixels) is generated as the resized image. By giving the resized image a prescribed resolution, image analysis can be accomplished easily regardless of whether screen nail image resolution is high or low. The resized image of which resolution is other than 320×240 pixels may also be used. It is sufficient for the resolution of the resized image to be of a size suitable for image analysis. In order to reduce the arithmetic processing load for image analysis, it is preferable for resized image resolution to be as small an image as possible, provided that it is of a size suitable for image analysis. Where processing speed permits, it may be acceptable to process screen nail images with their original size without a resizing process. In this case, the process of Step S150 is executed directly without performing the process of Step S140.

FIGS. 8A through 8C are illustrations depicting generation of a resized image from a screen nail image. In the example of FIG. 8A, the screen nail image is an image of 3008×2000 pixels. In the first embodiment, a resized image of 320×240 pixels is generated. Since the screen nail image is typically larger (i.e. higher in resolution) than the resized image, reduction process is performed. For this reason, resized image is also referred as reduced images hereinafter. To generate the reduced image with aspect ratio of 4:3, areas equivalent to 172 pixels each are cropped from the left and right edges, and areas equivalent to one pixel each are cropped from the upper and lower edges of the screen nail image shown in FIG. 8A, to produce an image of 2664×1998 pixels shown in FIG. 8B. Next, the image of 2664×1998 pixels is reduced by 1/8.325 to produce an image of the 320×240 pixels shown in FIG. 8C. Image reduction is carried out using the bilinear method, for example. It is also possible to use a simple pixel skipping method in which the image is reduced by skipping pixels. In preferred practice, during image reduction a low-pass filter is applied to reduce the high-frequency component of spatial frequency in order to suppress aliasing.

In the case that the screen nail image data is in JPEG format, it is possible to reduce the screen nail image by generate blocks of smaller pixel number (e.g. 5×5 pixels, 4×4 pixels, or 3×3 pixels) rather that generating blocks of 8×8 pixels through decompression of the JPEG format data.

Where pixel counts of the screen nail images differ, the cropped areas and reduction ratio may be modified appropriately to generate a reduced image of 320×340 pixels. For example, where the screen nail image is 1504×1000 pixels, areas equivalent to 86 pixels at left and right, and an area equivalent to one pixel at bottom are cropped. The cropped image is reduced by 1/4.1625. Where the screen nail image is 640×424 pixels, areas equivalent to 38 pixels at left and right, and an area equivalent to one pixel at bottom is cropped. The cropped image is reduced by 1/1.7625. Since the reduced image is generated for image analysis, it is preferable to reduce the image in its entirety. For this reason, it is preferable to crop the upper, lower, left, and right edges uniformly so that, as a result of cropping, the center of the original image are left and to crop so as to remain a larger area of the original image as possible. Where cropping an image of 3:2 aspect ratio to an image of 4:3 aspect ratio, the left and right edges of the image is cropped uniformly.

In Step S150 of FIG. 4, the reduced image analysis module 330 analyzes the reduced image generated in Step S140. Then, the reduced image analysis module 330 sets development conditions based on the analysis results of the reduced image. Specifically, histogram analysis of the reduced image is carried out, and on the basis of the results of histogram analysis, an exposure compensation coefficient, which is multiplied to the RGB tone values (RGB values) of the RAW image, is computed.

Figure 9A:
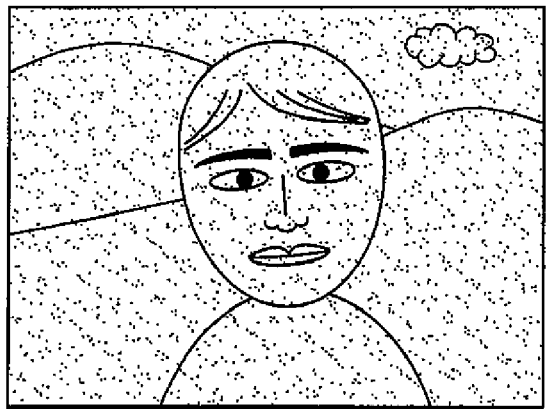
FIGS. 9A through 9D are illustrations depicting histogram analysis performed in Step S140.
Figure 9B:
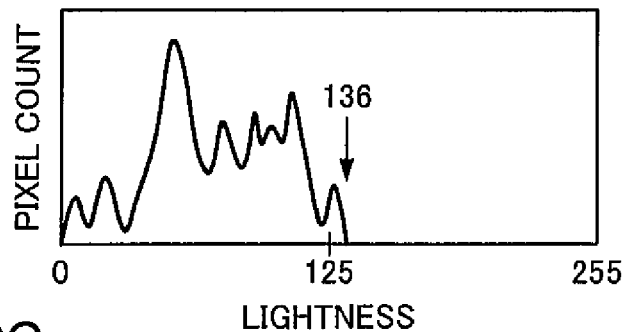
Figure 9C:
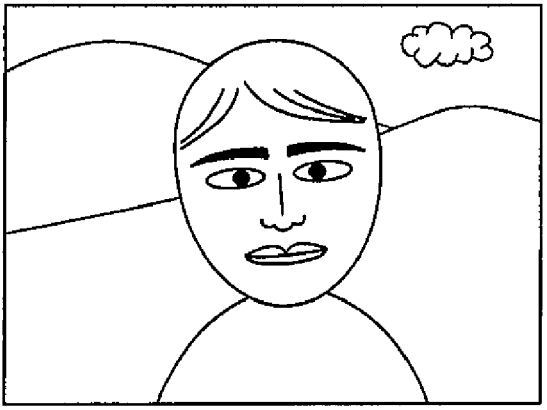
Figure 9D:
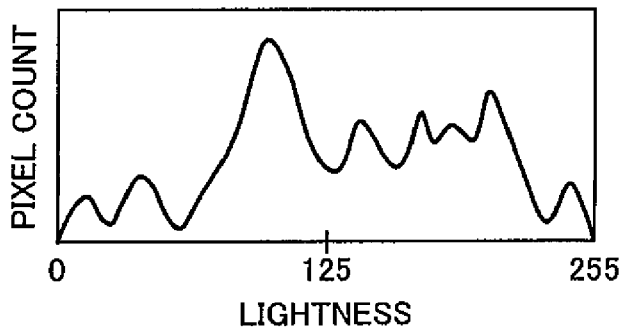

FIGS. 9A through 9D are illustrations depicting histogram analysis performed in Step S140. In FIGS. 9A and 9C respectively depict an insufficiently exposed (underexposed) image and a correctly exposed image. FIG. 9B is a graph showing the results of histogram analysis of the underexposed image shown in FIG. 9A. FIG. 9D is a graph showing the results of histogram analysis of the correctly exposed image shown in FIG. 9C. In FIG. 9B and FIG. 9D, the horizontal axis represents lightness (tone value), and the vertical axis represents pixel count.

As shown in FIG. 9B, in an underexposed image, the pixel count of the bright region of the image is small. In the example of FIG. 9B, out of the entire lightness range (0 to 255), most pixels are distributed in the low lightness region (0 to 136). The pixel count in the high lightness region (137 to 255) is substantially zero. On the other hand, as shown in FIG. 9D, in a correctly exposed image, pixels are distributed throughout the entire lightness range (0 to 255). Accordingly, it can be determined that, in order to transform the underexposed image shown in FIG. 9A to the correctly exposed image shown in FIG. 9C, lightness of 136 should be transformed to lightness of 255, in order to make the shape of the histogram extend throughout the entire range of lightness as shown in FIG. 9D. The target shape of the histogram can be specified as the pixel distribution range.

Typically, the screen nail image is generated by performing gamma correction process to the RAW image. Specifically, lightness Y of a screen nail image are given by the following expression (1), using lightness X of the RAW image.

$$Y = X^{1/\gamma} \quad (1)$$

Consequently, in order to transform the underexposed image shown in FIG. 9A to the correctly exposed image shown in FIG. 9C, an exposure compensation coefficient A in the lightness of the RAW image is set to the value represented by the following expression (2).

$$A = (255/136)^{\gamma} \quad (2)$$

In ordinary gamma correction, $\gamma$ is set to 2.2. Thus, the exposure compensation coefficient A in the lightness of the RAW image shown in FIG. 9A is set to approximately 4.0.

In the first embodiment, the exposure compensation coefficient is computed from the results of histogram analysis. It is also possible to derive the exposure compensation coefficient by some other method instead. For example, where the reduced image analysis module 330 has a function of face detection, the exposure compensation coefficient may be computed on the basis of lightness of the face detected from the reduced image. Specifically, lightness of areas having saturation and hue corresponding to flesh-color around the nose, mouth, and eyes is evaluated. Then, the exposure compensation coefficient is calculated such that lightness of the evaluated areas lies within the preferred range of between 180 and 200 for lightness of flesh color. Bringing lightness to within the range of between 180 and 200 is equivalent to adjusting hue of skin color to the ideal hue range of flesh color, and adjusting lightness of skin color to lightness range between 180 and 200. Of course, it is acceptable to perform adjustments for hue and saturation as well.

In Step S160 of FIG. 4, the finishing development module 350 executes a development process on the basis of the development settings set in Step S110 and the development conditions set in Step S150. FIG. 10 is a flowchart of the finishing development process executed in Step S160.

In Step S302, the finishing development module 350 performs gain adjustment process (pregain). Specifically, the finishing development module 350 multiplies the pixel values (RGB values) of each pixel constituting the RAW image by pregain settings. The pregain settings are coefficients set with reference to the characteristics of the imaging device of the digital still camera 100. For the pregain settings, values stored in the header portion of the RAW image file (FIG. 2) may be used. In most cases, the pregain settings are multiplied only to the R and G pixel values.

In Step S304, the finishing development module 350 performs a pixel interpolation process (demosaicing process) for printing purposes. The pixel interpolation process is a process for generating through interpolation the color component information which is missing due to the arrangement of the multiple sensor elements provided to the imaging device of the digital still camera 100. Typically, in an imaging device with RGB primary color filters, the color filters are arranged in a checkerboard pattern (also called the Bayer arrangement) on the sensor elements. Thus, each of the pixels of a RAW image corresponding to the sensor elements of the imaging device has color information of only one of the colors R, G or B. For example, where a given pixel is an R pixel, G and B color information at that location is missing. In the pixel interpolation process, this missing color information is derived through adaptive interpolation from the color information of surrounding pixels. In this adaptive interpolation, the direction of an edge of the image is detected and pixel interpolation is carried out along that edge of the image, in order to minimize decline in image quality due to interpolation error, tinting, and so on.

In Step S306, the finishing development module 350 carries out white balance adjustment process. The white balance adjustment process is carried out by multiplying coefficients to the RGB tone values of the pixels constituting a RAW image (hereinafter these respective tone values are also be referred to as R value, G value, and B value). The coefficients are set in accordance with targeted white balance. Specifically, coefficients Ar and Ab are multiplied respectively to the R value and B value of the each pixel of the RAW image. These coefficients Ar and Ab is determined on the basis of the white balance settings described in the header portion of the RAW image file, or on the basis of the "TEMPERATURE" setting set with the process settings specifying screen SDC (FIGS. 5 and 6). These coefficients Ar and Ab may also be computed from the result of image analysis.

In Step S308, the finishing development module 350 performs the exposure compensation process. The exposure compensation process is carried out by multiplying a same exposure compensation coefficient Ga to the respective R value, G value, and B value of each pixel constituting the RAW image. Multiplying the respective R value, G value, and B value by the same coefficient in this way is equivalent to increasing/decreasing the level of incident light on the imaging device provided to the digital still camera 100. Thus, exposure compensation provides an effect analogous to change of the exposure during shooting with the digital still camera 100. Where "AUTO EXPOSURE COMPENSATION" is set to ON in the process settings specifying screen SDC (FIGS. 5 and 6), the exposure compensation coefficient Ga is determined through histogram analysis of the reduced image as described previously. On the other hand, where "AUTO EXPOSURE COMPENSATION" is set to OFF, the exposure compensation coefficient Ga is determined according to the "EXPOSURE" setting in the advanced settings.

In Step S310, the finishing development module 350 performs a color reproduction process. Typically, the spectral sensitivity of an imaging device differs from the spectral sensitivity of the human eye. For this reason, color represented by RGB values of a RAW image differs from color observed by the human eye. Thus, the purpose of the color reproduction process is to adjust the RGB values of the RAW image so as to match the visual sensitivity of the human eye, in order to reproduce correct color. The color reproduction process is carried out by multiplying a 3×3 matrix having correction coefficients as an element (a 3×3 matrix operation), to a three-dimensional vector having the R value, G value, and B value as respective components. Since the correction coefficients differ by camera model, the camera model is identified through analysis of the RAW image file format, and a set of correction coefficients selected from ones prepared in advance for each model is used.

In Step S312, the finishing development module 350 carries out a hue correction process. Like the color reproduction process, hue correction process is carried out through a 3×3 matrix operation. The elements of the 3×3 matrix operation used in the hue correction process are established on the basis of the target hue rotation angle. The hue rotation angle is determined on the basis of the "TINT" setting set with the process settings specifying screen SDC (FIGS. 5 and 6).

In Step S314, the finishing development module 350 carries out a tone correction process. In the tone correction process, tone values of the RAW image are corrected using a tone curve which represents relationships of input tone values to output tone values. The tone curve is determined on the basis of the "STYLE" setting in the process settings specifying screen SDC (FIGS. 5 and 6). Where the "CONTRAST" setting in the advance settings is modified, it is determined on the basis of the "CONTRAST" setting status.

In Step S316, the finishing development module 350 carries out the tone correction process (gamma correction) for the purpose of correcting tone characteristics. A value which corresponds to the class of image data subsequent to development is used as the gamma value ($\gamma$) for carrying out gamma correction process. For this reason, through gamma correction the tone characteristics of the RAW image are corrected to tone characteristics which correspond to the class of image data subsequent to development.

In Step S318, the finishing development module 350 carries out a color conversion process. The color conversion process is a process for converting the RGB values of the RAW image (which represent color information in the RGB space) to color component values in the color space used by the developed image (e.g. the YCbCr space). Similar to the color reproduction process (Step S310) and the hue correction process (Step S312), the color conversion process is carried out through a 3×3 matrix operation.

In Step S320, the finishing development module 350 carries out a noise elimination process. The noise elimination process is a process for eliminating the noise component present in the image and producing a clear image. The noise elimination process can be carried out using a Gaussian filter, for example.

In Step S322, the finishing development module 350 carries out a sharpness adjustment process. Sharpness adjustment process (i.e. an edge sharpening process) is a process for correcting areas of blurred contours in an image due to the effects of the optical low-pass filter provided to the imaging device, making the image crisp and sharp. The noise elimination process of Step S320 and the sharpness adjustment process of Step S322 may also be carried out prior to the tone correction process in Step S314.

In this way, the finishing development module 350 generates developed image data of JPEG format (image data for printing) from an image (developed image) generated by carrying out the finishing development process on the RAW image. Where image data of JPEG format is generated as the developed image data, the 16-bit data used in the arithmetic processes of the finishing development process are converted to 8-bit data when the developed image data is generated. It is not necessary to use the JPEG format as the format of the developed image data. In general, the format of the developed image data may be any of the standard image data formats, such as the TIFF format or BMP format. After generating the developed image data, the finishing development process of FIG. 10 terminates, and the process returns to the batch development process of FIG. 4. In Step S170, the developed image data generated through the finishing development process is saved to the developed image storing area 420.

In Step S180, the development process module 300 (FIG. 3) determines whether all of the RAW image files specified as development targets (targeted files) have been developed. If it is determined that all of the targeted files are developed, the batch development process terminates. On the other hand, if it is determined that not all of the targeted files are developed, i.e. there is one or more undeveloped RAW image files, process returns to Step S110. Steps S110 through S180 are executed repeatedly until all RAW image files specified as development targets are developed.

Figure 11:
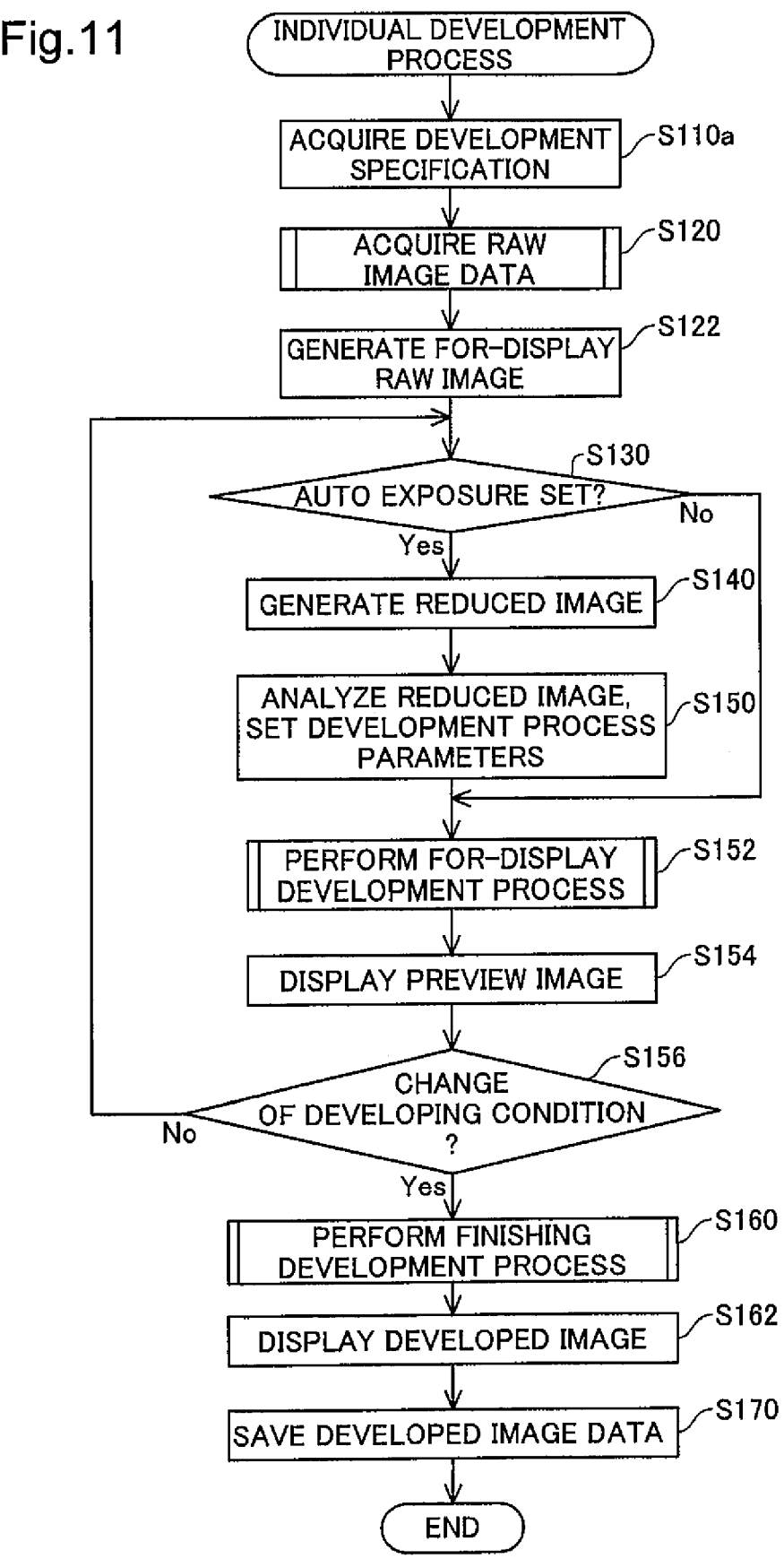
FIG. 11 is a flowchart of the individual development process, in which the development process is carried out with development conditions set to an individual RAW image file.

FIG. 11 is a flowchart of the individual development process, in which the development process is carried out with development conditions set to an individual RAW image file. The individual development process shown in FIG. 11 differs from the batch development process shown in FIG. 4 in that Step S110 is replaced with Step S110a, Step S122 is inserted between Step S120 and Step S130, three steps S152 through S156 are inserted between Step S150 and Step S160, and Step S162 is inserted between Step S160 and Step S170. In other respects the process is similar to the batch development process.

Figure 12:
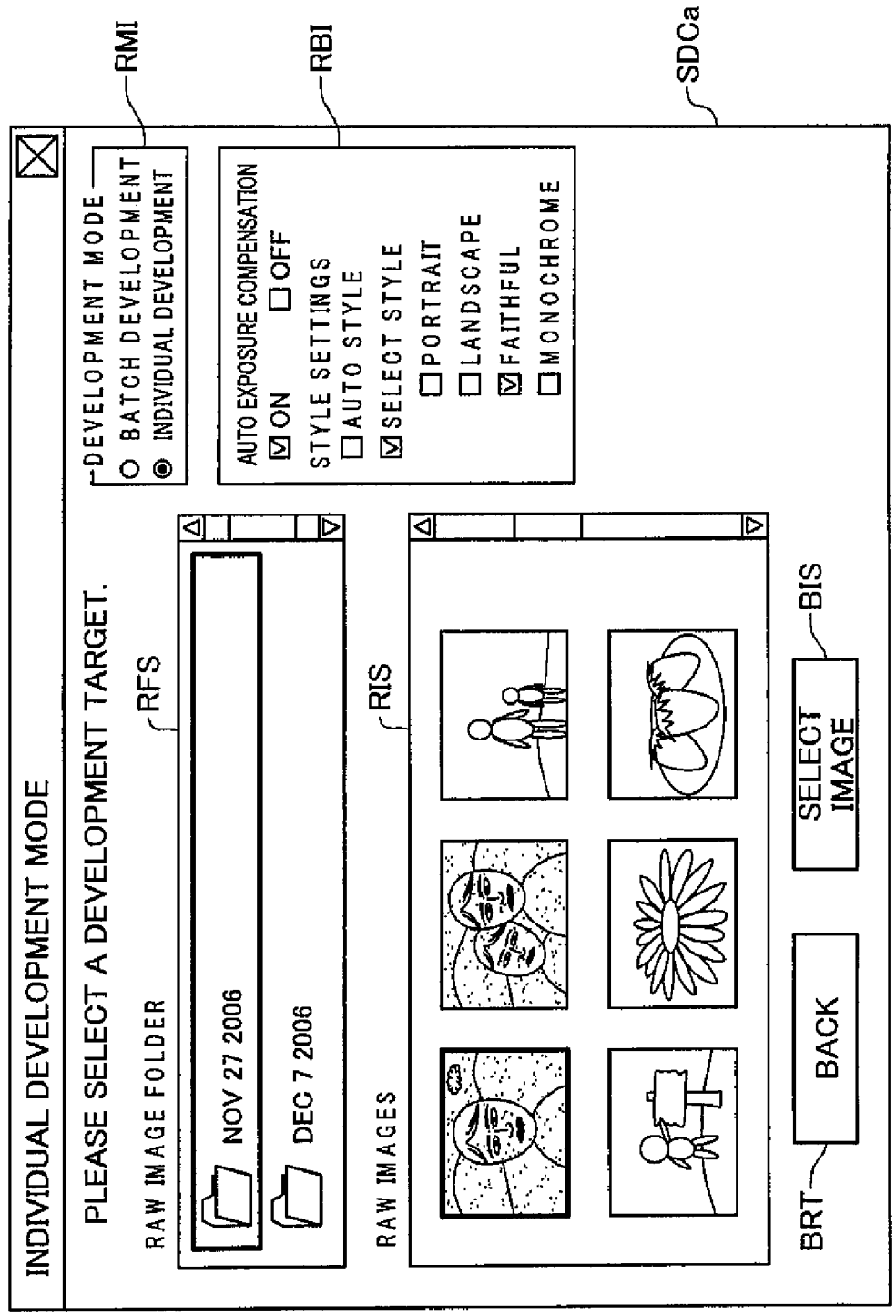

In Step S110a, the development process module 300 (FIG. 3) acquires a development assignment in the same manner as in Step S110 in FIG. 4. FIG. 12 is an illustration depicting an example of a development settings specifying screen SDCa which is displayed in Step S110a. The development settings specifying screen SDCa of the individual development process shown in FIG. 12 differs from the development settings specifying screen SDC of the batch development process (FIGS. 5 and 6) in that the advanced settings field REI is omitted, and a "SELECT IMAGE" button BIS replaces the "START DEVELOPMENT" button BDS. As shown in FIG. 12, in the individual development process development settings specifying screen SDCa, a single RAW image file targeted for an individual development process is selected in the image selection field. After the selection of a RAW image file, when the user operates the "SELECT IMAGE" button BIS, the selected RAW image file is specified as the development target and the settings set with the development settings specifying screen SDCa are used as the development process settings. In the example of FIG. 12, "AUTO EXPOSURE COMPENSATION" is set to ON, and the STYLE is set to "FAITHFUL" in which standard development conditions are applied.

In Step S122, from the RAW image data acquired in Step S120, the for-display development module 340 (FIG. 3) generates a for-display RAW image used for showing the development result on the display unit 220. The for-display RAW image is an image generated by performing a pregain and a pixel interpolation process on the RAW image. The generated for-display RAW image is then saved to the intermediate data storing area 410 (FIG. 3). It is not necessary to generate the for-display RAW image in Step S122 in the same way as in Step S160 of the finishing development process. Since the for-display image is typically a temporary image only used for displaying, an image of lower quality than the finishing developed image such as image of on the order of VGA size (640×480 pixels) to XGA size (1024×768 pixels) may be acceptable. In contrast, the RAW image targeted for developing is an image of 6 million or 10 million pixels, so image reduction at a high reduction ratio is carried out to generate a for-display image. For this reason, the for-display image may be generated not through the advanced, high quality pixel interpolation process (Step S304) like that employed in Step S160 of the finishing development process, but rather through simpler and faster pixel interpolation process. For example, the for-display RAW image may be generated with pixel interpolation involving the use of R, G1, B, and G2 values adjacent in the horizontal and vertical directions, by taking the arithmetic average for G, and assigning RGB values for single pixels using the values R, B, (G1+G2)/2 to generate reduced image data which is reduced by half vertically and horizontally.

Figure 13:
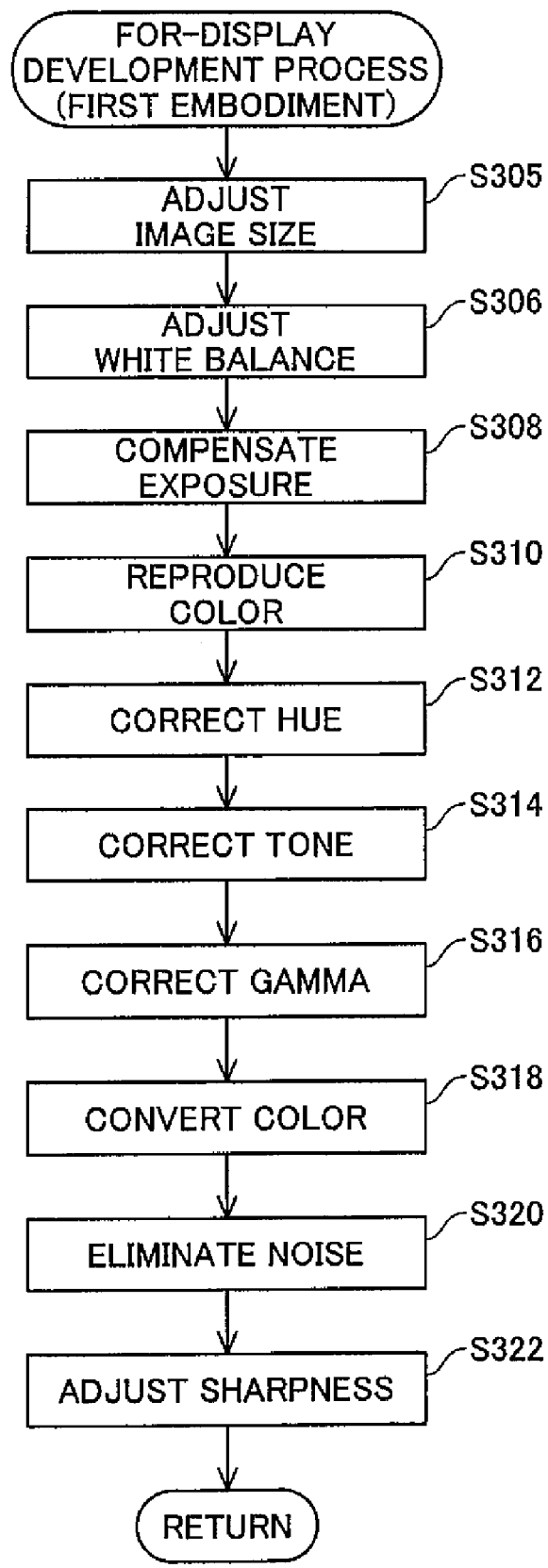
FIG. 13 is a flowchart of the for-display development process which is executed in Step S152.

In Step S152, a for-display development process is carried out on the for-display RAW image to generate a for-display image as a developed image. FIG. 13 is a flowchart of the for-display development process which is executed in Step S152. The for-display development process shown in FIG. 13 differs from the finishing development process shown in FIG. 10 in that the pregain process (Step S302) and the pixel interpolation process (Step S304) carried out during generation of the for-display RAW image (Step S122 in FIG. 11) are omitted, and an image size adjustment process (Step S305) is appended before the white balance adjustment process (Step S306). In other respects the process is the same as the finishing development process.

In Step S305, the for-display development module 340 performs adjustment of size (image size adjustment) of the for-display RAW image stored into the intermediate data storing area 410. Specifically, by carrying out reduction or cropping, size of the for-display RAW image is changed to a size appropriate for display on the display unit 220 (e.g. 640×480 pixels). In the first embodiment, image size adjustment is carried out in the for-display development process shown in FIG. 3. The image size may also be adjusted during generation of the for-display RAW image in Step S122 of FIG. 11 instead.

Next, in Steps S306 through S322, the reduced for-display RAW image successively undergoes the processes of white balance adjustment, exposure compensation, color reproduction, hue correction, tone correction, gamma correction, color conversion, noise elimination, and sharpness adjustment in the same manner as in the finishing development process (FIG. 10). By carrying out these processes on the for-display RAW image, a developed image for display use (preview image) is generated. The development conditions acquired in Step S110a are used for the generation of the preview image. After generating the preview image, the process returns to the individual development process of FIG. 11, and in Step S154 the preview image is displayed on the display unit 220. In this way, the for-display RAW image is reduced prior to the processes of Steps S306 through S322. As a result, the processing load entailed in performing these processes on the for-display image becomes smaller in proportion to the smaller pixel number. That is, there is significant advantage that the processes may be performed vary fast, and user's waiting time for carrying out the development process can be reduced.

Figure 14:
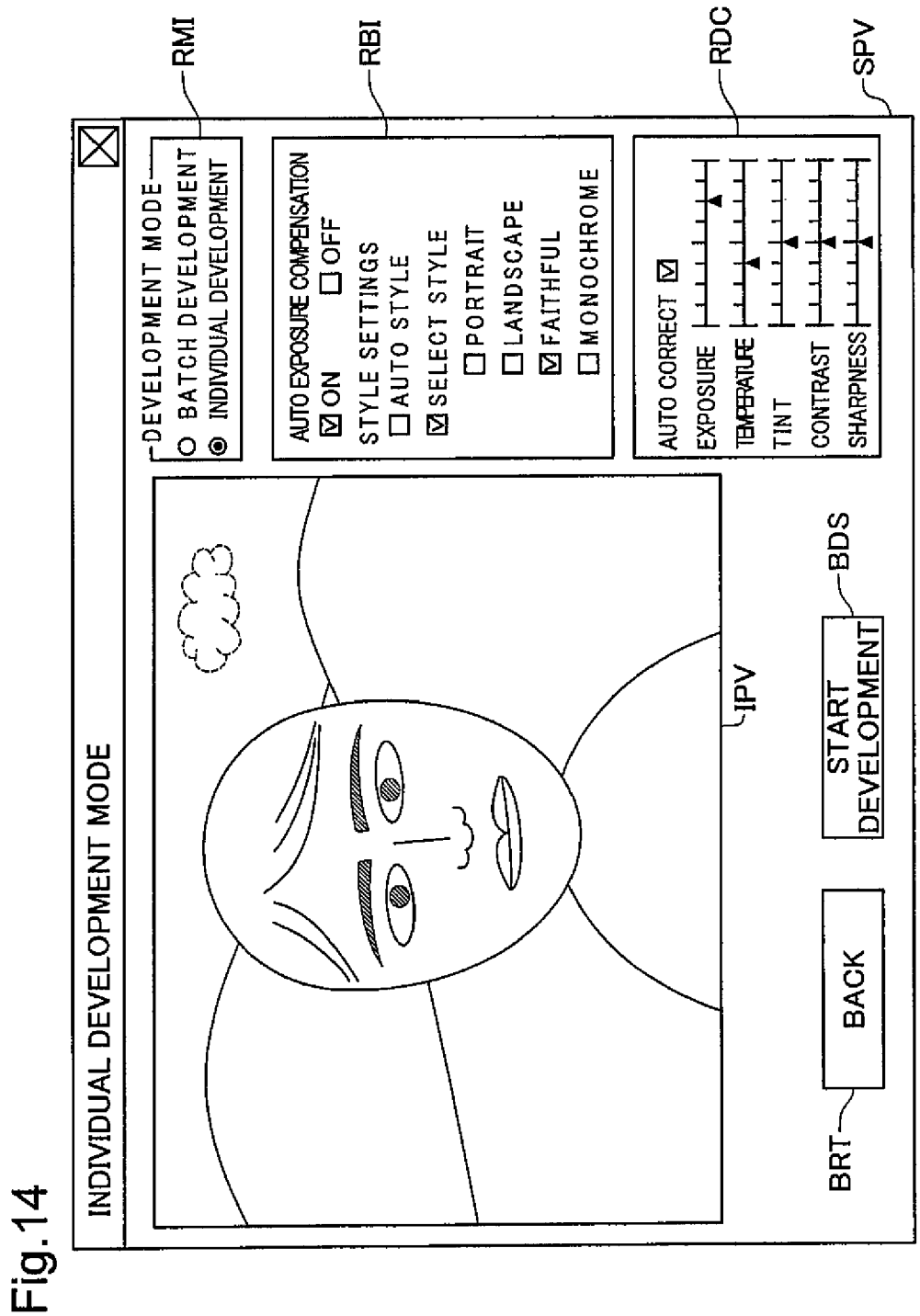
FIG. 14 is an illustration depicting a development result preview screen SPV which is displayed in Step S154.

FIG. 14 is an illustration depicting a development result preview screen SPV which is displayed in Step S154. The development result preview screen SPV displays a large preview image IPV which represents the result of a development process in accordance with the settings in FIG. 12. In addition to the settings field RBI for setting development conditions provided to the development settings specifying screen SDCa of FIG. 12, the development result preview screen SPV is also provided with a development process condition display field RDC which displays the development process conditions used in the for-display development process. The development process condition display field RDC shows settings for the items of "EXPOSURE", "TEMPERATURE", "TINT", "CONTRAST", and "SHARPNESS". Also displayed in the development process condition display field RDC is a checkbox indicating whether auto correction is carried out. In the development settings specifying screen SDCa shown in FIG. 12, "AUTO EXPOSURE COMPENSATION" is set to ON. So, in the development process condition display field RDC the results obtained through analysis for auto correction is displayed as default. If it is determined that ideally exposure is two steps brighter and color temperature is one step lower, as shown in FIG. 14 a triangular cursor is set at a location indicating exposure compensation to make the image two steps brighter, and the AUTO CORRECTION check box is checked. Also, for color temperature, the cursor is set one step towards the low-temperature side.

When the user operates the development result preview screen SPV, the development process module 300 (FIG. 3) acquires the operation. In Step S156 of FIG. 11, the development process module 300 determines whether the operation to the development result preview screen SPV is an operation to instruct modification of the development conditions. If the user's operation instructs modification of development conditions, the process returns to Step S130, and Steps S130 through 156 is executed repeatedly. On the other hand, if the user's operation does not instruct modification of development conditions, i.e. in the event that the user operates the "START DEVELOPMENT" button BDS, the process advances to Step S160.

Figure 15:
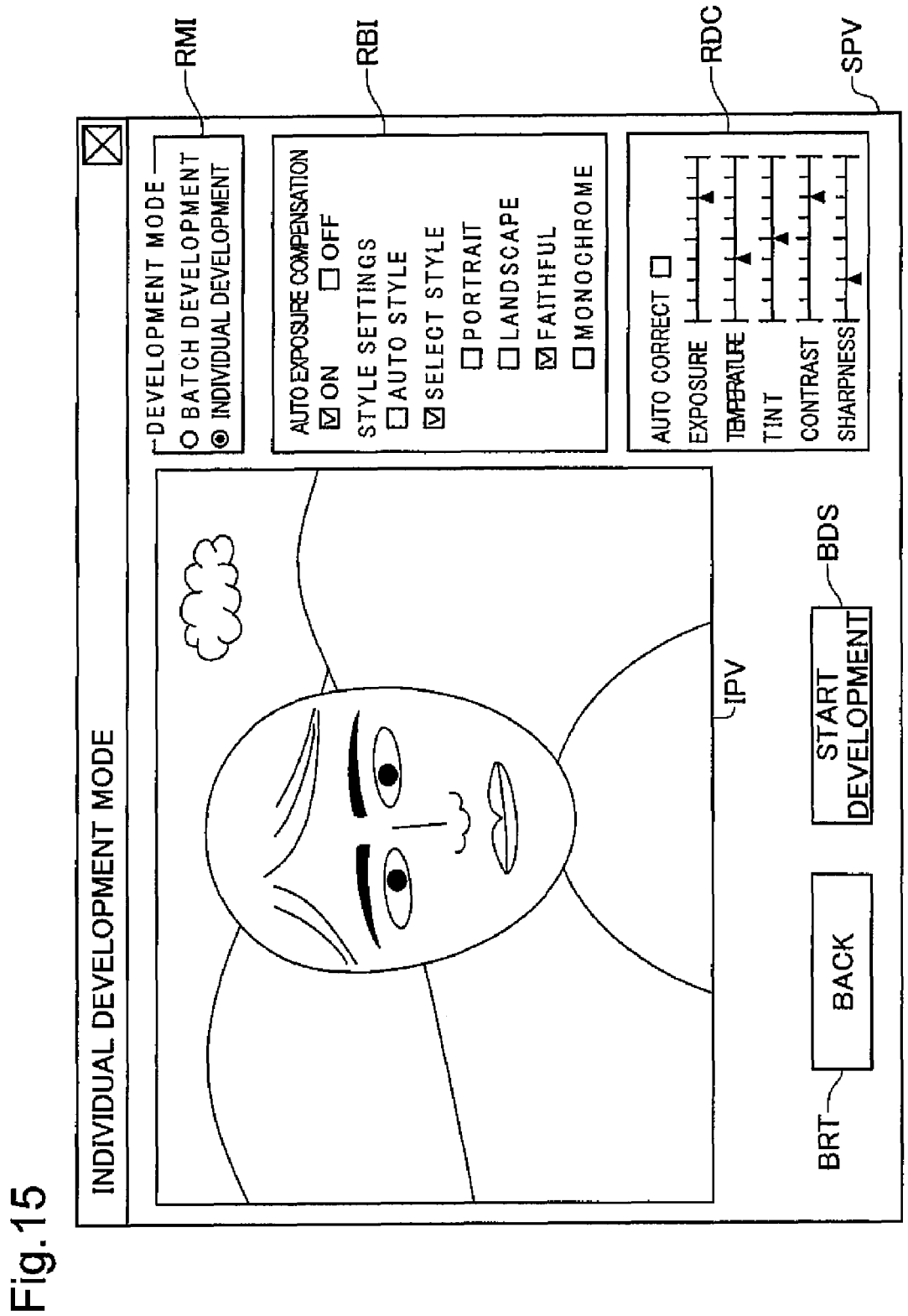
FIG. 15 is an illustration depicting an example of user's modification of development conditions from the development result preview screen SPV of FIG. 16 depicts an example of a developed image display screen SDI which is displayed on the display unit in Step S162.

FIG. 15 is an illustration depicting an example of user's modification of development conditions from the development result preview screen SPV of FIG. 14. In the example of FIG. 15, by operating development condition display field RDC the user set CONTRAST two steps higher, and set SHARPNESS two steps lower, than the settings shown in FIG. 14. When the user modifies the development conditions in the manner shown in FIG. 15, in Step S152 a for-display process is re-executed on the basis of the modified conditions, and the preview image IPV changes to a re-developed image with higher contrast and lower sharpness than that shown in FIG. 14. Also, the checkmark in the AUTO CORRECTION checkbox of the development condition display field RDC is removed. When the user operates the "START DEVELOPMENT" button BDS in the development result preview screen SPV of FIG. 15, the finishing development process (Step S160) is carried out on the RAW image.

Figure 16:
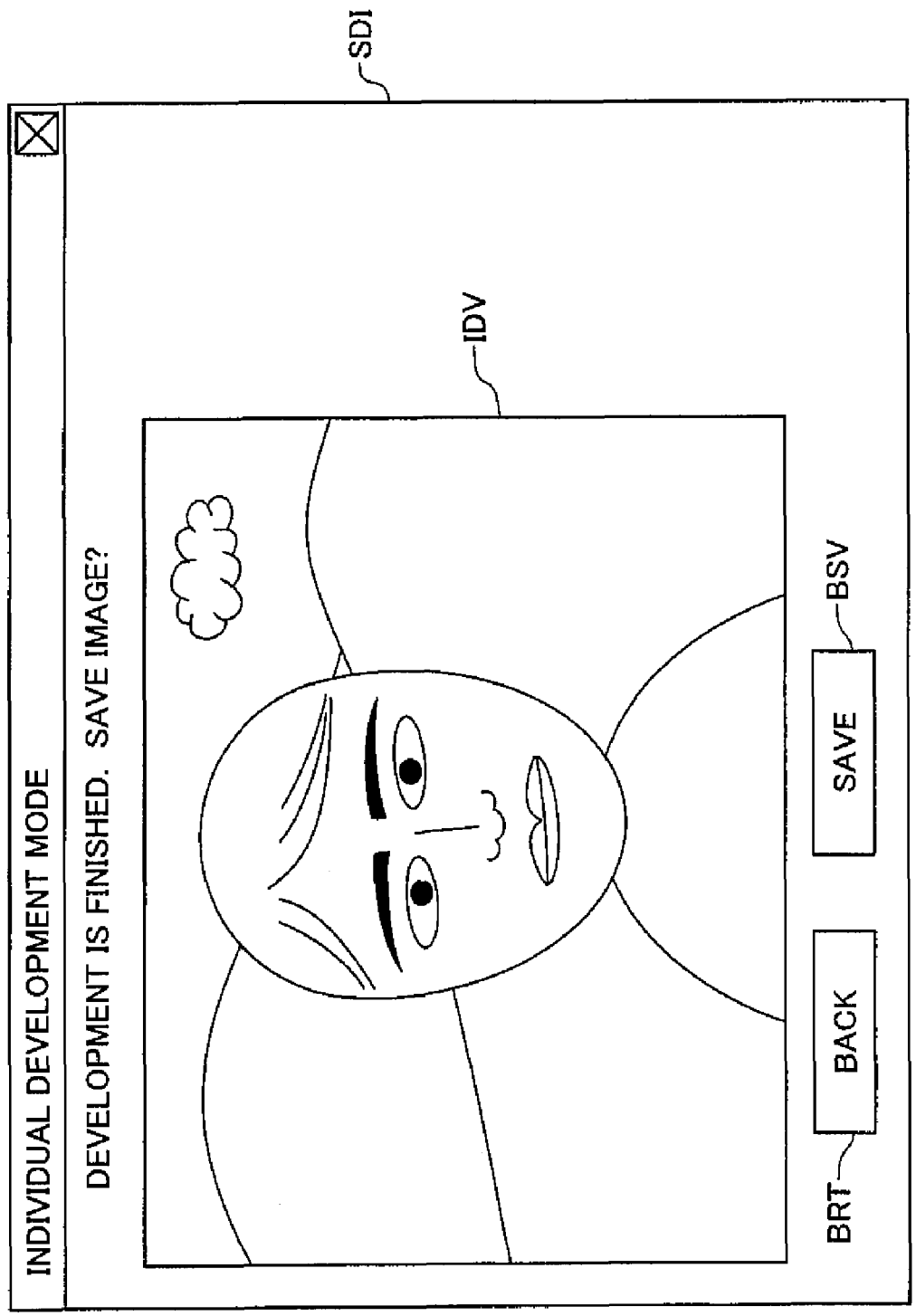

In Step S162 of FIG. 11, the development process module 300 modifies the size of the developed image as needed, and displays the image. FIG. 16 depicts an example of a developed image display screen SDI which is displayed on the display unit 220 (FIG. 3) in Step S162. The developed image IDV generated in the finishing development process (Step S160) is displayed in large format on the developed image display screen SDI. When the user operates a "Save" button BSV provided on the developed image display screen SDI, developed image data in JPEG format which is generated from the developed image is stored in the developed image storing area 420 (FIG. 3), and the individual development process of FIG. 11 terminates.

Figure 17:
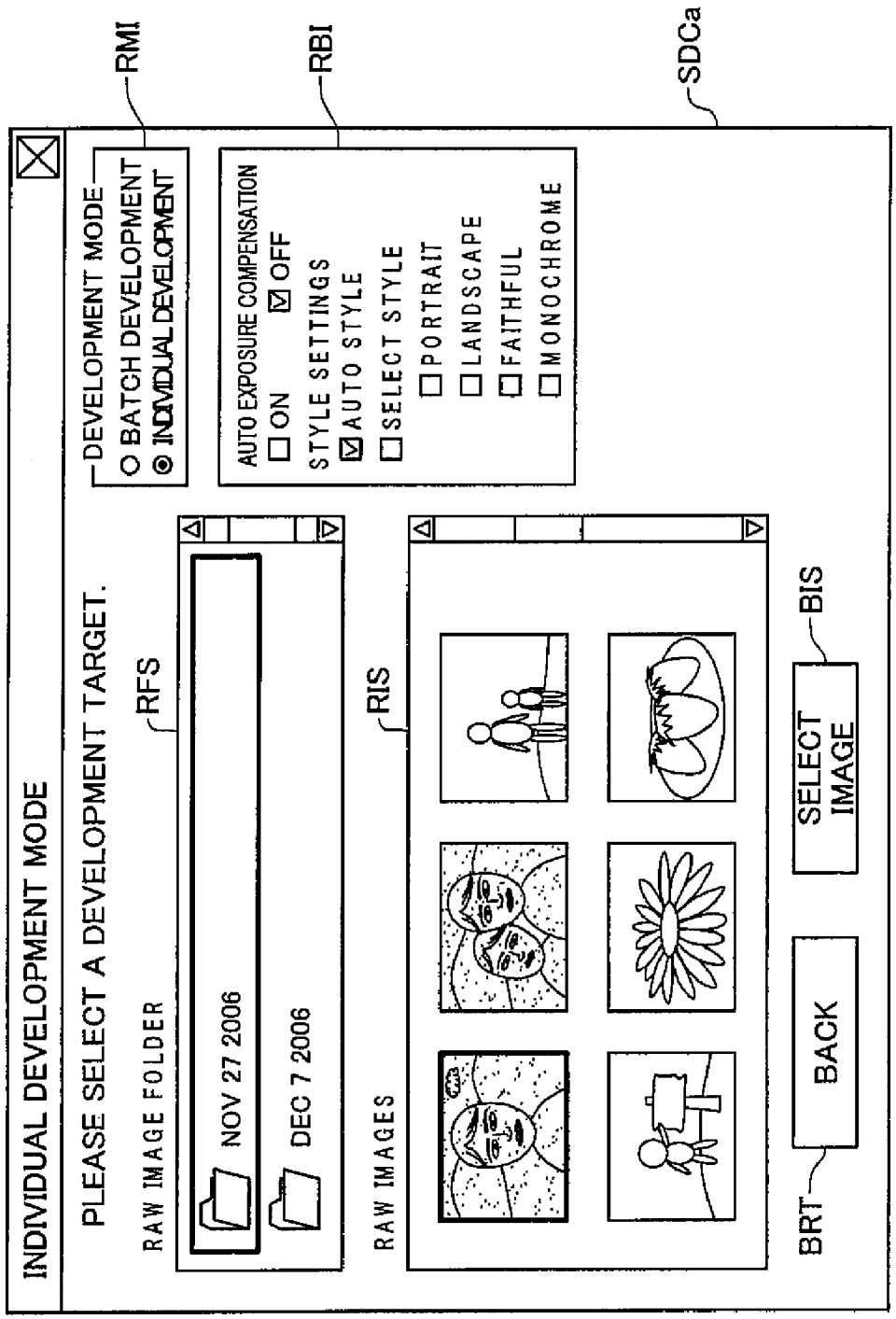

FIG. 17 is an illustration showing another example besides that of FIG. 12 of the development settings specifying screen SDCa which is displayed in Step S110a. The development settings specifying screen SDCa of FIG. 17 differs from the development settings specifying screen SDCa of FIG. 12 in that "AUTO CORRECTION" is set to OFF, and STYLE is set to "AUTO STYLE." By setting the STYLE to "AUTO STYLE," the development conditions is set on the basis of the scene setting at the time of shooting of the image with the digital still camera 100. As discussed later, the scene setting at the time of shooting is acquired from shooting conditions stored in the header portion of the RAW image file (FIG. 2). In the example of FIG. 17, no scene has been set at the time of shooting of the image with the digital still camera 100. In such instances, with the exception of exposure compensation, standard conditions are used as the development conditions.

Here, the processing method for the case where STYLE is set to "AUTO STYLE" in the development settings specifying screen SDCa of FIG. 17 will be described. By setting the STYLE to "AUTO STYLE," the development conditions are set on the basis of the scene setting at the time of shooting of the image with the digital still camera 100. The scene setting at the time of shooting is acquired from the shooting conditions which are stored in the header portion of the RAW image file (FIG. 2).

For example, in the case of a RAW image file compliant with the Exif 2.21 standard for digital still camera image file format, the shooting scene is recorded as shooting scene type (SceneCaptureType) information which is recorded in the Exif IFD or 0th IFD Exif Private Tag. Shooting scene type values are associated with different shooting scenes. Specifically, a 1 is associated with landscape, a 2 with portrait, a 3 with a night scene, and a 0 with standard shooting scene, respectively. Using this shooting scene type value, the auto style function automatically determines conditions for optimal development of the image. In the case of the landscape setting, contrast and saturation are set higher than with standard processing, and sharpness correction is carried out. Additionally, processes such as stored color correction for sky and greenery may be carried out. In the case of the portrait setting, memory color correction of flesh color is carried out, and a soft sharpness process and contrast reproduction appropriate to a portrait is carried out. In the case of the night scene setting, excessive exposure compensation is avoided, noise elimination is performed on the entire image, and a process of reproduction with moderate contrast is carried out.

In addition to shooting scene type (SceneCaptureType), Exif tags may record various settings at the time of shooting such as shooting contrast (Contrast), shooting saturation (Saturation), shooting sharpness (Sharpness), and so on. It is possible to modify the development process condition for the finishing development process shown in FIG. 10 or the for-display development process shown in FIG. 13, on the basis of the shooting contrast value (o=standard, 1=low, 2 high), the shooting saturation value (0=standard, 1=low saturation, 2=high saturation), the shooting sharpness (0=standard, 1=weak, 2=strong), and so on.

Additionally, other shooting settings information besides the above settings may be recorded as tags and make it possible to read out this tag information to make more advanced developing style (developing finish) settings. For example, it is also possible to define tag information which can be coupled with particular development conditions and modifying the developing conditions according to this tag information, for example, "Faithful" for the purpose of more faithful color reproduction; "Soft" for the purpose of soft image reproduction; "Natural" for producing a naturalistic impression when more deliberately composing a shot than with the Faithful setting, "Cool Landscape" for creating an impression of a cool, high-color temperature landscape before dawn, "Warm Landscape" for creating an impression of a warm, mellow landscape at twilight, "Sunset" for reproducing the brilliant reds at sunrise or sunset, "Wedding Portrait" for reproducing the soft tones of the white wedding dress and bride's skin; "Kids" for reproducing the impression of naughty children at play with vivid colors, "Warm Room" for reproducing warm interior light, and so on.

Moreover, by recording information about shooting settings besides those mentioned above, it is also possible to read out this tag information to carry out monochrome developing, or to make monochrome development conditions which render contrast in such a way as to simulate application of a red, orange, yellow, or green filter. The monochrome development is carried out by adjusting the lightness with reference to the proportions of RGB, and making the RGB values of the output image identical. A process simulating application of a red, orange, yellow, or green filter can be accomplished by varying the proportions when generating lightness values for the R, G, and B values at this time.

In the development settings specifying screen SDCa of FIG. 17, when the user operates the "SELECT IMAGE" button BIS, in Step S130 of FIG. 11 it is determined that auto exposure compensation is not set, and the for-display development process (Step S152) is carried out without exposure compensation. Then, in Step S154, a preview image developed without exposure compensation is displayed.

Figure 18:
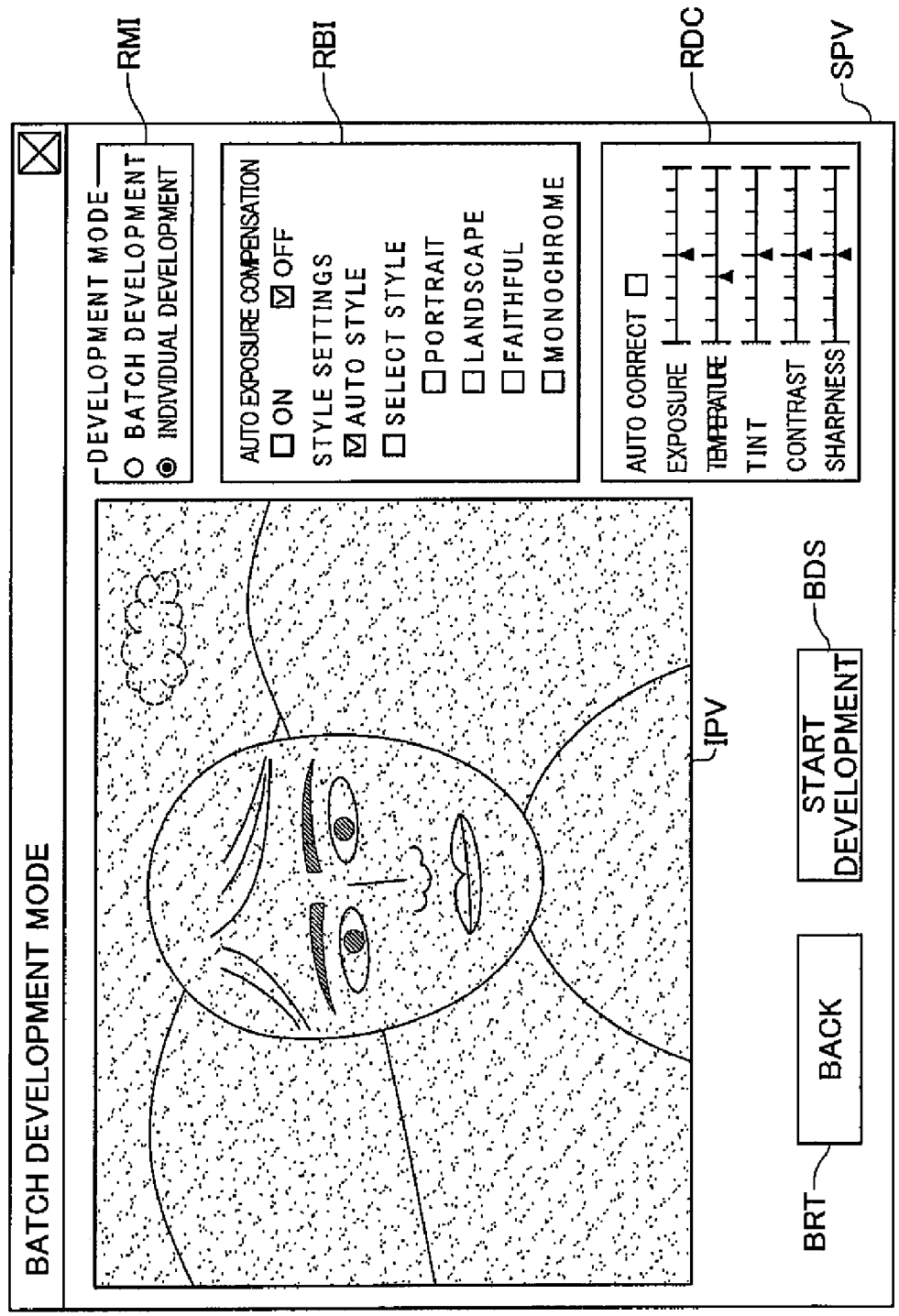
FIG. 18 shows a development result preview screen SPV displaying a preview image IPV which undergoes a development process using the settings in the development settings specifying screen shown in FIG. 17.

FIG. 18 shows a development result preview screen SPV displaying a preview image IPV which undergoes a development process using the settings in the development settings specifying screen SDCa shown in FIG. 17. In the example of FIG. 18, since an underexposed RAW image is selected in Step S110a (FIG. 11), an underexposed image is displayed on the development result preview screen SPV.

Figure 19:
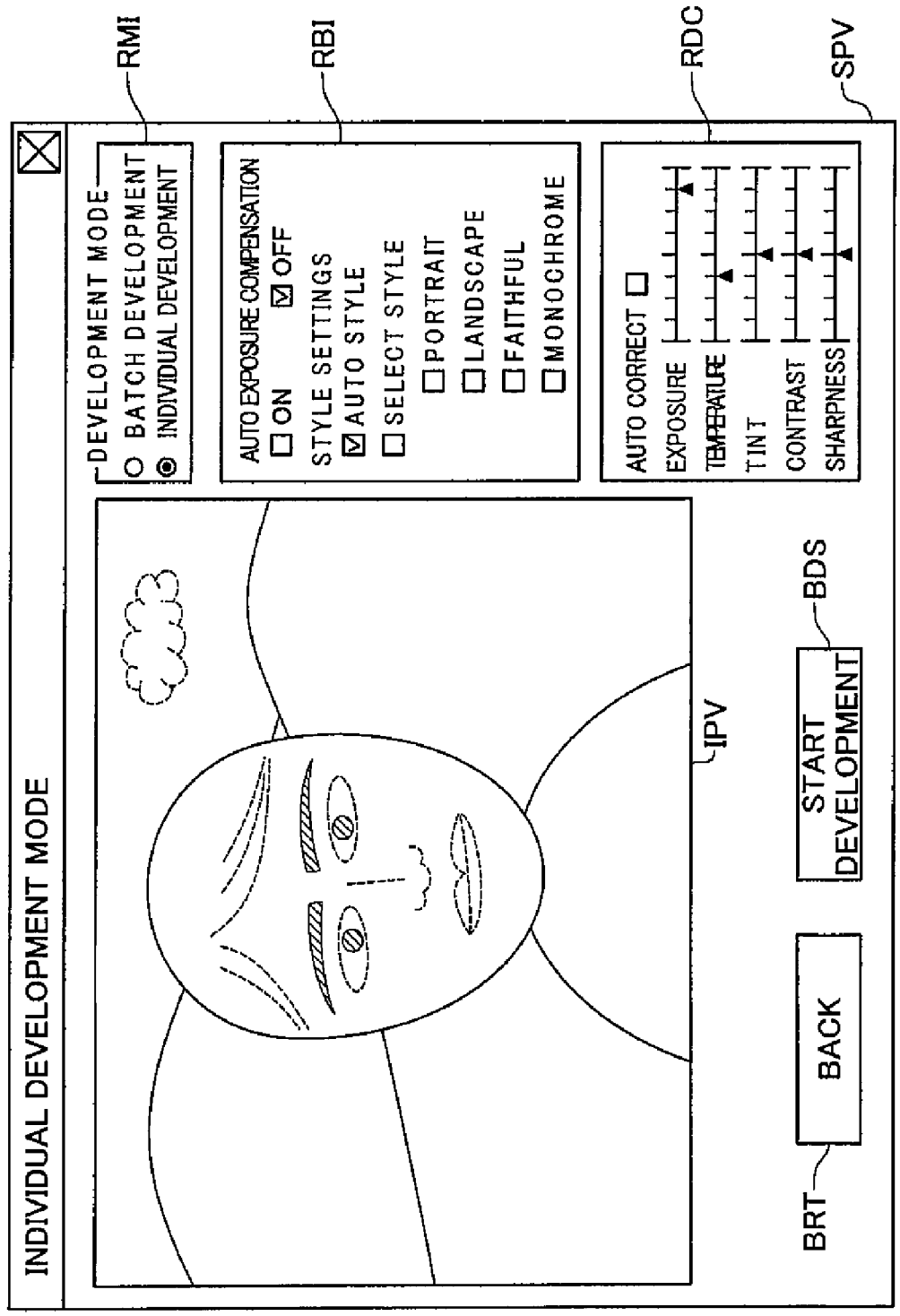
FIG. 19 is an illustration showing the user changing the "EXPOSURE" setting three steps higher in the situation shown in FIG. 18.

FIG. 19 is an illustration showing the user changing the "EXPOSURE" setting three steps higher in the situation shown in FIG. 18. In this case, in Step S156 of FIG. 11 it is determined that the development conditions are modified, and in the for-display development process (Step S152) the exposure compensation process is performed to increase the exposure by three steps. For this reason, as shown in FIG. 19 a slightly overexposed image is displayed as the preview image IPV on the development result preview screen SPV.

Figure 20:
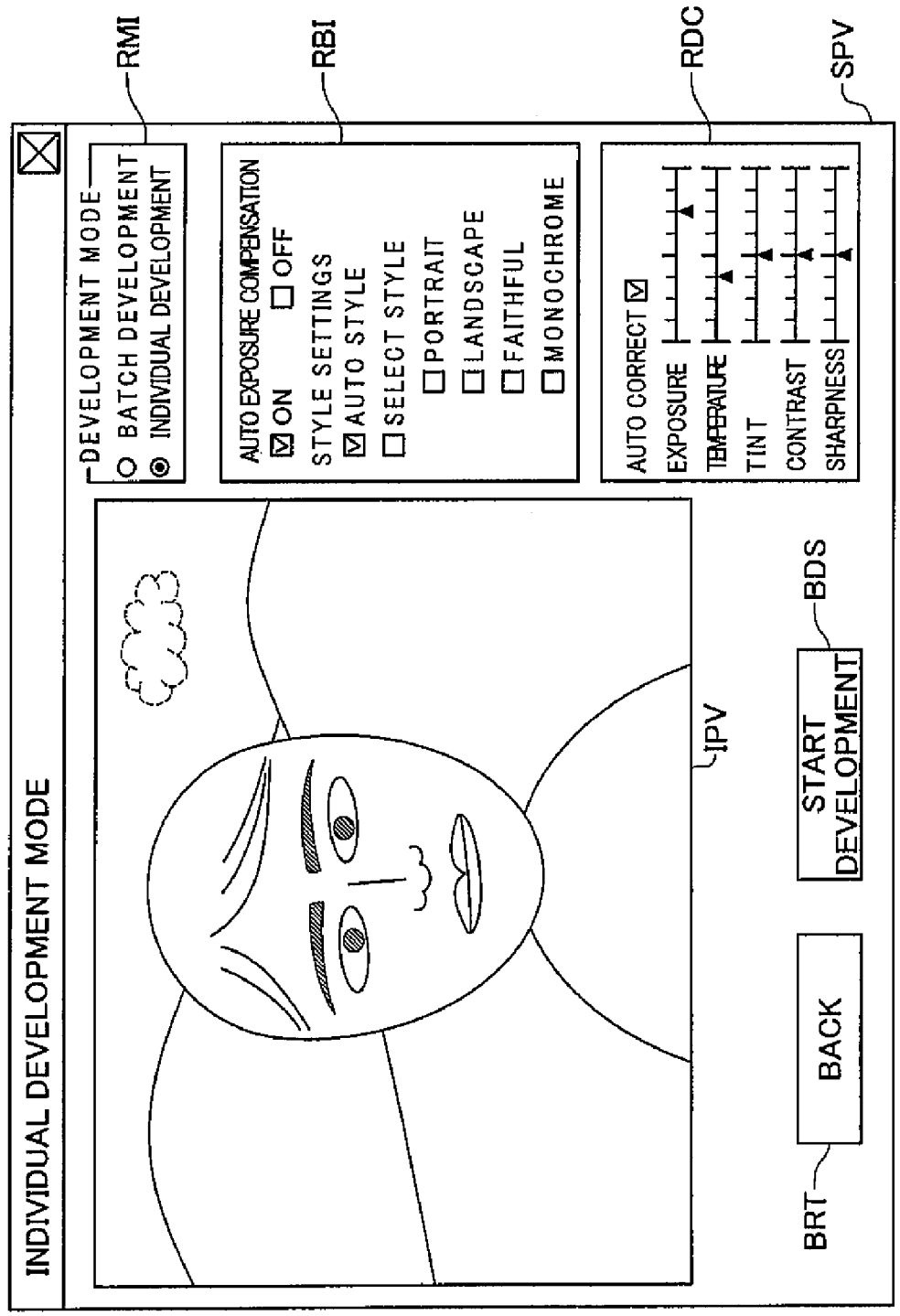
FIG. 20 is an illustration showing the user operating to change the "AUTO EXPOSURE COMPENSATION" setting to ON in the situation shown in FIG. 19.

FIG. 20 is an illustration showing the user operating to change the "AUTO EXPOSURE COMPENSATION" setting to ON in the situation shown in FIG. 19. In this case, in Step S156 of FIG. 11 it is determined that the development conditions are modified. Then, in Step S130 it is determined that auto exposure compensation is set, and the level of exposure compensation is set on the basis of the results of analysis of the reduced image. Subsequently, the for-display development process (Step S152) is carried out using the exposure compensation level set on the basis of the results of analysis of the reduced image. Thus, an image with correct exposure is displayed as the preview image IPV on the development result preview screen SPV, as shown in FIG. 20.

Figure 21:
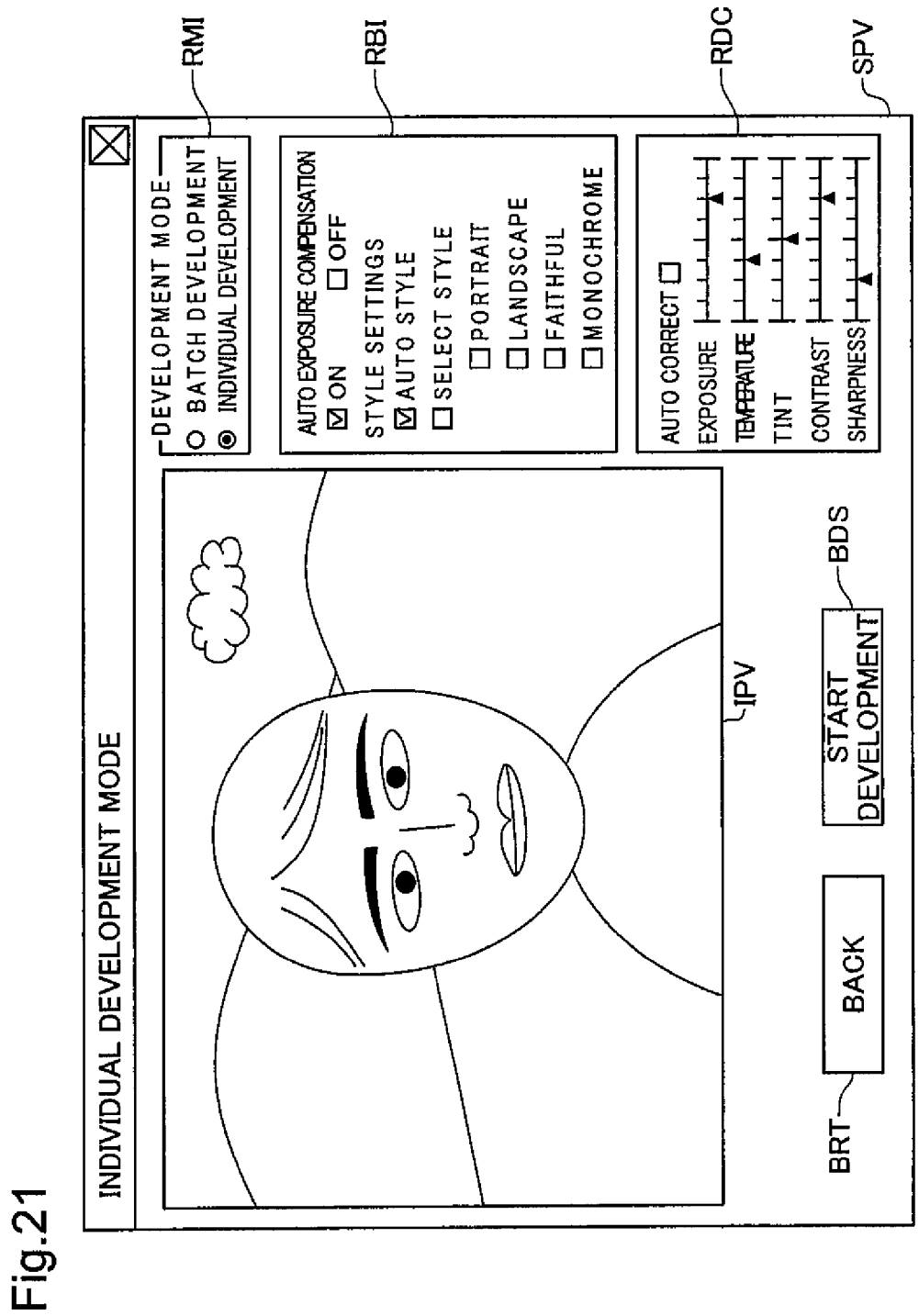
FIG. 21 is an illustration showing the user changing contrast two steps higher and sharpness two steps lower in the situation shown in FIG. 20.
Figure 22:
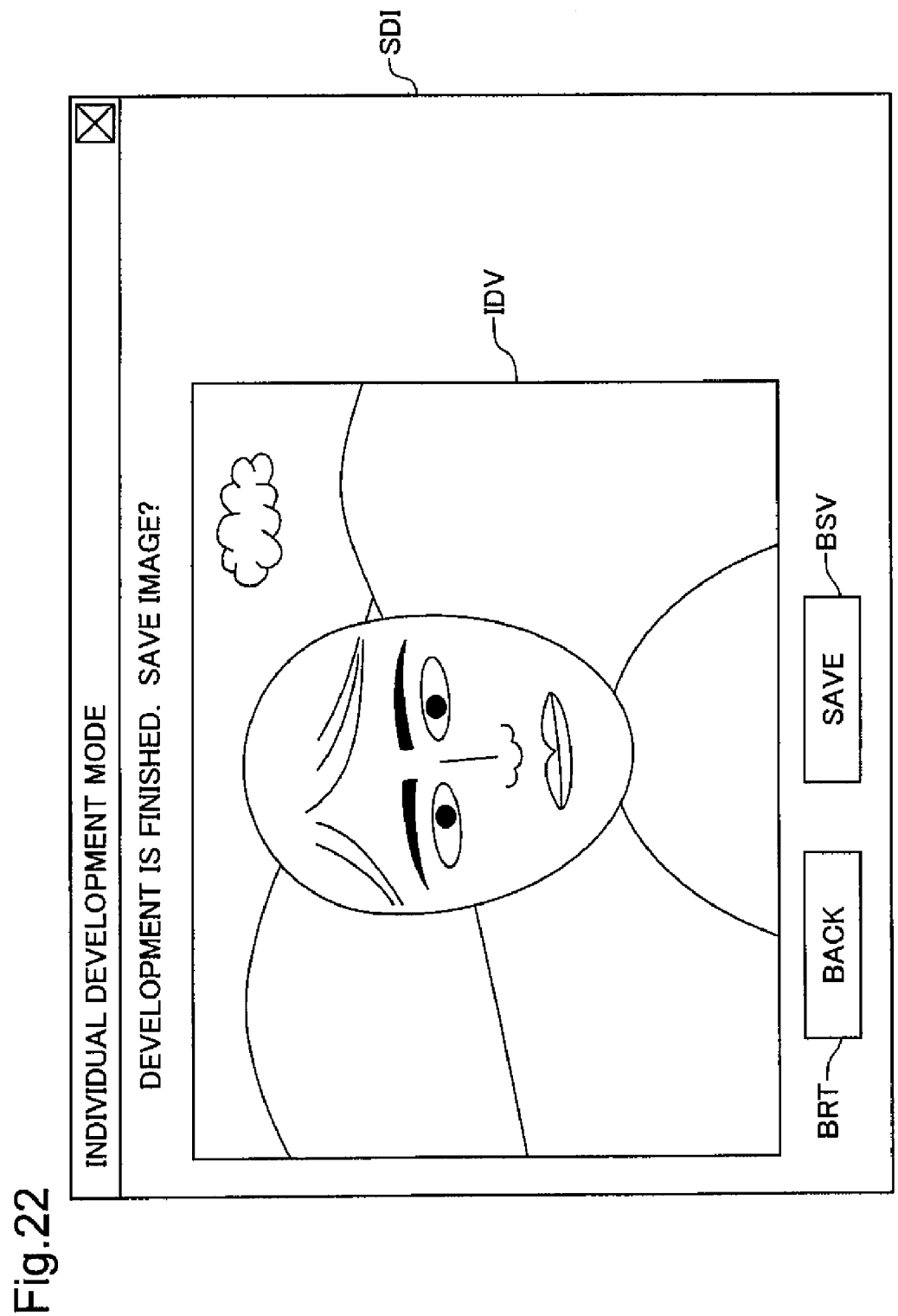
FIG. 22 depicts an example of a developed image display screen displayed on the display unit when the finishing development is finished in the situation shown in FIG. 21.

FIG. 21 is an illustration showing the user changing contrast two steps higher and sharpness two steps lower in the situation shown in FIG. 20. As in the example of FIG. 15, through this user operation the preview image IPV changes to a condition of higher contrast and lower sharpness than the condition shown in FIG. 20. Also, the checkmark in the AUTO CORRECTION checkbox of the development condition display field RDC is removed. When the user operates the "START DEVELOPMENT" button BDS on the development result preview screen SPV of FIG. 21, the developed image IDV is displayed on the developed image display screen SDI shown in FIG. 22. Then, when the "SAVE" button BSV of the developed image display screen SDI is operated, developed image data in JPEG format generated from the developed image is stored into the developed image storing area 420 (FIG. 3).

Figure 23:
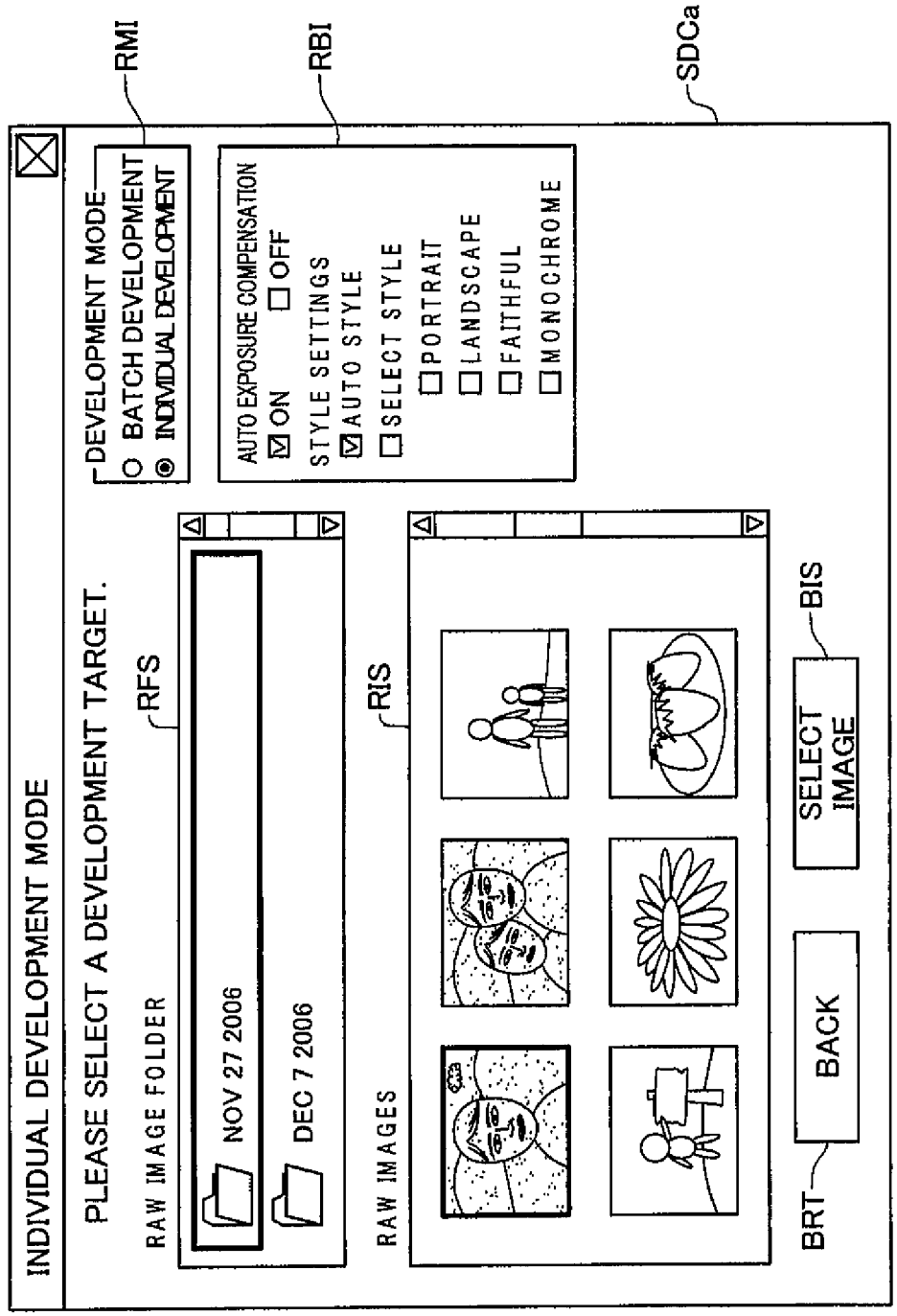
Figure 24:
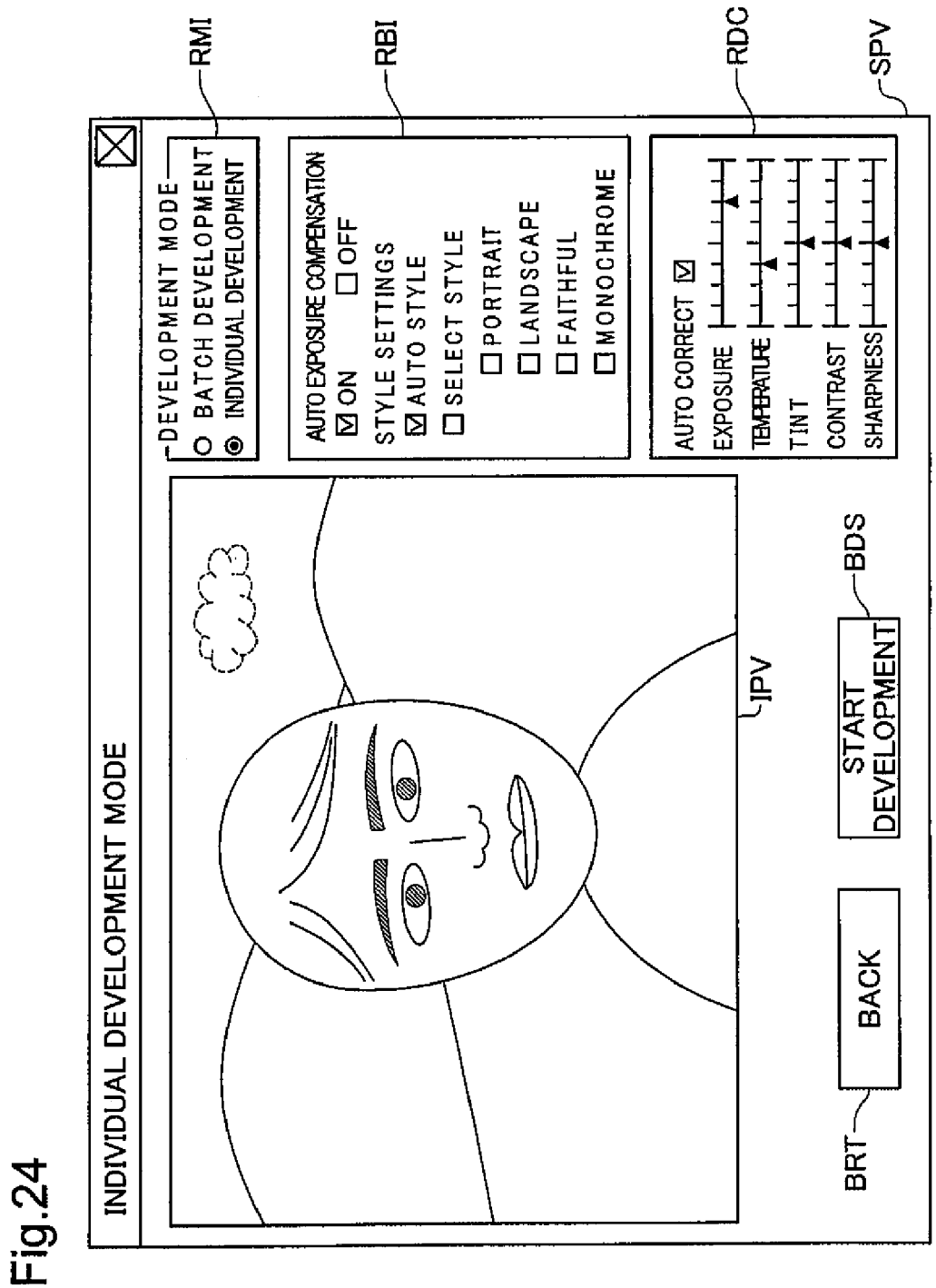
FIG. 24 is an illustration depicting the development result preview screen displayed when the user operates the "SELECT IMAGE" button on the development settings specifying screen of FIG. 23.

FIG. 23 is an illustration depicting yet another example of the development settings specifying screen SDCa which is displayed in Step S110a. The development settings specifying screen SDCa of FIG. 23 differs from the development settings specifying screen SDCa of FIG. 17 in that "AUTO EXPOSURE COMPENSATION" is set to ON. FIG. 24 is an illustration depicting the development result preview screen SPV displayed when the user operates the "SELECT IMAGE" button BIS on the development settings specifying screen SDCa of FIG. 23. The development result preview screen SPV shown in FIG. 24 indicates that the exposure compensation process is performed to increase image lightness by two steps, and that color temperature is adjusted one step towards the low-temperature side.

Figure 25:
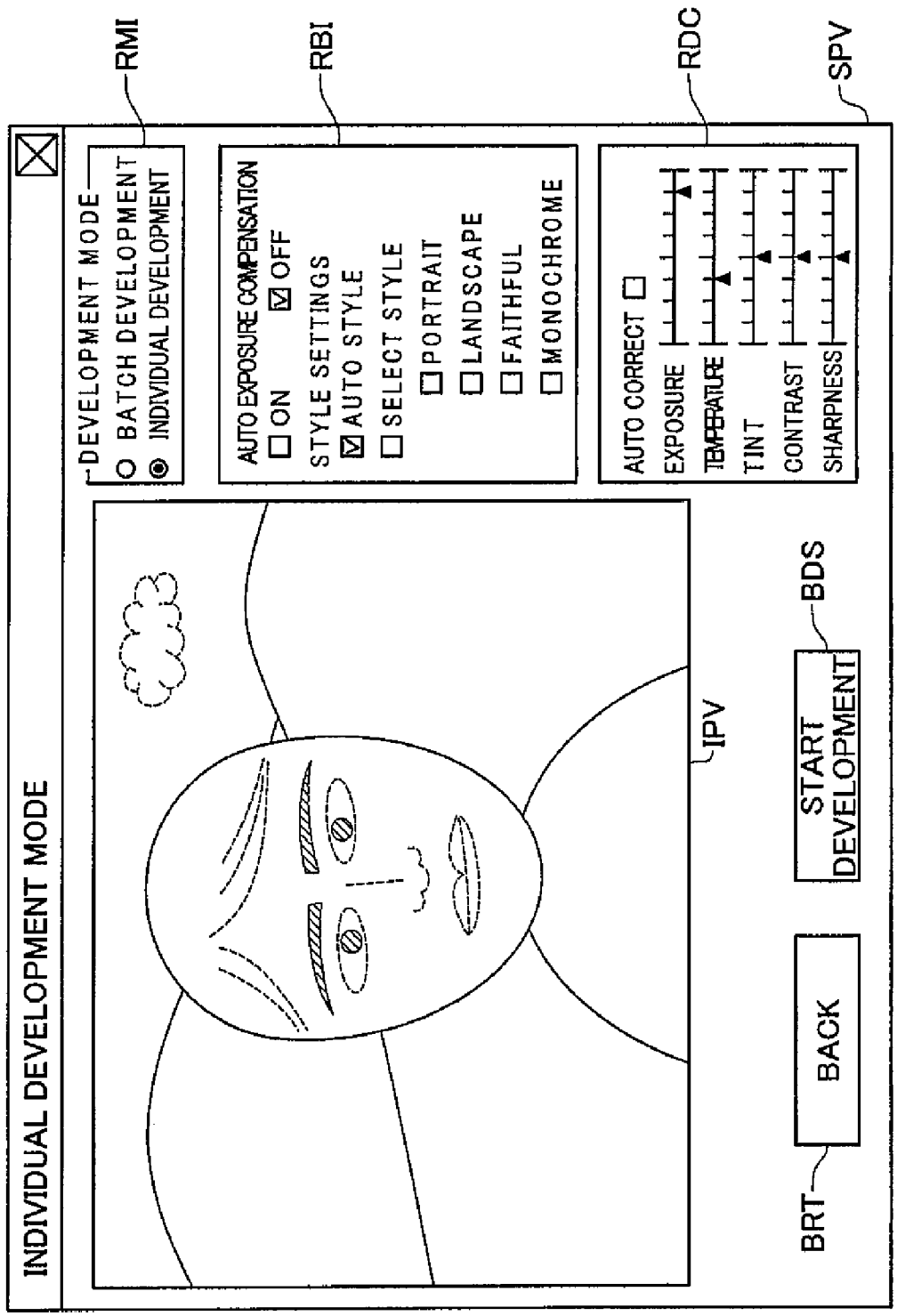
FIG. 25 is an illustration showing the user operating to change the "EXPOSURE" setting one step higher in the situation shown in FIG. 24.

FIG. 25 is an illustration showing the user operating to change the "EXPOSURE" setting one step higher in the situation shown in FIG. 24. In the example of FIG. 25, since the user modifies the "EXPOSURE" setting, "AUTO EXPOSURE COMPENSATION" changes from ON in FIG. 24 to OFF. Also, the checkmark in the AUTO CORRECTION checkbox of the development condition display field RDC is removed.

Figure 26:
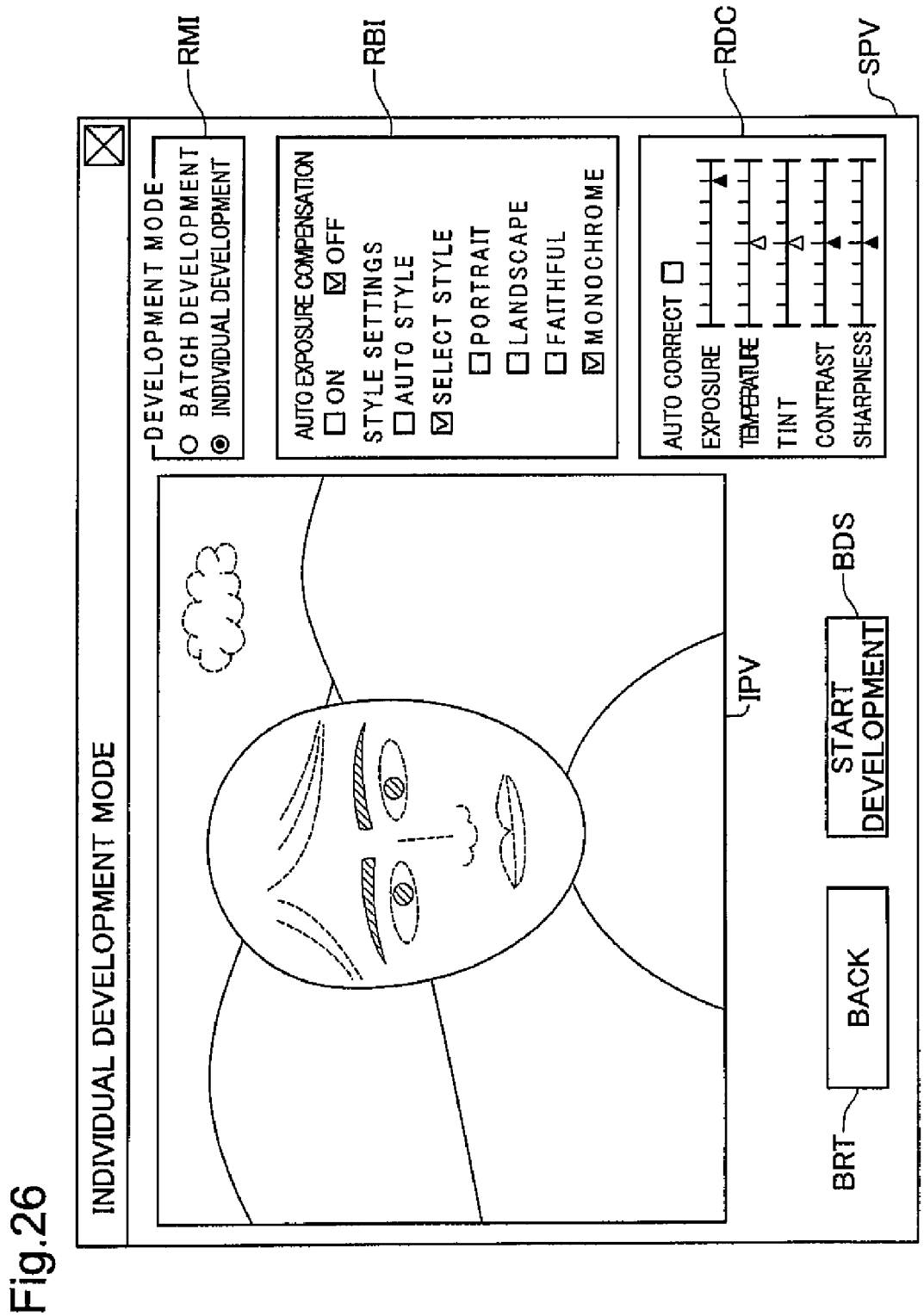
FIG. 26 is an illustration in which the user changes the "STYLE" to "MONOCHROME" from the situation shown in FIG. 25.

FIG. 26 is an illustration in which the user changes the "STYLE" to "MONOCHROME" from the situation shown in FIG. 25. In the example of FIG. 26 "STYLE" is changed to "MONOCHROME." This cause a black-and-white image displayed as the preview image IPV on the development result preview screen SPV. Since the items of "TEMPERATURE" and "TINT" cannot be set for a black-and-white image, the color of the pointers indicating values of these items change to gray and their settings are no longer modifiable.

Figure 27:
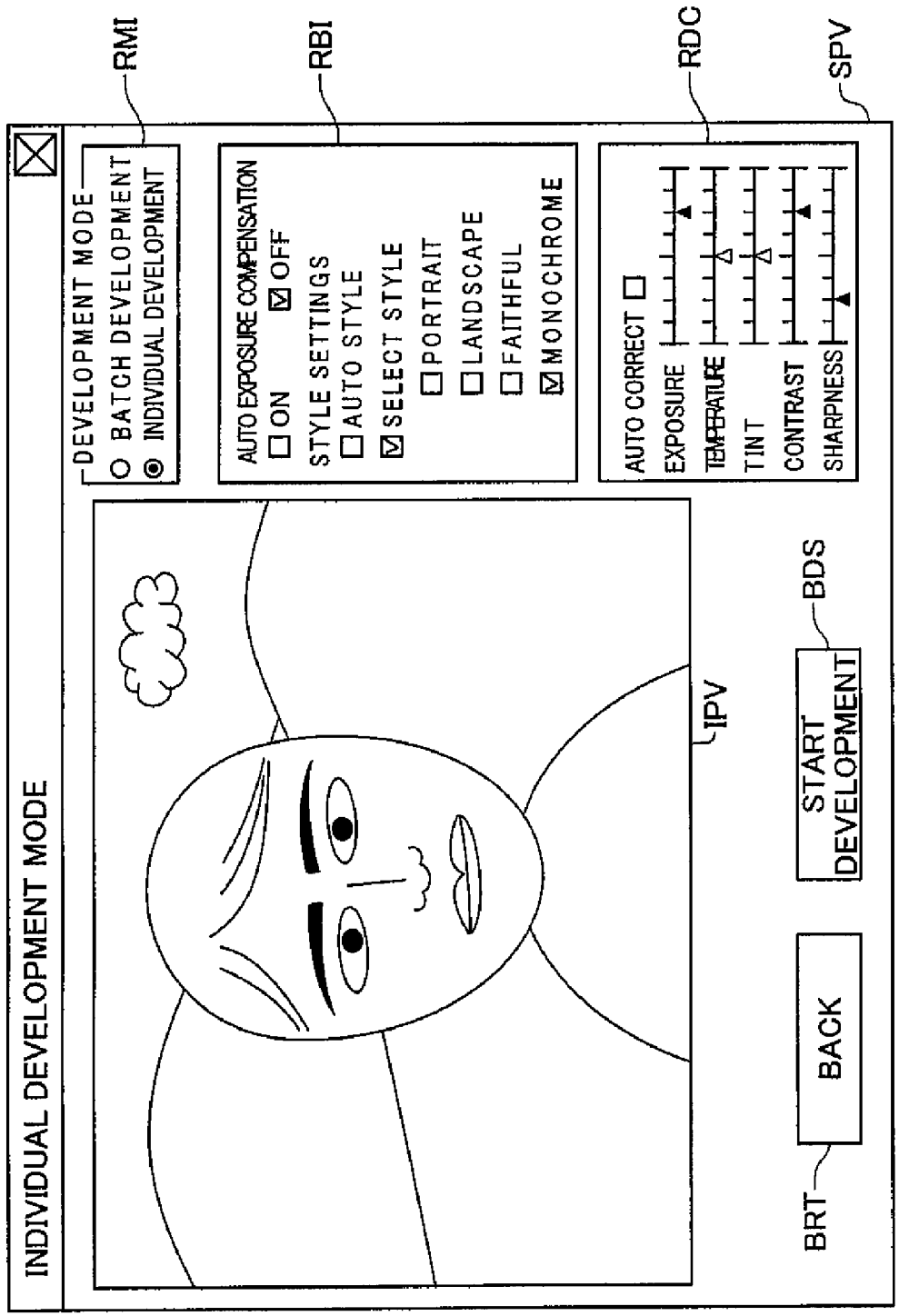
FIG. 27 is an illustration in which the user sets the exposure compensation level one step lower and contrast two steps higher than in the situation shown in FIG. 26.
Figure 28:
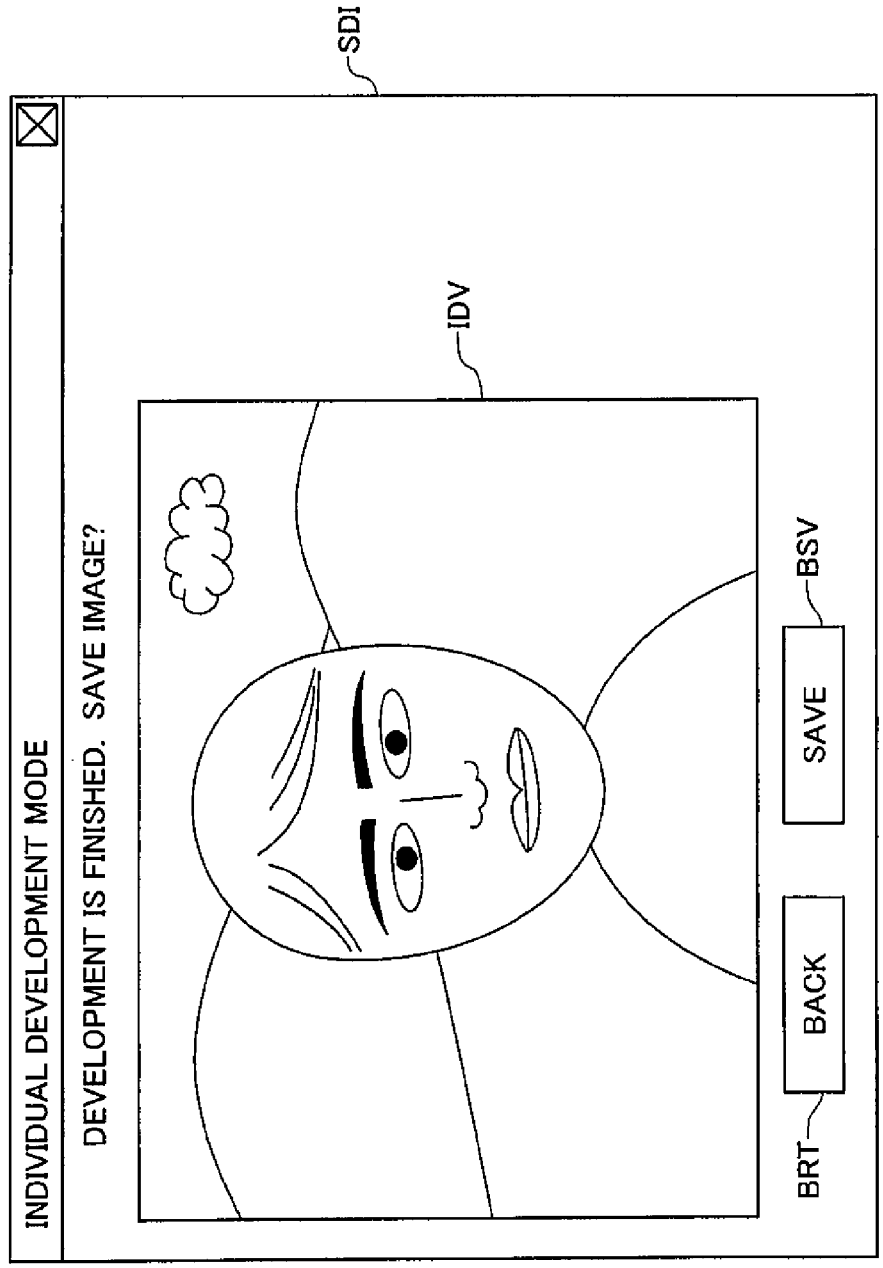
FIG. 28 depicts an example of a developed image display screen displayed on the display unit when the finishing development is finished in the situation shown in FIG. 27.

FIG. 27 is an illustration in which the user sets the exposure compensation level one step lower and contrast two steps higher than in the situation shown in FIG. 26. Due to these changes in the development conditions, a preview image IPV with lower overall lightness and higher contrast than the preview image IPV of FIG. 26 is displayed. When the user operates the "START DEVELOPMENT" button BDS on the development result preview screen SPV of FIG. 27, a black-and-white developed image IDV is displayed on the developed image display screen SDI of FIG. 28. Then, when the "SAVE" button BSV of the developed image display screen SDI is operated, the developed image data in JPEG format generated from the developed image is stored in the developed image storing area 420 (FIG. 3).

In this way, in the first embodiment, a reduced image of prescribed resolution suited to image analysis is generated from a screen nail image. The reduced image so generated is analyzed to compute an exposure compensation coefficient for the development process. The lightness of the developed image is corrected by carrying out the development process using the computed exposure compensation coefficient. It is accordingly possible to suppress color shift, which may occur with adjustment of lightness of a developed image as a non-linear processing; as well as to achieve better lightness of the developed image. Moreover, depending on the format of the developed image data, tone values are represented in 8-bits. In such cases there is a possibility that tone values disperse (also called "tone jump") and the lightness-corrected image appears unnatural due to the lightness correction. In the first embodiment, lightness correction is carried out in a development process in which arithmetic processing is carried out using 16-bit data. It is possible thereby to suppress the occurrence of tone jump in association with lightness correction, and to achieve a better lightness-corrected image.

In the first embodiment, the for-display development process is carried out on for-display RAW image of which resolution is reduced in advance. This allows reduction of the time required for the for-display development process, and reduction of the duration from the time that the user changes the development process conditions until the preview image is re-displayed. Therefore, the user may quickly check the effects of changing the development conditions, making operation to change the development conditions easier.

In the first embodiment, the exposure compensation coefficient is computed from the results of analysis of reduced images. It is also possible to set another development process condition from the results of analysis of reduced images. For example, it is possible to detect a white area contained in a reduced image and to determine a parameter used in the white balance adjustment process (Step S306 of FIG. 10) from the color of white area. It is also possible to detect a specific subject (e.g. the sky or a face) contained in a reduced image, and to determine a parameter used in the color reproduction process (Step S310 of FIG. 10). In this case, the parameter for the color reproduction process is set so that the color of the specific subject is within a target color range.

Furthermore, it is possible to identify a subject represented by a reduced image and to set the development conditions according to the subject. For example, where the subject is a landscape it is possible to determine development conditions such that a tone curve to increases image contrast is used in the tone correction process (Step S310 of FIG. 10). On the other hand, where the subject is a human, it is possible to determine development conditions such that a tone curve to decreases image contrast is used in the tone correction process. Or, where the subject is a night scene, it is possible to determine development conditions so as to suppress lightness correction. Furthermore, the parameters used in the color reproduction process (Step S310 of FIG. 10) can be set according to the type of subject or scene such that the color reproduction process is carried out more appropriately.

B. Second Embodiment

Figure 29:
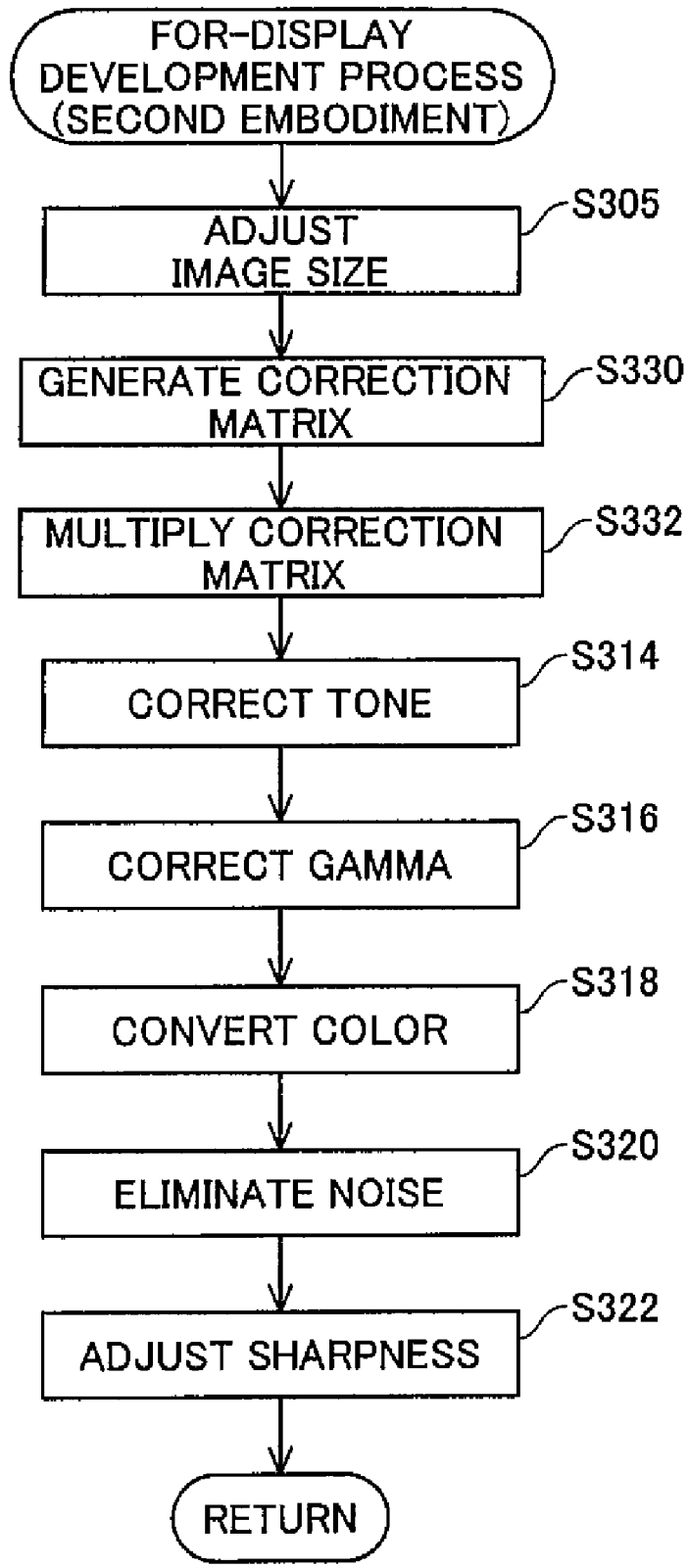
FIG. 29 is a flowchart of the for display development process in a second embodiment.

FIG. 29 is a flowchart of the for-display development process in a second embodiment. In the for-display development process of the second embodiment, Steps S306 through S312 (white balance adjustment, exposure compensation, color reproduction, and hue correction) of the first embodiment shown in FIG. 13 are replaced by a correction matrix generation step (Step S330) and a correction matrix multiplication step (Step S332). In other respects the process is the same as the for-display development process of the first embodiment.

As discussed above, in the white balance adjustment process and the exposure compensation process, RGB values are multiplied by prescribed correction coefficients. The color reproduction process and the hue correction process are performed by 3×3 matrix operations. Since all of these processes are linear operations, the arithmetic processes carried out in Steps S306 through S312 of the for-display development process of FIG. 13 are represented by the following expression (3).

$$\begin{pmatrix} r' \\ g' \\ b' \end{pmatrix} = \begin{pmatrix} H_{11} & H_{12} & H_{13} \\ H_{21} & H_{22} & H_{23} \\ H_{31} & H_{32} & H_{33} \end{pmatrix} \quad (3)$$

$$\begin{pmatrix} C_{11} & C_{12} & C_{13} \\ C_{21} & C_{22} & C_{23} \\ C_{31} & C_{32} & C_{33} \end{pmatrix} \begin{pmatrix} Ga & 0 & 0 \\ 0 & Ga & 0 \\ 0 & 0 & Ga \end{pmatrix} \begin{pmatrix} Ar & 0 & 0 \\ 0 & 1 & 0 \\ 0 & 0 & Ab \end{pmatrix} \begin{pmatrix} r \\ g \\ b \end{pmatrix}$$

Here, the vector (r, g, b) represents RGB values prior to the arithmetic processes carried out in Steps S306 through S312 (i.e. value of the for-display RAW image); and the vector (r', g', b') represents RGB values after the arithmetic processes carried out in Steps S306 through S312. The matrices of expression (3) represent, in order from the right, the matrices used in the processes of white balance adjustment, exposure compensation, color reproduction, and hue correction. In the present embodiment, the values of the vector (r, g, b) are 12-bit numeric values (or numeric values of 12 bits with a sign appended), and the elements of the matrices are signed 16-bit numeric values.

In Step S330, a single matrix (correction matrix) is generated by performing multiplication of these matrices. Then, in Step S332, all of the processes of white balance adjustment, exposure compensation, color reproduction, and hue correction are carried out at once by the arithmetic process of expression (4) below using the correction matrix.

$$\begin{pmatrix} r' \\ g' \\ b' \end{pmatrix} = \begin{pmatrix} M_{11} & M_{12} & M_{13} \\ M_{21} & M_{22} & M_{23} \\ M_{31} & M_{32} & M_{33} \end{pmatrix} \begin{pmatrix} r \\ g \\ b \end{pmatrix} \quad (4)$$

Here, the matrix of expression (4) is a correction matrix derived through multiplication of the matrices of expression (3). The elements of the matrix of expression (4) are of signed 16-bit accuracy also. So computation of the elements is carried out at 32-bit accuracy so as to avoid overflow and decline in accuracy in the computation process with the expression (3). The computed result is rounded off to 16-bit accuracy.

By generating a correction matrix in advance and using the correction matrix to carry out multiple processes all at once in this way, the arithmetic process load for generating the for-display RAW image may be reduced.

In the second embodiment, generation of a correction matrix and batch processing with the correction matrix are implemented in the for-display development process. As long as a single matrix from a plurality of matrices used in multiple processes is able to be generated in advance, it is also possible to carry out the multiple processes all at one time using the single matrix so generated. Specifically, in the finishing development process (FIG. 10) as well, it is possible to generate a correction matrix (Step S330 of FIG. 29) in place of Steps S306 through S312, and then carry out the processes of white balance adjustment exposure compensation, color reproduction, and hue correction all at one time with the generated correction matrix (Step S332).

C. Third Embodiment

Figure 30:
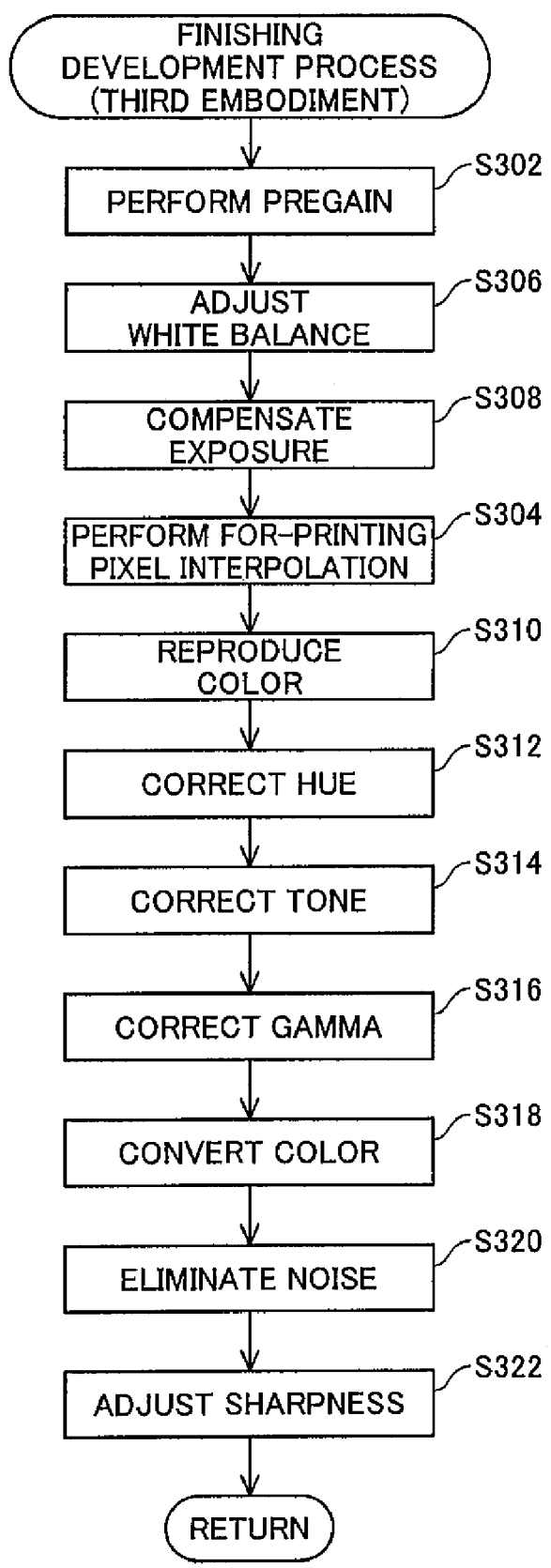
FIG. 30 is a flowchart of the finishing development process in a third embodiment.

FIG. 30 is a flowchart of the finishing development process in a third embodiment. In the finishing development process of the third embodiment, the for-printing pixel interpolation process (Step S304) of the first embodiment shown in FIG. 10 is carried out subsequent to the exposure compensation process (Step S308). In other respects it is the same as the finishing development process of the first embodiment.

As discussed above, in the white balance adjustment process and the exposure compensation process, prescribed correction coefficients are multiplied by the respective RGB values. Thus, even where pixel color information is missing, processing can be carried out by multiplying the correction coefficients to tone value of color information in each pixel.

By carrying out the white balance adjustment process (Step S306) and the exposure compensation process (Step S308) prior to the pixel interpolation process (Step S304) in this way, the arithmetic processing load required for these processes can be reduced.

In the third embodiment in the for-display development process (FIG. 13), the pixel interpolation process is carried out before the white balance adjustment process (Step S306). By so doing it is possible to generate a for-display RAW image for use in the for-display development process. In the for-display development process, since the for-display RAW image generated in advance is small in size, the arithmetic processing load for the for-display development process becomes smaller than where the white balance adjustment process etc. is performed on the RAW image itself. Moreover, in the event of an instruction from the user to modify a development process condition, it is sufficient simply to perform the remaining development process using the interpolated image.

In the third embodiment, the pixel interpolation process is executed separately from the other development processes carried out respectively in the finishing development process and the for-display development process. Thus, the arithmetic processing load can be reduced in both the finishing development process (FIG. 30) and the for-display development process (FIG. 13).

D. Fourth Embodiment

Figure 31:
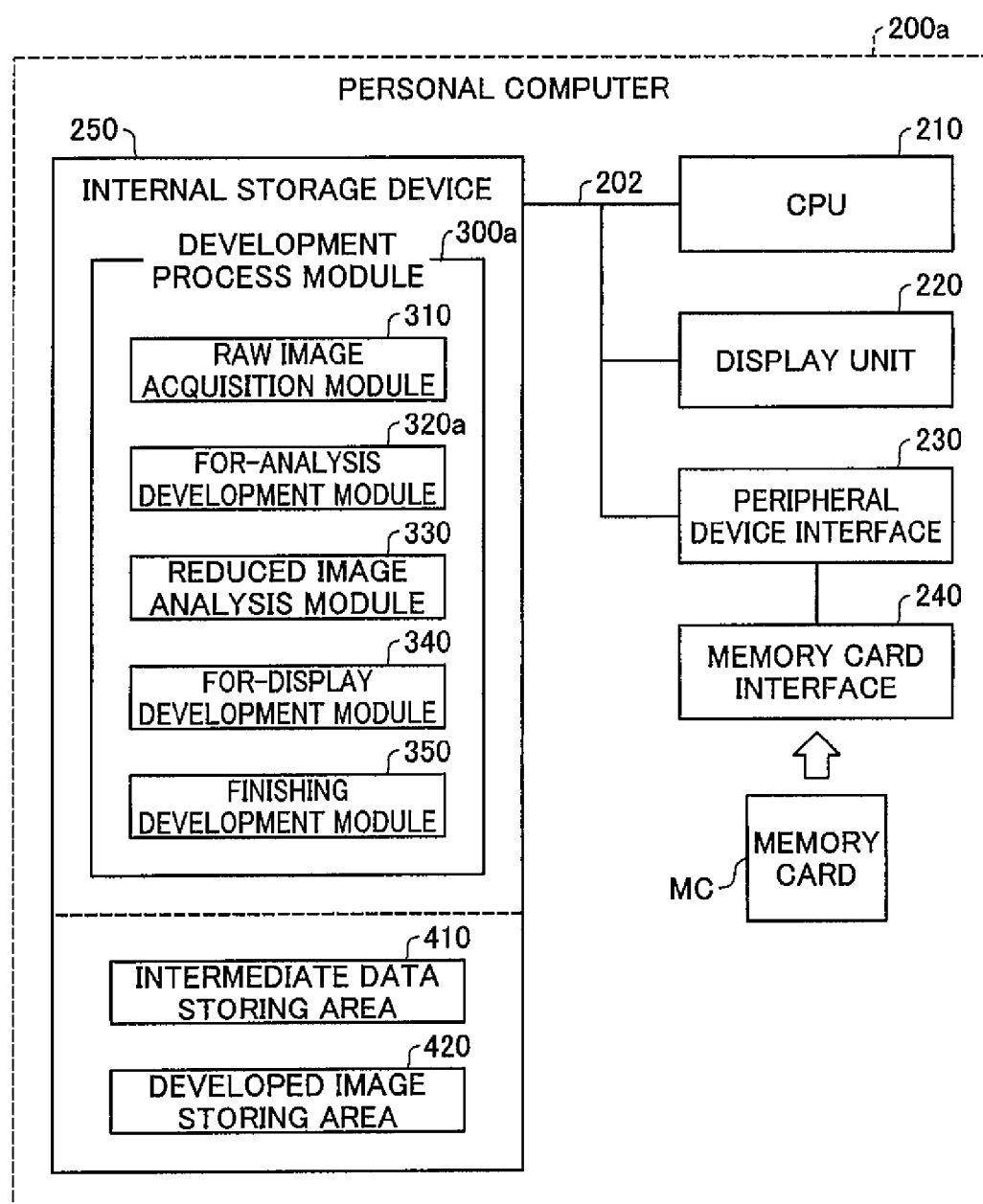
FIG. 31 is a schematic diagram schematically depicting the configuration of a personal computer in a fourth embodiment.

FIG. 31 is a schematic diagram schematically depicting the configuration of a personal computer 200a in a fourth embodiment. The personal computer 200a of the fourth embodiment differs from the personal computer 200 of the first embodiment depicted in FIG. 3 in that the screen nail reduction module 320 of the development process module 300 is replaced with a for-analysis development module 320a. In other respects it is similar to the first embodiment.

Figure 32:
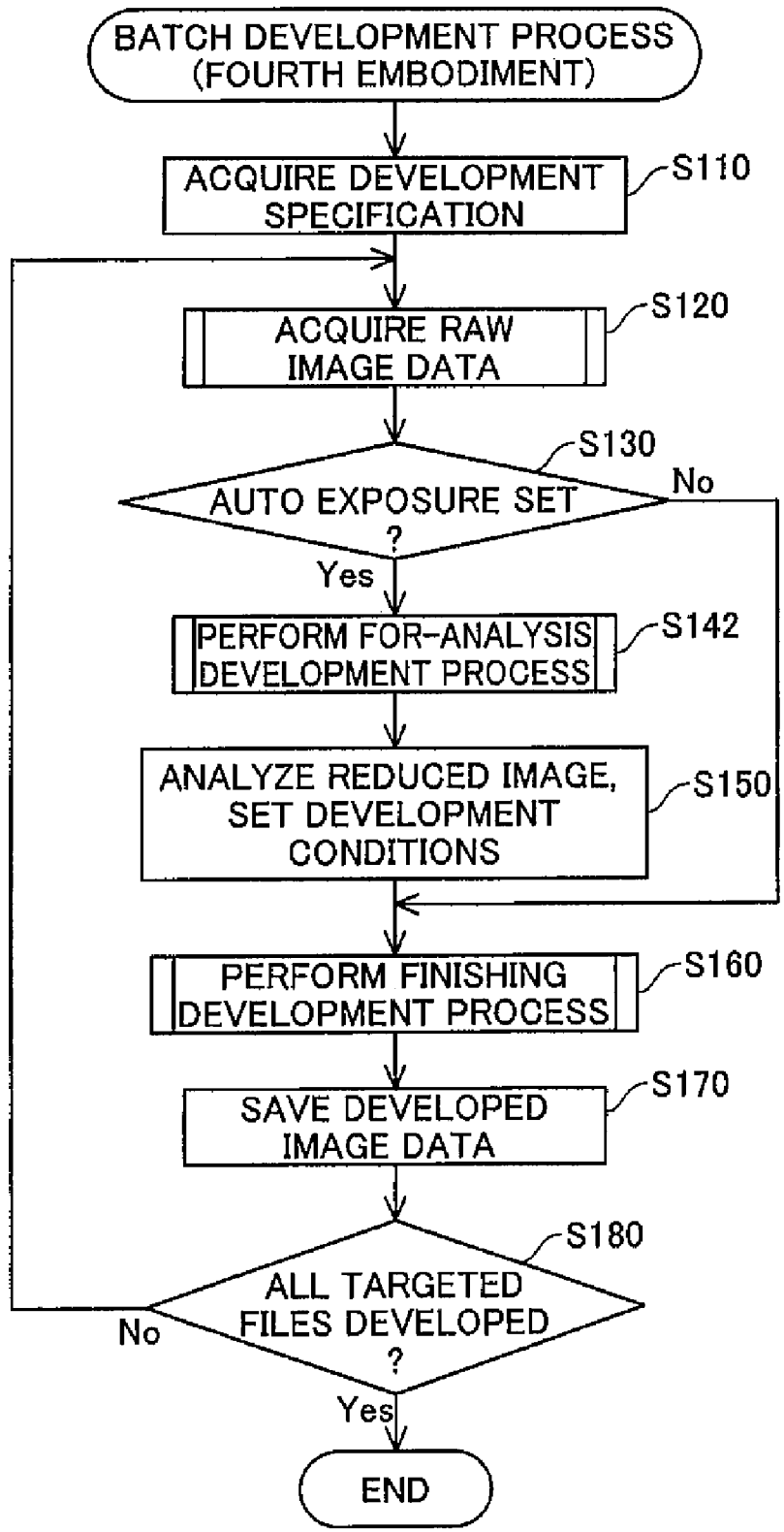
FIG. 32 is a flowchart of a batch development process in the fourth embodiment.

FIG. 32 is a flowchart of a batch development process in the fourth embodiment. The batch development process of the fourth embodiment differs from the batch development process in the first embodiment shown in FIG. 4 in that Step S140 is replaced by a Step S142. In other respects are similar to the first embodiment. While only the batch development process is discussed below, the process is carried out in a similar manner for the individual development process as well.

Figure 33:
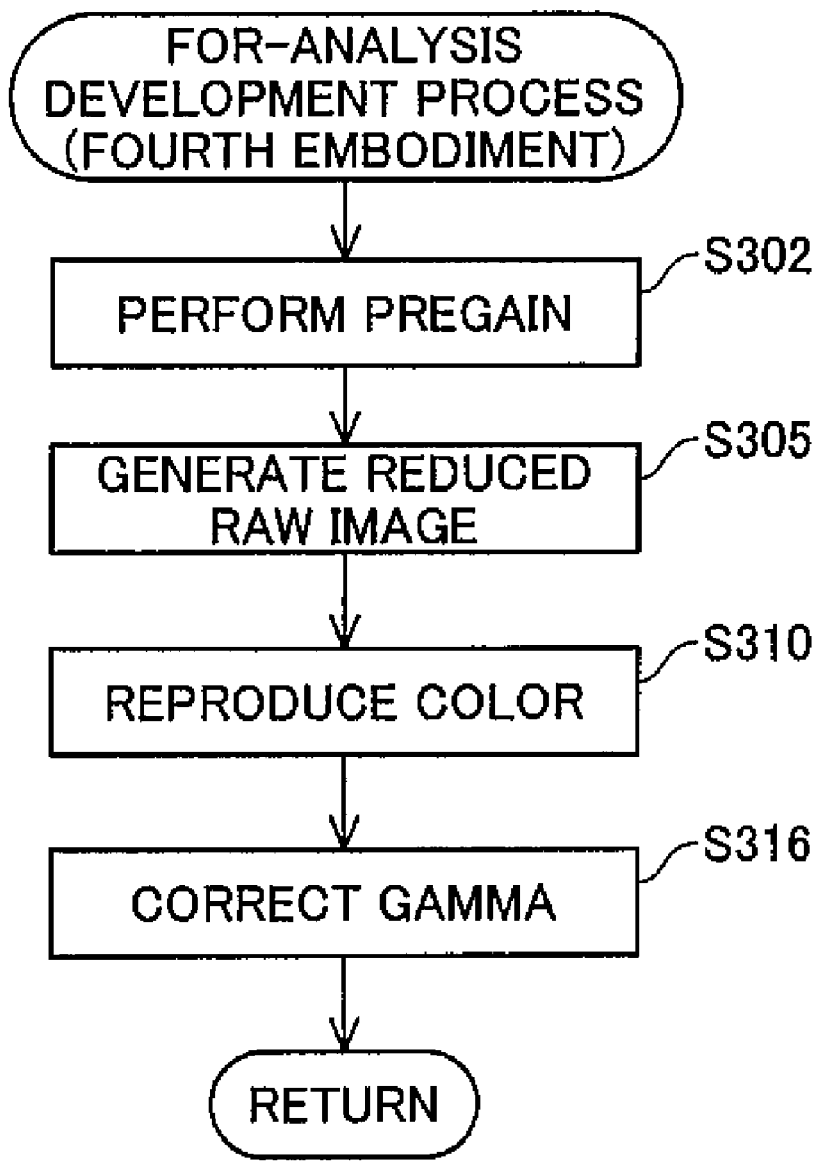
FIG. 33 is a flowchart of the for-analysis development process executed by the for-analysis development module in Step S142 of FIG. 32.

FIG. 33 is a flowchart of the for-analysis development process executed by the for-analysis development module 320a in Step S142 of FIG. 32. The for-analysis development process differs from the finishing development process shown in FIG. 10 in that the white balance adjustment process (Step S306), the exposure compensation process (Step S308), the hue correction process (Step S312), the tone correction process (Step S314), the color conversion process (Step S318), the noise elimination process (Step S320), and the sharpness adjustment process (Step S322) are omitted; and the for-printing pixel interpolation process (Step S304) is replaced by a reduced RAW image generation (Step S305).

In Step S305, the for-analysis development module 320a performs a simple pixel interpolation process to the RAW image. The image generated through simple pixel interpolation process is then reduced to generate a RAW image which is reduced (hereinafter, the reduced image is also termed "reduced RAW image").

FIGS. 34A through 34E are illustrations depicting carrying out of simple pixel interpolation process. As noted, in the imaging device of the digital still camera 100 (FIG. 1), color filters are positioned in the Bayer arrangement as shown in FIG. 34A. Thus, the sensor elements which detect green incident light (G pixels) and elements which detect red incident light (R pixels) are arranged sparsely as depicted in FIG. 34B and FIG. 34C. In the simple pixel interpolation process, for a pixel which is missing green color information, the G value is computed by the bilinear method from the G values of four pixels neighboring the pixel as shown in FIG. 34B. For a pixel which is missing red color information, where the two pixels above and below are R pixels, the R value of the pixel is derived through linear interpolation from the R values of the two R pixels above and below. On the other hand, where the pixels in the diagonal directions are R pixels, the R value is computed by the bilinear method from the R values of the four pixels on the diagonal. For a pixel missing blue information, an interpolation process similar to that for pixels missing red color information is carried out. While the fourth embodiment employs an interpolation process which uses the bilinear method, the interpolation process may be carried out by some other method instead. For example, the color information of any one pixel adjacent to a target pixel may serve as color information missing from the target pixel. Alternatively, the average value of color information for a number of pixels adjacent to a target pixel may serve as color information missing from the target pixel.

FIGS. 35A through 35C are illustrations depicting carrying out of the simple pixel interpolation process by a different method than in FIGS. 34A through 34E. Similar to FIG. 34A, FIG. 35A depicts color filters arranged in the Bayer arrangement. In the simple pixel interpolation process of FIGS. 35A through 35C, a single pixel (RGB pixel), which has all of the RGB color information, is generated from an area of 4×4 pixels. Specifically, one R pixel, one G pixel, and one B pixel are selected from the area of 4×4 pixels. The RGB values of the selected pixels are then set as the RGB values of the RGB pixel. By generating a single RGB pixel from an area of 4×4 pixels in this way, a reduction process by one-fourth can be accomplished in the course of the simple pixel interpolation process. The size of the pixel area used for generating the single RGB pixel need not necessarily be 4×4 pixels. Moreover, any of the pixels may be used as long as each of the R pixel, the G pixel, and the B pixel (pixels used for a single RGB pixel) in the area of 4×4 pixels. Reduction may be carried out in a 2×2 area as described in Step S122, for example.

The image generated from the RAW image through simple pixel interpolation in the above manner is reduced to generate a reduced RAW image of 320×240 pixels for use in image analysis.

By carrying out the color reproduction process (Step S310) and the gamma correction process (Step S316) to the reduced RAW image thus generated, a reduced image for analysis is generated. Then, in Step S150 of FIG. 32, the development conditions are set through analysis of the reduced image thus generated.

In Embodiment 4, development conditions are set by generating a reduced image through a for-analysis development and analyzing the generated reduced image in the above manner. This allows determination of development conditions with the reduced image which is generated through the for-analysis development, even in instances where the RAW image file (FIG. 2) does not include screen nail image data, or where the screen nail image is not suited to analysis (e.g. where resolution of the screen nail image is too low, or where the screen nail image is a black-and-white image).

E. Fifth Embodiment

Figure 36:
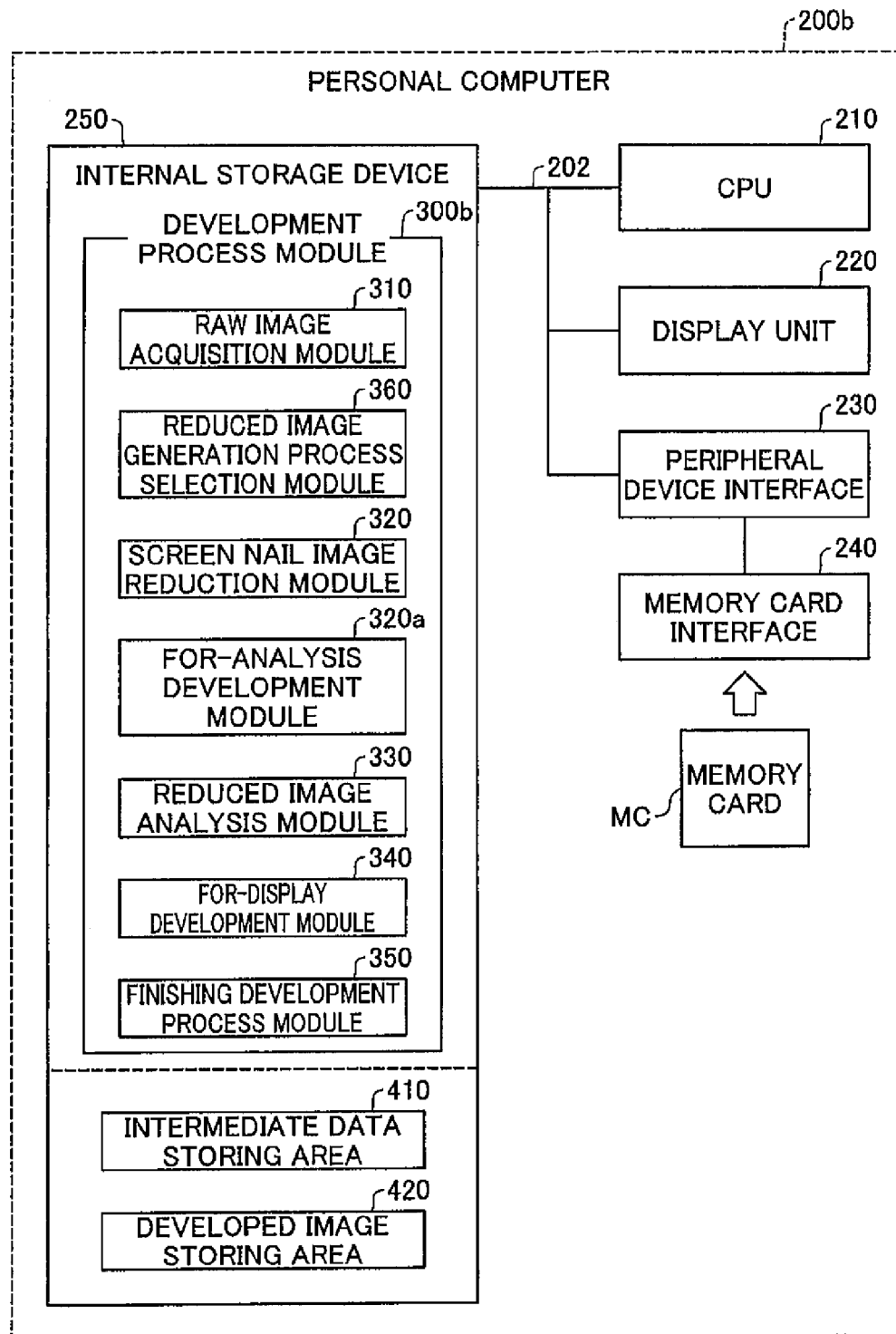
FIG. 36 is a schematic diagram schematically depicting the configuration of a personal computer in a fifth embodiment.

FIG. 36 is a schematic diagram schematically depicting the configuration of a personal computer 200b in a fifth embodiment. The personal computer 200b of the fifth embodiment differs from the personal computer 200 of the first embodiment depicted in FIG. 3 in that a reduced image generation process selection module 360 and a for-analysis development module 320a are added to the development process module 300b. In other respects it is similar to the first embodiment.

Figure 37:
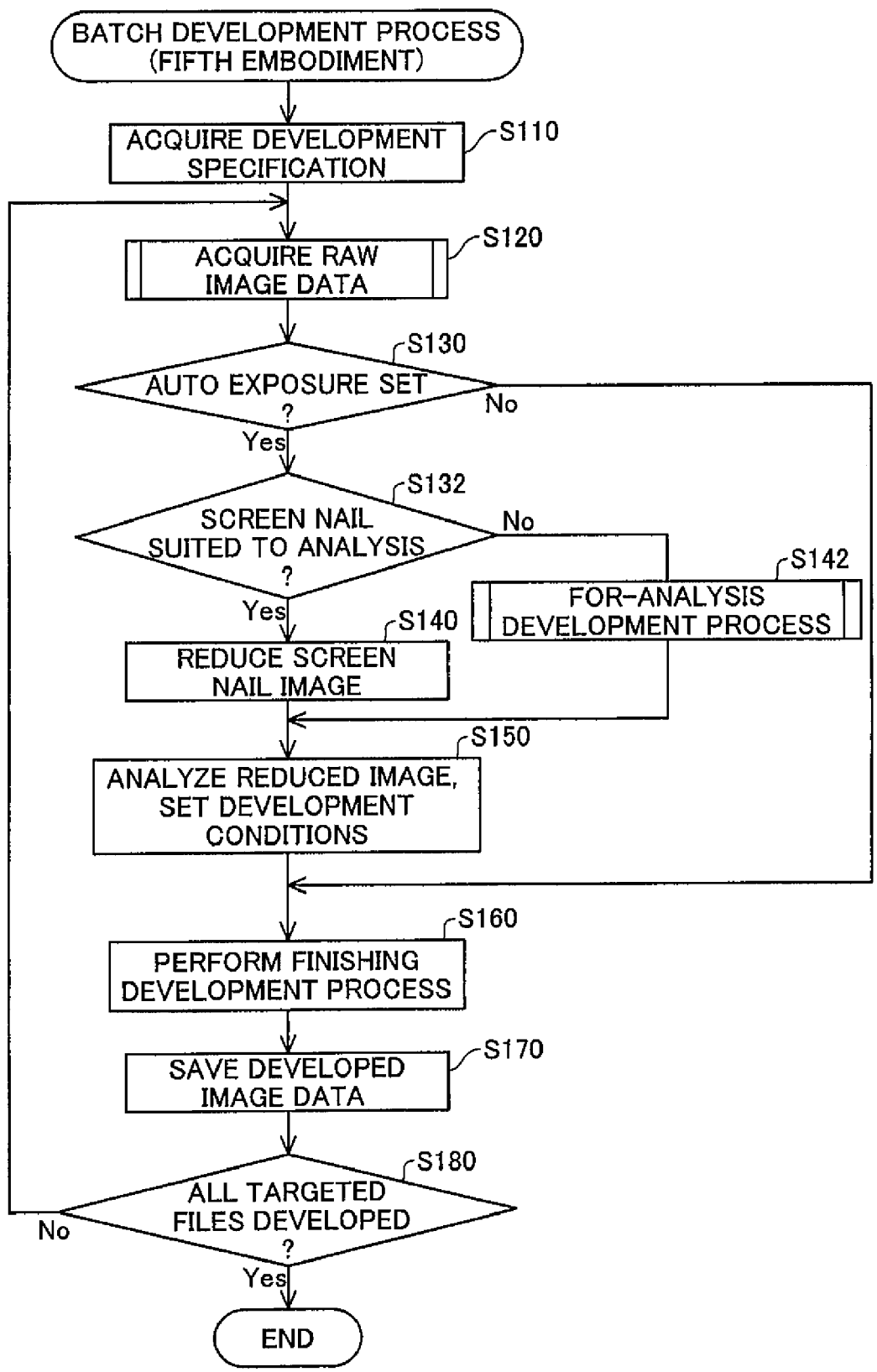
FIG. 37 is a flowchart of a batch development process in the fifth embodiment.

FIG. 37 is a flowchart of a batch development process in the fifth embodiment. The batch development process of the fifth embodiment differs from the batch development process in the first embodiment shown in FIG. 4 in that a Step S132 is added after Step S130; and there is an additional Step S142 on a decision branch from Step S132. In other respects it is similar to the first embodiment. While only the batch development process is discussed below, the process is carried out in a similar manner for the individual development process as well.

In Step S132, the reduced image generation process selection module 360 determines whether the screen nail image is suited to analysis. If it is determined that the screen nail image is suited to analysis, the process advances to Step S140 and the screen nail image is reduced in the same manner as in the first embodiment to generate a reduced image. On the other hand, if it is determined that the screen nail image is not suited to analysis, the process goes to Step S142 and a reduced image is generated through a for-analysis development similar to the fourth embodiment.

The determination as to whether a screen nail image is suited to analysis is made on the basis of the data format of the RAW image file (FIG. 2). As noted, the data format of the RAW image file is identified from information such as manufacturer or model number stored in the header portion, or the extension of the RAW image file. The determination as to whether a screen nail image is suited to analysis is made on the basis of the identified data format of the RAW image file. For example, where resolution of the screen nail image resolution is too low, where the screen nail image is a black-and-white image, or where the RAW image file does not include screen nail image data, it is determined that the screen nail image is not suited to analysis. The format of screen nail image data may also be identified through analysis of the screen nail image data itself.

In the fifth embodiment, if a screen nail image is suited to analysis, a reduced image is generated through reduction of the screen nail image in this way. On the other hand, if a screen nail image is not suited to analysis, a reduced image is generated through a for-analysis development carried out on the RAW image. Typically, the for-analysis development involves a larger arithmetic processing load than reduction of the screen nail image. For this reason, by reducing the screen nail image to generate a reduced image in instances where the screen nail image is suited to analysis, it is possible to reduce the arithmetic processing load to set the development conditions. On the other hand, if a screen nail image is not suited to analysis, the reduced image is generated through a for-analysis development. Therefore, setting of development conditions through analysis of the reduced image may always be carried.

In the fifth embodiment, on the basis of the screen nail image format or information relating to the digital still camera 100 (FIG. 1), such as the manufacturer or model number, the reduced image for analysis is selected from either an image which is generated through the for-analysis development or a reduced image of the screen nail image. The selection of the reduced image may also be carried out according to a user instruction.

F. Sixth Embodiment

Figure 38:
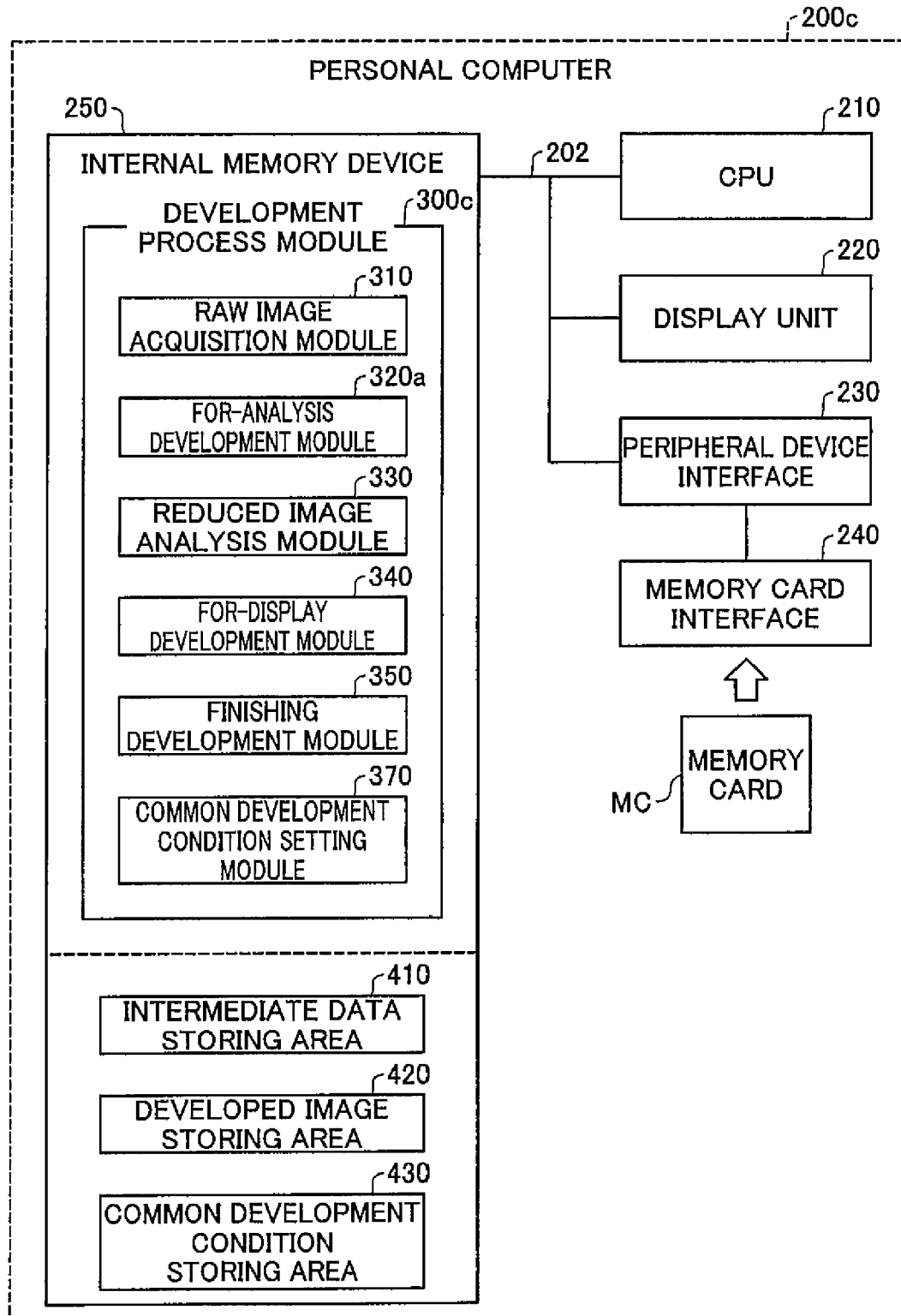
FIG. 38 is a schematic diagram schematically depicting the configuration of a personal computer in a sixth embodiment.

FIG. 38 is a schematic diagram schematically depicting the configuration of a personal computer 200c in a sixth embodiment. The personal computer 200c of the sixth embodiment differs from the personal computer 200a of the fourth embodiment depicted in FIG. 31 in that the development process module 300c includes a common development conditions setting module 370, and the internal storage device 250 has a common development conditions storing area 430. In other respects it is similar to the fourth embodiment.

Figure 39:
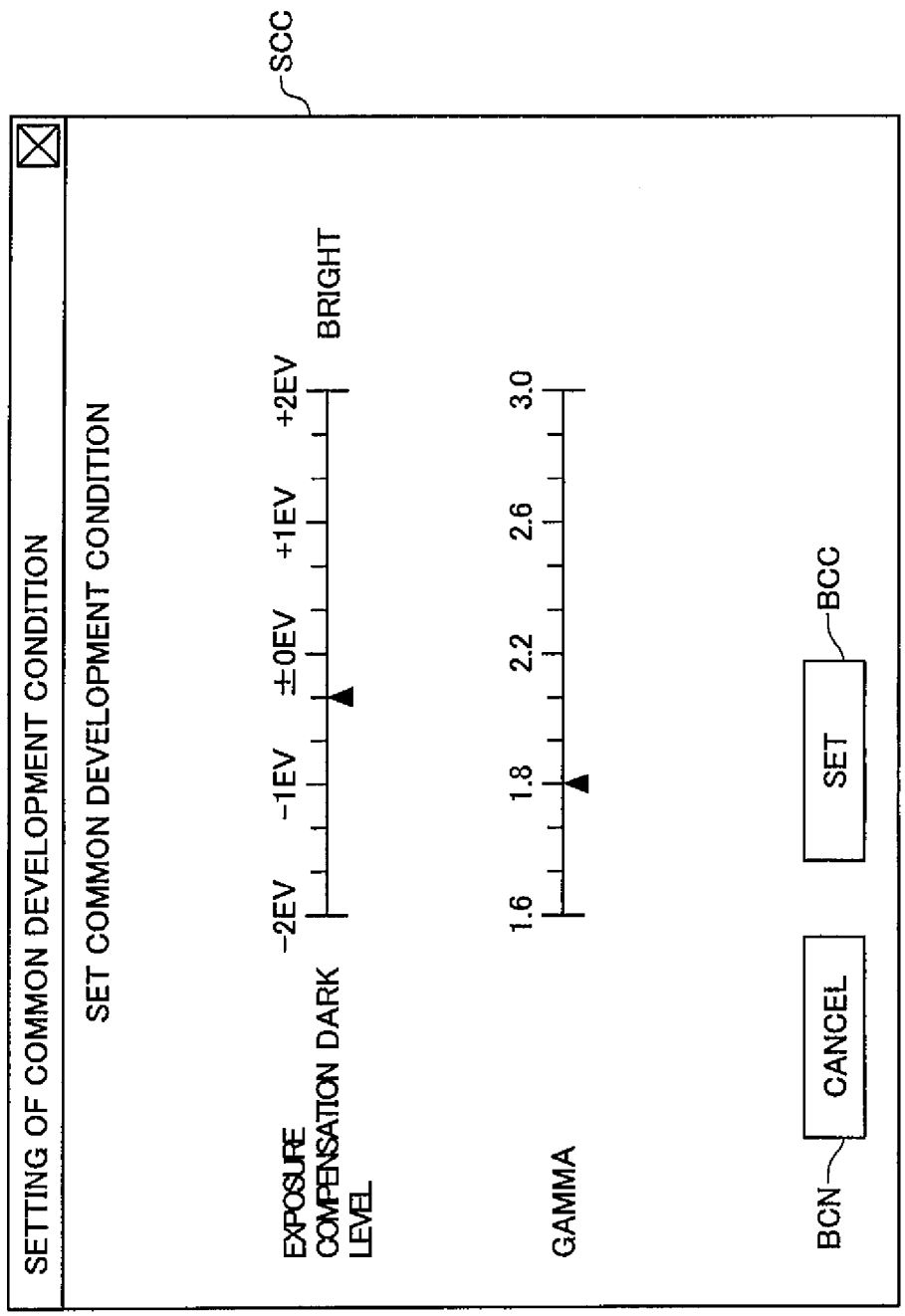
FIG. 39 is an illustration of a common development conditions setting screen for setting common development conditions.

FIG. 39 is an illustration of a common development conditions setting screen SCC used for setting development conditions which are commonly set for the development processes (common development conditions). This common development conditions setting screen SCC is displayed on the display unit 220 (FIG. 38) by the common development conditions setting module 370 when the user starts up an application program for setting the development conditions, or instructs setting of common development conditions in an image processing application program.

The common development conditions setting screen SCC includes an exposure compensation level setting field RCE, and a gamma value setting field RCG. If the user operates the pointing device to move a triangular pointer in the exposure compensation level setting field RCE, the common setting for exposure compensation level is modified. If the user operates the pointing device to move a triangular pointer in the gamma value setting field RCG, the common setting for gamma value is modified. If the user then operates a "SET" button BCC, the modified common settings for exposure compensation level and gamma value is saved to the common development conditions storing area 430 by the common development conditions setting module 370. If the user operates a "CANCEL" button BCN, the modified common settings is discarded, and the common development conditions stored in the common development conditions storing area 430 is unchanged.

FIG. 40 is a flowchart of a for-analysis development process in the sixth embodiment. The for-analysis development process of the sixth embodiment differs from the for-analysis development process of the fourth embodiment in that Step S340 for carrying out reverse compensation of exposure is inserted between Step S305 and Step S310, and Step S316 for carrying out gamma correction process is replaced by a Step S317. While only the for-analysis development process is discussed below, Step S316 for carrying out gamma correction process is replaced by Step S317 in the finishing development process (FIG. 10) and the for-display development process (FIG. 13) as well.

In Step S340, the for-analysis development module 320a (FIG. 38) performs reverse compensation of exposure on the basis of the common setting for exposure compensation level which is stored in the common development conditions storing area 430. Specifically, the inverse of an exposure compensation coefficient equivalent to the common setting of exposure compensation level is multiplied by the RGB values of the reduced RAW image. By performing reverse compensation of exposure in this way, the exposure compensation coefficient which is derived through analysis of the reduced image so generated has a value equivalent to an exposure compensation coefficient equivalent to the common setting of exposure compensation level, multiplied by a standard exposure compensation coefficient. Thus, by carrying out the finishing development process of the for-display development process using the exposure compensation coefficient derived through analysis, the development process result reflect the common setting of exposure compensation level set by the user.

In the example of FIG. 39, the common setting of exposure compensation level is set to "−1/3 EV." Accordingly, the inverse "1.26" of an exposure compensation coefficient "0.79" equivalent to "−1/3 EV" is multiplied by the RGB values of the reduced RAW image. Thus, the exposure compensation coefficient derived through analysis of the reduced image is a value equal to the exposure compensation coefficient "0.79" equivalent to "−1/3 EV" multiplied by the exposure compensation coefficient when the exposure compensation coefficient is not set. Here, "EV" denotes the exposure value. Compensation by "+1 EV" is equivalent to opening up the aperture by one stop or reducing shutter speed by one stop. Compensation by "−1 EV" is equivalent to stopping down the aperture by one stop or increasing shutter speed by one stop.

In Step S317, the for-analysis development module 320a performs gamma correction process using the common setting of gamma value (γ) which is stored in the common development conditions storing area 430. As mentioned above, in the finishing development process (FIG. 10) and the for-display development process (FIG. 13) as well Step S316 for carrying out gamma correction process is replaced by Step S317. For this reason, in gamma correction process carried out during the different development processes, a shared setting which is set by the user is used as the gamma value (γ) in place of a value associated with the class of developed image data. The gamma value is unchanged by analysis of the reduced image. Accordingly, a user-set common value employed as the gamma value in the for-analysis development process, the finishing development process, and the for-display development process, so as to obtain similar result of gamma correction process in the for-analysis development process, the finishing development process and the for-display development process.

In the sixth embodiment, for development process conditions which are not changed by analysis of the reduced image such as gamma value, the developed results of the finishing development process and the for-display development process meet to the user's taste through setting of the common development conditions in accordance with user's own preference. For exposure compensation level, which involves computing a compensation value through analysis of the reduced image, reverse compensation is performed at the time of for-analysis developing. For this reason, the exposure compensation level which is computed through analysis of the reduced image is modified according to the exposure compensation level set by the user. Accordingly, by using the exposure compensation coefficient, which is computed through analysis of the reduced image, in the finishing development process and the for-display development process, the results of the development processes may reflect the common setting of exposure compensation level set according to user preference.

In the sixth embodiment, the exposure compensation level and the gamma value set in advance as the common development conditions. It is also possible to set other development conditions (e.g. color temperature or sharpness) as common development conditions. In this case, for development process condition which is changed through analysis of the reduced image, reverse correction is performed in the for-analysis development process for generating the reduced image. For development process condition which is not changed through analysis of the reduced image, same condition is used in each of the development processes, namely, in the for-analysis development process, the finishing development process, and the for-display development process. In the sixth embodiment only the exposure compensation level and the gamma value are in advance as common development conditions. It is also acceptable to set one of these conditions as a common development process condition.

The present invention has been described with the embodiment hereinabove. The configuration of the embodiment may also be modified as follows. For example, the present invention may be applied not only to the development processing performed on a personal computer but also to any apparatus available to perform development processing. The present invention may be applied to a photo-viewer which stores an image and displays the stored image, and to a printing apparatus for printing an image.

Although the present invention is described and illustrated in detail, it is clearly understood that the same is by way of illustration and example only and is not to be taken by way of limitation, the spirit and scope of the present invention being limited only by the terms of the appended claims.

What is claimed is:

1. An image developing apparatus performing a development process to first undeveloped image data generated by a digital camera, each pixel of the first undeveloped image data lacking a part of color information, the image developing apparatus comprising:
    a finishing development process unit configured to carry out a first type of development process on the first undeveloped image data to generate finishing developed image data in a prescribed format from the first undeveloped image data;
    a for-display development process unit configured to carry out a second type of development process on the first undeveloped image data to generate for-display image data of a prescribed resolution lower than a resolution of the finishing developed image data;
    a development process condition receiving unit configured to receive setting of a first development process condition from a user, the first development process condition being used in the finishing development process unit and in the for-display development process unit; and
    a display unit configured to display the for-display image data generated by the for-display development process unit,
    wherein
    the first type of development process includes:
        a first specific process performed on the first undeveloped image data to generate second undeveloped image data; and
        a first interpolation process performed on the second undeveloped image data to interpolate the lacking color information,
    the second type of development process includes:
        a process to generate third undeveloped image data through a second interpolation process performed on the first undeveloped image data to interpolate the lacking color information; and
        a second specific process performed on the third undeveloped image data,
    a second development process condition is applied to at least one of the first type of development process and the second type of development process,
    the second development process condition is obtained by analyzing analysis image data developed from the first undeveloped image data using development conditions compensated for the first development process condition, when the first development process condition set by a user is a development process condition of a specific item, and
    the first development process condition is reflected to a development result of the first undeveloped image data by applying the second development process condition to the first type of development process or the second type of development process.

2. The image developing apparatus according to claim 1, wherein
    the for-display development process unit has an undeveloped image saving process unit configured to save the third undeveloped image data generated during generation of the for-display image data, and
    when the development process condition receiving unit receives a modification of the first development process condition subsequent to generation of the previous for-display image data, the for-display development process unit carries out the second specific process on the third undeveloped image data saved by the undeveloped image saving process unit, on the basis of the modified first development process condition.

3. The image developing apparatus according to claim 1 wherein the second interpolation process is a process with a smaller arithmetic processing load than the first interpolation process.

4. The image developing apparatus according to claim 1 wherein each of the first and second specific processes includes at least one of a white balance adjustment process and an exposure compensate process to compensate exposure, the exposure compensate process being equivalent to change of the exposure amount at the time of shooting in the digital camera.

5. An image developing apparatus performing a development process to first undeveloped image data generated by a digital camera, each pixel of the first undeveloped image data lacking a part of color information, the image developing apparatus comprising:
    a finishing development process unit configured to carry out a first type of development process on the first undeveloped image data to generate finishing developed image data in a prescribed format from the first undeveloped image data;
    a for-display development process unit configured to carry out a second type of development process on the first undeveloped image data to generate for-display image data of a prescribed resolution; and a development process condition receiving unit for receiving setting of a first development process condition by a user, the first development process condition being used in the finishing development process unit and in the for-display development process unit, wherein the first type of development process includes:
  a first specific process performed on the first undeveloped image data to generate second undeveloped image data; and
  a first interpolation process performed on the second undeveloped image data to interpolate the lacking color information, the second type of development process includes:
  a second interpolation process performed on the first undeveloped image data to interpolate the lacking color information so as to generate third undeveloped image data; and
  a second specific process performed on the third undeveloped image data the for-display development process unit has an undeveloped image saving process unit configured to save the third undeveloped image data generated during generation of the for-display image data, when the development process condition receiving unit receives a modification of the first development process condition subsequent to generation of the previous for-display image data, the for-display development process unit carries out the second specific process on the third undeveloped image data saved by the undeveloped image saving process unit, on the basis of the modified first development process condition, a second development process condition is applied to at least one of the first type of development process and the second type of development process, the second development process condition is obtained by analyzing analysis image data developed from the first undeveloped image data using development conditions compensated for the first development process condition, when the first development process condition set by a user is a development process condition of a specific item, and the first development process condition is reflected to a development result of the first undeveloped image data by applying the second development process condition to the first type of development process or the second type of development process.

6. The image developing apparatus according to claim 5 wherein the second interpolation process is a process with a smaller arithmetic processing load than the first interpolation process.

7. The image developing apparatus according to claim 5 wherein each of the first and second specific processes includes at least one of a white balance adjustment process and an exposure compensate process to compensate exposure, the exposure compensate process being equivalent to change of the exposure amount at the time of shooting in the digital camera.

8. An image developing method for performing a development process to first undeveloped image data generated by a digital camera, each pixel of the first undeveloped image data lacking a part of color information, the image developing method comprising the steps of:

(a) carrying out a first type of development process on the first undeveloped image data to generate finishing developed image data in a prescribed format from the first undeveloped image data;

(b) carrying out a second type of development process on the first undeveloped image data to generate for-display image data of a prescribed resolution lower than a resolution of the finishing developed image data generated in the step (a);

(c) receiving a setting of a first development process condition by a user that is used in steps (a) and (b); and (d) displaying the for-display image data generated in the step (b), wherein the first type of development process includes:
  a first specific process performed on the first undeveloped image data to generate second undeveloped image data; and
  a first interpolation process performed on the second undeveloped image data to interpolate the lacking color information, the second type of development process includes:
  a process to generate third undeveloped image data through a second interpolation process performed on the first undeveloped image data to interpolate the lacking color information; and
  a second specific process performed on the third undeveloped image data, a second development process condition is applied to at least one of the first type of development process and the second type of development process, the second development process condition is obtained by analyzing analysis image data developed from the first undeveloped image data using development conditions compensated for the first development process condition, when the first development process condition set by a user is a development process condition of a specific item, and the first development process condition is reflected to a development result of the first undeveloped image data by applying the second development process condition to the first type of development process or the second type of development process.

9. An image developing method for performing a development process on first undeveloped image data generated by a digital camera, each pixel of the first undeveloped image data lacking a part of color information, the image developing method comprising the steps of:

(a) carrying out a first type of development process on the first undeveloped image data to generate finishing developed image data in a prescribed format from the first undeveloped image data;

(b) carrying out a second type of development process on the first undeveloped image data to generate for-display image data; and (c) receiving setting of a first development process condition from a user, the first development process condition being used in the step (a) and the step (b), wherein the first type of development process includes:
  a first specific process performed on the first undeveloped image data to generate second undeveloped image data; and
  a first interpolation process performed on the second undeveloped image data to interpolate the lacking color information, the second type of development process includes:
  a second interpolation process performed on the first undeveloped image data to interpolate the lacking color information so as to generate third undeveloped image data; and
  a second specific process performed on the third undeveloped image data, the step (b) has the steps of:
(b1) saving the third undeveloped image data generated during generation of the for-display image data; and
(b2) when a modification of the first development process condition subsequent to generation of the previous for-display image data is received in the step (c), carrying out the second specific process on the third undeveloped image data saved in the step (b1), on the basis of the modified first development process condition,
a second development process condition is applied to at least one of the first type of development process and the second type of development process,
the second development process condition is obtained by analyzing analysis image data developed from the first undeveloped image data using development conditions compensated for the first development process condition, when the first development process condition set by a user is a development process condition of a specific item, and
the first development process condition is reflected to a development result of the first undeveloped image data by applying the second development process condition to the first type of development process or the second type of development process.

10. A computer program product for performing a development process on first undeveloped image data generated by a digital camera, each pixel of the first undeveloped image data lacking a part of color information, the computer program product comprising:
  a non-transitory computer-readable medium; and
  a computer program stored on the non-transitory computer-readable medium, the computer program includes:
    a first computer program for causing the computer to carry out a first type of development process on the first undeveloped image data to generate finishing developed image data in a prescribed format from the first undeveloped image data;
    a second computer program for causing the computer to carry out a second type of development process on the first undeveloped image data to generate for-display image data of a prescribed resolution lower than a resolution of the finishing developed image data generated by the computer executing the first computer program;
    a third computer program for causing the computer to receive selling of a first development process condition from a user, the first development process condition being used by the computer executing the first and the second computer program; and
    a fourth computer program for causing the computer to display for-display image data generated by the computer executing the second computer program,
  wherein the first type of development process includes:
    a first specific process performed on the first undeveloped image data to generate second undeveloped image data; and
    a first interpolation process performed on the second undeveloped image data to interpolate the lacking color information,
  the second type of development process includes:
    a process to generate third undeveloped image data through a second interpolation process performed on the first undeveloped image data to interpolate the lacking color information; and
    a second specific process performed on the third undeveloped image data,
  a second development process condition is applied to at least one of the first type of development process and the second type of development process,
  the second development process condition is obtained by analyzing analysis image data developed from the first undeveloped image data using development conditions compensated for the first development process condition, when the first development process condition set by a user is a development process condition of a specific item, and
  the first development process condition is reflected to a development result of the first undeveloped image data by applying the second development process condition to the first type of development process or the second type of development process.

11. A computer program product for performing a development process on first undeveloped image data generated by a digital camera, each pixel of the first undeveloped image data lacking a part of color information, the computer program product comprising:
  a non-transitory computer-readable medium; and
  a computer program stored on the non-transitory computer-readable medium, the computer program includes:
    a first computer program for causing the computer to carry out a first type of development process on the first undeveloped image data to generate finishing developed image data in a prescribed format from the first undeveloped image data;
    a second computer program for causing the computer to carry out a second type of development process on the first undeveloped image data to generate for-display image data; and
    a third computer program for causing the computer to receive selling of a first development process condition from a user, the first development process condition being used by the computer executing the first and the second computer program,
  wherein the first type of development process includes:
    a first specific process performed on the first undeveloped image data to generate second undeveloped image data; and
    a first interpolation process performed on the second undeveloped image data to interpolate the lacking color information,
  the second type of development process includes:
    a second interpolation process performed on the first undeveloped image data to interpolate the lacking color information so as to generate third undeveloped image data; and
    a second specific process on the third undeveloped image data, the second computer program has:
  a fourth computer program for causing the computer to save the third undeveloped image data generated during generation of the for-display image data; and
  a fifth computer program for causing the computer to carry out the second specific process on the third undeveloped image data saved by the computer executing the fourth computer program, on the basis of a modified first development process condition, when a modification of the first development process condition subsequent to generation of the previous for-display image data is received by the computer executing the third computer program, a second development process condition is applied to at least one of the first type of development process and the second type of development process, the second development process condition is obtained by analyzing analysis image data developed from the first undeveloped image data using development conditions compensated for the first development process condition, when the first development process condition set by a user is a development process condition of a specific item, and the first development process condition is reflected to a development result of the first undeveloped image data by applying the second development process condition to the first type of development process or the second type of development process.

* * * * *